US009533254B2

(12) United States Patent
McGrath et al.

(10) Patent No.: US 9,533,254 B2
(45) Date of Patent: Jan. 3, 2017

(54) CROSSLINKED POLYMER COMPOSITIONS, GAS SEPARATION MEMBRANES OF SUCH CROSSLINKED POLYMER COMPOSITIONS, METHODS OF MAKING SUCH MEMBRANES, AND METHODS OF SEPARATING GASES USING SUCH MEMBRANES

(71) Applicants: Virginia Tech Intellectual Properties, Inc., Blacksburg, VA (US); Board of Regents, The University of Texas System, Austin, TX (US); Colleen Kraft, Cincinnati, OH (US)

(72) Inventors: James McGrath, Blackburg, VA (US); Yu Chen, Appleton, WI (US); Rulian Guo, Granger, IN (US); Benny Freeman, Austin, TX (US)

(73) Assignees: Virginia Tech Intellectual Properties, Inc., Blacksburg, VA (US); Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/530,108

(22) Filed: Oct. 31, 2014

(65) Prior Publication Data
US 2015/0122121 A1 May 7, 2015

Related U.S. Application Data

(60) Provisional application No. 61/898,675, filed on Nov. 1, 2013, provisional application No. 61/901,673, filed on Nov. 8, 2013.

(51) Int. Cl.
*B01D 53/22* (2006.01)
*B01D 71/28* (2006.01)
(Continued)

(52) U.S. Cl.
CPC ............ *B01D 53/228* (2013.01); *B01D 71/28* (2013.01); *B01D 71/30* (2013.01); *B01D 71/32* (2013.01);
(Continued)

(58) Field of Classification Search
CPC . B01D 53/22; B01D 53/228; B01D 2053/224; B01D 71/52; B01D 71/66; B01D 71/68; B01D 71/70; B01D 2323/30; B01D 2323/345; B01D 71/28; B01D 71/30; B01D 71/32; B01D 71/76; B01D 71/80; C08G 61/10; C08G 65/485; C08L 71/12; C08L 71/126
(Continued)

(56) References Cited

U.S. PATENT DOCUMENTS

| | | | | |
|---|---|---|---|---|
| 3,994,860 A | * | 11/1976 | Brousse | B01D 71/68 210/500.33 |
| 4,530,703 A | * | 7/1985 | Malon | B01D 71/52 95/45 |

(Continued)

OTHER PUBLICATIONS

Li et al., Preparation of the crosslinked polyethersulfone films by high-temperature electron-beam irradiation, Polymer Degradation and Stability, vol. 91 (2006), pp. 2867-2873.
(Continued)

*Primary Examiner* — Jason M Greene
(74) *Attorney, Agent, or Firm* — Riverside Law LLP

(57) ABSTRACT

Gas separation membrane compositions including at least one crosslinked polymer, gas separation membranes made of such compositions, methods for making such gas separation membranes, and methods of using such membranes to separate gases are described. In one embodiment, the crosslinked polymer includes polyarylene ethers (PAE).

31 Claims, 28 Drawing Sheets

(51) Int. Cl.
   *B01D 71/30*  (2006.01)
   *B01D 71/32*  (2006.01)
   *B01D 71/66*  (2006.01)
   *B01D 71/52*  (2006.01)
   *B01D 71/68*  (2006.01)
   *B01D 71/76*  (2006.01)
   *B01D 71/80*  (2006.01)

(52) U.S. Cl.
   CPC .............. *B01D 71/52* (2013.01); *B01D 71/66* (2013.01); *B01D 71/68* (2013.01); *B01D 71/76* (2013.01); *B01D 71/80* (2013.01); *B01D 2053/221* (2013.01); *B01D 2053/224* (2013.01); *B01D 2323/30* (2013.01); *B01D 2323/345* (2013.01)

(58) Field of Classification Search
   USPC ........................................................... 96/14
   See application file for complete search history.

(56) References Cited

U.S. PATENT DOCUMENTS

| | | | | |
|---|---|---|---|---|
| 4,647,297 A * | 3/1987 | Zampini | ................ | B01D 71/52 96/14 |
| 4,717,393 A | 1/1988 | Hayes | | |
| 4,963,266 A * | 10/1990 | Morgan | ................ | B01D 71/52 210/640 |
| 5,215,554 A | 6/1993 | Kramer et al. | | |
| 5,631,333 A * | 5/1997 | Weber | ................ | C08L 81/06 525/534 |
| 6,103,414 A * | 8/2000 | Cabasso | ................ | B01D 71/52 429/309 |
| 6,194,474 B1 * | 2/2001 | Kerres | ................ | B01D 71/52 521/27 |
| 6,509,441 B1 * | 1/2003 | Kerres | ................ | B01D 71/52 210/650 |
| 7,229,580 B2 * | 6/2007 | Yuan | ................ | B01D 71/52 210/500.22 |
| 7,345,135 B2 | 3/2008 | Ishikawa et al. | | |
| 7,601,785 B2 * | 10/2009 | Chang | ................ | C08G 65/48 521/25 |
| 7,754,844 B2 * | 7/2010 | Sakaguchi | ............ | B01D 71/62 521/27 |
| 2008/0207822 A1 | 8/2008 | Yeager et al. | | |
| 2012/0322119 A1 * | 12/2012 | Liu | ................ | B01D 53/228 435/161 |
| 2012/0329958 A1 * | 12/2012 | Freeman | ............... | B01D 71/62 525/425 |

OTHER PUBLICATIONS

Rivaton et al., "Photodegradation of polyethersulfone and polysulfone", Polymer Degradation and Stability, vol. 66 1999), pp. 385-403.

Robeson, "The upper bound revisited", Journal of Membrane Science, vol. 320 (2008), pp. 390-400.

Robeson, "Correlation of separation factor versus permeability for polymeric membranes", Journal of Membrane Science, vol. 62 (1991), pp. 165-185.

Sanders et al., "Energy-efficient polymeric gas separation membranes for a sustainable future: A review", Polymer, vol. 54 (2013), pp. 4729-4761.

Wright et al., "Gas sorption and transport in UV-irradiated polyarylate copolymers based on tetramethyl bisphenol-A and dihydroxybenzophenone", Journal of Membrane Science, vol. 124 (1997), pp. 161-174.

Thong et al., "Crosslinked sulfonated poly(ether ether ketone) proton exchange membranes for direct methanol fuel mil applications", Journal of Power Sources, vol. 164 (2007), pp. 65-72.

Guo et al., Aromatic Polyethers, Polyetherketones, Polysulfides, and Polysulfones. In: Matyjaszewski K and Möller M (eds.) Polymer Science: A Comprehensive Reference, (2012) vol. 5, pp. 377-430.

* cited by examiner

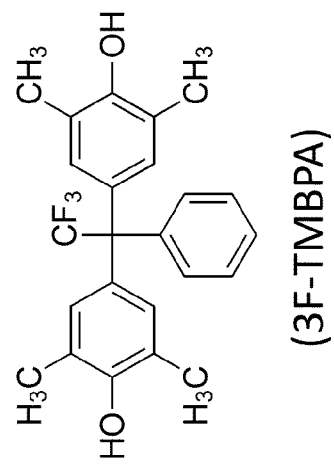
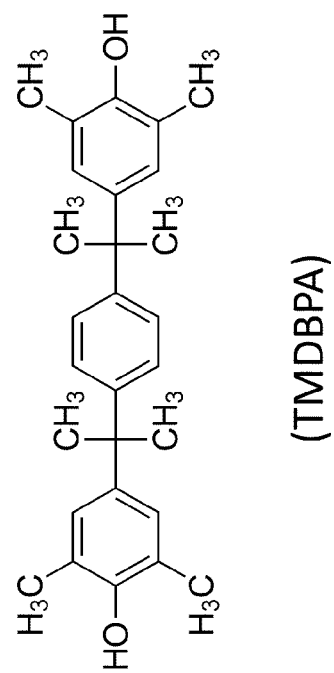
Figure 5B

| Example # | Polymer | UV passes | UV B J/cm2 | UV C J/cm2 | CO2 (barrers) | O2 (barrers) | N2 (barrers) | α CO2-N2 | α O2-N2 | Thickness (mm) | Gel Fraction | Mc at 280°C | Mole Fraction TMBPA | Mole Fraction DFBP |
|---|---|---|---|---|---|---|---|---|---|---|---|---|---|---|
| 11-7 | TMBPA/DFBP | 0 | 0 | 0 | 12.7 | 2.5 | 0.45 | 28.2 | 5.5 | 92 | 0.00 | >100,000** | 1 | 1 |
| 11-7 (4) | TMBPA/DFBP | 4 | 5.76 | 0.89 | 16.3 | 3.5 | 0.59 | 27.6 | 6.0 | 49 | 0.61 | 1060 | 1 | 1 |
| 11-7 (10) | TMBPA/DFBP | 10 | 13.00 | 1.88 | 8.4 | 1.8 | 0.29 | 29.0 | 6.2 | 34 | 0.70 | 510 | 1 | 1 |
| 11-7 (20) | TMBPA/DFBP | 20 | 29.63 | 4.45 | 5.7 | 1.4 | 0.18 | 31.6 | 7.5 | 59 | 1.03 | 340 | 1 | 1 |
| 11-12 | 70TMBPA/30BPA/DFBP | 0 | 0.00 | 0.00 | 9.00 | 1.84 | 0.30 | 30.0 | 6.1 | 43 | 0.00 | >100,000** | 0.7 | 1 |
| 11-12 (4) | 70TMBPA/30BPA/DFBP | 4 | 5.27 | 0.80 |  |  | No Data |  |  | 53 | 0.25 | 15,300 | 0.7 | 1 |
| 11-12 (10) | 70TMBPA/30BPA/DFBP | 10 | 12.60 | 1.89 | 8.0 | 1.66 | 0.25 | 32.0 | 6.6 | 58 | 0.52 | 8,470 | 0.7 | 1 |
| 11-12 (20) | 70TMBPA/30BPA/DFBP | 20 | 25.73 | 3.78 | 6.6 | 1.40 | 0.18 | 36.7 | 7.8 | 56 | 0.95 | 5,280 | 0.7 | 1 |
| 11-11 | 50TMBPA/50BPA/DFBP | 0 | 0.00 | 0.00 | 7.5 | 1.6 | 0.25 | 30.1 | 6.4 | 30 | 0.06 | >100,000** | 0.5 | 1 |
| 11-11 (4) | 50TMBPA/50BPA/DFBP | 4 | 5.76 | 0.90 | 5.5 | 1.2 | 0.18 | 30.6 | 6.4 | 52 | 0.10 | 12660 | 0.5 | 1 |
| 11-11 (10) | 50TMBPA/50BPA/DFBP | 10 | 15.57 | 2.29 | 2.7 | 0.7 | 0.09 | 29.9 | 7.4 | 52 | 0.91 | 4160 | 0.5 | 1 |
| 11-11 (20) | 50TMBPA/50BPA/DFBP | 20 | 30.23 | 4.61 | 2.3 | 0.5 | 0.06 | 37.7 | 9.0 | 53 | 0.93 | 4580 | 0.5 | 1 |
| 11-10 | 30TMBPA/70BPA/DFBP | 0 | 0.00 | 0.00 | 4.4 | 0.9 | 0.15 | 29.3 | 6.3 | 54 | 0.02 | >100,000** | 0.3 | 1 |
| 11-10 (4) | 30TMBPA/70BPA/DFBP | 4 | 5.07 | 0.77 | 3.7 | 0.8 | 0.12 | 30.7 | 6.4 | 53 | 0.10 | 26900 | 0.3 | 1 |
| 11-10 (10) | 30TMBPA/70BPA/DFBP | 10 | 13.73 | 1.97 | 4.0 | 0.9 | 0.13 | 30.7 | 6.7 | 55 | 0.26 | 17300 | 0.3 | 1 |
| 11-10 (20) | 30TMBPA/70BPA/DFBP | 20 | 26.15 | 3.80 | 2.8 | 0.7 | 0.09 | 31.3 | 7.2 | 54 | 0.35 | 16400 | 0.3 | 1 |
| 11-9 | 20TMBPA/80BPA/DFBP | 0 | 0 | 0 | 4.42 | 0.95 | 0.14 | 31.6 | 6.8 | 42 | 0.01 | >100,000** | 0.2 | 1 |
| 11-9 (4) | 20TMBPA/80BPA/DFBP | 4 | 5.01 | 0.74 | 4.36 | 0.95 | 0.14 | 31.1 | 6.8 | 60 | 0.13 | 77400 | 0.2 | 1 |
| 11-9 (10) | 20TMBPA/80BPA/DFBP | 10 | 12.17 | 1.78 | 3.03 | 0.67 | 0.1 | 30.3 | 6.7 | 46 | 0.20 | 15500 | 0.2 | 1 |
| 11-9 (20) | 20TMBPA/80BPA/DFBP | 20 | 25.74 | 3.75 | 3.11 | 0.69 | 0.1 | 31.1 | 6.9 | 63 | 0.30 | 6590 | 0.2 | 1 |
| 11-8 | BPA/DFBP | 0 | 0.00 | 0.00 | 3.1 | 0.64 | 0.10 | 31.0 | 6.4 | 33 | 0.02 | >100,000** | 0 | 1 |
| 11-8 (4) | BPA/DFBP | 4 | 5.39 | 0.79 | 3.2 | 0.66 | 0.10 | 32.0 | 6.6 | 42 | 0.07 | >100,000** | 0 | 1 |
| 11-8 (10) | BPA/DFBP | 10 | 12.72 | 1.75 | 2.9 | 0.60 | 0.09 | 32.2 | 6.7 | 32 | 0.16 | 82,100 | 0 | 1 |
| 11-8 (20) | BPA/DFBP | 20 | 27.72 | 3.96 | 2.5 | 0.54 | 0.08 | 31.3 | 6.8 | 44 | 0.49 | 37,500 | 0 | 1 |

** Samples with Mc >100000 are essentially uncrosslinked. Force too low to measure modulus.

Figure 19

| Example # | Polymer | UV passes | UV B J/cm2 | UV C J/cm2 | CO2 (barrers) | O2 (barrers) | N2 (barrers) | α CO2-N2 | α O2-N2 | Thickness (mm) | Gel Fraction | Mc at 280°C | Mole Fraction DFBP | Mole Fraction TMBPA |
|---|---|---|---|---|---|---|---|---|---|---|---|---|---|---|
| 11-7 | TMBPA/DFBP | 0 | 0 | 0 | 12.7 | 2.5 | 0.45 | 28.2 | 5.5 | 92 | 0.00 | >100,000** | 1 | 1 |
| 11-7 (4) | TMBPA/DFBP | 4 | 5.76 | 0.89 | 16.3 | 3.5 | 0.59 | 27.6 | 6.0 | 49 | 0.61 | 1060 | 1 | 1 |
| 11-7 (10) | TMBPA/DFBP | 10 | 13.00 | 1.88 | 8.4 | 1.8 | 0.29 | 29.0 | 6.2 | 34 | 0.70 | 510 | 1 | 1 |
| 11-7 (20) | TMBPA/DFBP | 20 | 29.63 | 4.45 | 5.7 | 1.4 | 0.18 | 31.6 | 7.5 | 59 | 1.03 | 340 | 1 | 1 |
| 11-6 | TMBPA/70DFDP/30DFDPS | 0 | 0 | 0 | 15.3 | 3.09 | 0.55 | 27.8 | 5.6 | 45 | 0.01 | >100,000** | 0.7 | 1 |
| 11-6 (4) | TMBPA/70DFDP/30DFDPS | 4 | 5.26 | 0.8 | 11.3 | 2.37 | 0.36 | 31.4 | 6.6 | 72 | 0.92 | 10400* | 0.7 | 1 |
| 11-6 (10) | TMBPA/70DFDP/30DFDPS | 10 | 12.76 | 1.86 | 9.6 | 2.09 | 0.28 | 34.3 | 7.5 | 72 | 1.00 | 3920* | 0.7 | 1 |
| 11-6 (20) | TMBPA/70DFDP/30DFDPS | 20 | 27.11 | 3.99 | 1.76 | 0.39 | 0.047 | 37.4 | 8.3 | 74 | 0.99 | 570* | 0.7 | 1 |
| 11-5 | TMBPA/50DFDP/50DFDPS | 0 | 0 | 0 | 13.8 | 2.8 | 0.47 | 29.4 | 6.0 | 57 | 0.02 | >100,000** | 0.5 | 1 |
| 11-5 (4) | TMBPA/50DFDP/50DFDPS | 4 | 4.91 | 0.73 | 11.9 | 2.5 | 0.38 | 31.3 | 6.6 | 33 | 0.90 | 9040 | 0.5 | 1 |
| 11-5 (10) | TMBPA/50DFDP/50DFDPS | 10 | 15.04 | 2.28 | 8.9 | 2.0 | 0.26 | 34.2 | 7.7 | 59 | 0.97 | 6810 | 0.5 | 1 |
| 11-5 (20) | TMBPA/50DFDP/50DFDPS | 20 | 27.28 | 4.03 | 5.5 | 1.3 | 0.15 | 36.7 | 8.7 | 56 | 0.98 | 4700 | 0.5 | 1 |
| 11-4 | TMBPA/30DFBP/70DFDPS | 0 | 0.00 | 0.00 | 12.7 | 2.4 | 0.44 | 28.9 | 5.5 | 83 | 0.01 | 54800 | 0.3 | 1 |
| 11-4 (4) | TMBPA/30DFBP/70DFDPS | 4 | 5.50 | 0.74 | 9.6 | 1.8 | 0.31 | 31.1 | 5.9 | 88 | 0.93 | 5800 | 0.3 | 1 |
| 11-4 (10) | TMBPA/30DFBP/70DFDPS | 10 | 14.02 | 1.91 | 8.0 | 1.7 | 0.25 | 32.0 | 6.8 | 64 | 0.99 | 2800 | 0.3 | 1 |
| 11-4 (20) | TMBPA/30DFBP/70DFDPS | 20 | 26.49 | 3.48 | 5.3 | 1.2 | 0.15 | 35.3 | 8.0 | 63 | 0.98 | 1900 | 0.3 | 1 |
| 11-3 | TMBPA/20DFBP/80DFDPS | 0 | 0.00 | 0.00 | 16.50 | 3.02 | 0.55 | 30.0 | 5.5 | 58 | 0.02 | >100,000** | 0.2 | 1 |
| 11-3 (4) | TMBPA/20DFBP/80DFDPS | 4 | 4.65 | 0.69 | | | No Data | | | | 0.90 | 6,360 | 0.2 | 1 |
| 11-3 (10) | TMBPA/20DFBP/80DFDPS | 10 | 12.78 | 1.90 | 9.40 | 2.03 | 0.25 | 37.6 | 8.1 | 53 | 0.95 | 4,270 | 0.2 | 1 |
| 11-3 (20) | TMBPA/20DFBP/80DFDPS | 20 | 27.88 | 4.02 | 5.80 | 1.36 | 0.16 | 36.3 | 8.5 | 66 | 0.97 | 1,920 | 0.2 | 1 |
| 11-2 | TMBPA/10DFBP/90DFDPS | 0 | 0 | 0 | 25.7 | 4.52 | 0.82 | 31.3 | 5.5 | 46 | 0.01 | >100,000** | 0.1 | 1 |
| 11-2 (4) | TMBPA/10DFBP/90DFDPS | 4 | 4.82 | 0.73 | 17.1 | 3.32 | 0.54 | 31.7 | 6.1 | 48 | 0.93 | 4700 | 0.1 | 1 |
| 11-2 (10) | TMBPA/10DFBP/90DFDPS | 10 | 12.85 | 1.87 | 11.3 | 2.27 | 0.33 | 34.2 | 6.9 | 56 | 0.95 | 3500 | 0.1 | 1 |
| 11-2 (20) | TMBPA/10DFBP/90DFDPS | 20 | 24.6 | 3.63 | 5.1 | 1.16 | 0.12 | 42.5 | 9.7 | 42 | 0.93 | 2200 | 0.1 | 1 |
| 11-1 | TMBPA/DFDPS | 0 | 0.00 | 0.00 | 16.0 | 2.9 | 0.51 | 31.4 | 5.6 | 33 | 0.02 | >100,000** | 0 | 1 |
| 11-1 (4) | TMBPA/DFDPS | 4 | 5.15 | 0.75 | 13.7 | 2.7 | 0.45 | 30.4 | 6.0 | 45 | 0.02 | >100,000** | 0 | 1 |
| 11-1 (10) | TMBPA/DFDPS | 10 | 13.25 | 1.87 | 6.9 | 1.6 | 0.26 | 26.7 | 6.0 | 34 | 0.02 | >100,000** | 0 | 1 |
| 11-1 (20) | TMBPA/DFDPS | 20 | 28.65 | 3.98 | 5.7 | 1.3 | 0.16 | 35.7 | 8.4 | 46 | 0.02 | >100,000** | 0 | 1 |

* Mc data calculated at 330°C
** Samples with Mc >100000 are essentially uncrosslinked. Force too low to measure modulus.

Figure 20

| Example # | Polymer | UV passes | UV B J/cm2 | UV C J/cm2 | CO2 (barrers) | O2 (barrers) | N2 (barrers) | α CO2-N2 | α O2-N2 | Thickness (mm) | Gel Fraction | Mc at 280°C | Mole Fraction TMBPA | Mole Fraction DFBP |
|---|---|---|---|---|---|---|---|---|---|---|---|---|---|---|
| 11-14 | Udel Polysulfone | 0 | 0 | 0 | 2.8 | 0.5 | 0.07 | 39.6 | 7.4 | 62 | 0.00 | >100,000** | 0 | 0 |
| 11-14 (4) | Udel Polysulfone | 4 | 5.08 | 0.76 | 5.1 | 0.9 | 0.14 | 36.7 | 6.6 | 59 | 0.00 | >100,000** | 0 | 0 |
| 11-14 (10) | Udel Polysulfone | 10 | 12.65 | 1.85 | 0.9 | 0.2 | 0.03 | 36.2 | 6.5 | 69 | 0.01 | >100,000** | 0 | 0 |
| 11-14 (20) | Udel Polysulfone | 20 | 25.93 | 3.8 | | | No data | | | | 0.02 | 45,800 | 0 | 0 |
| 11-15 | Blend of ex. 11-13, 11-14 | 0 | 0 | 0 | 4.3 | 0.82 | 0.13 | 33.1 | 6.3 | 59 | 0.00 | | No data | |
| 11-15 (20) | Blend of ex. 11-13, 11-14 | 20 | 26.07 | 3.87 | 0.44 | 0.09 | 0.01 | 44 | 9 | 65.00 | 0.34 | | | |

** Samples with Mc >100000 are essentially uncrosslinked. Force too low to measure modulus.

Figure 21

CROSSLINKED POLYMER COMPOSITIONS, GAS SEPARATION MEMBRANES OF SUCH CROSSLINKED POLYMER COMPOSITIONS, METHODS OF MAKING SUCH MEMBRANES, AND METHODS OF SEPARATING GASES USING SUCH MEMBRANES

CROSS-REFERENCE TO RELATED APPLICATIONS

The present application claims priority to U.S. Provisional Patent Application Ser. No. 61/898,675, filed Nov. 1, 2013, and to U.S. Provisional Patent Application Ser. No. 61/901,673, filed Nov. 8, 2013, both of which are herein incorporated by reference in their entirety.

STATEMENT REGARDING FEDERALLY SPONSORED RESEARCH OR DEVELOPMENT

This invention was made with U.S. government support under Grant No. IIP1237857 awarded by the National Science Foundation. The U.S. government has certain rights in the invention.

BACKGROUND OF THE INVENTION

Polymer membranes are often used commercially as a means of achieving gas separations on a relatively small or intermediate scale. Such membranes can offer an advantage in terms of energy consumption and lower capital investment in comparison to other gas separation technologies, such as cryogenic distillation. However, currently available gas separation membranes can be problematic with respect to long term stability, particularly for applications in which water is present, due to hydrolytic instability. In addition, the stability of gas separation membranes can be affected by the presence of other components that may cause swelling of the membrane, and consequently cause loss of performance.

In addition, currently available membrane compositions suffer from a well-known trade-off of permeability versus selectivity, wherein highly permeable polymers have limited selectivity for separating the gas-phase components of interest. The trade-off between the permeability and selectivity of gas separation membranes has been extensively reviewed by Robeson in his articles describing the "upper bound" in polymeric gas separation membranes (J. Membrane Sci., 1991, 62: 165-185; J. Membrane Sci., 2008, 320: 390-400). Much effort has been expended to devise polymers that fall above this "upper bound" limit, but with minimal success.

The crosslinking of membrane materials by ultraviolet (UV) irradiation for gas separations was disclosed by Hayes (U.S. Pat. No. 4,717,393). Hayes reported that the UV treatment of polyimides improved separation performance while diminishing the propensity of polyimide systems to hydrolyze, although no data on the latter property were presented. Hayes also did not report any mechanical properties of membrane materials, such as stress/strain behavior at room temperature. Thus, there was no indication that the materials cited would be sufficiently durable for use in hollow fiber or asymmetric membrane systems. In addition, Guillet has provided an extensive review of polymer photo processes (Polymer Photophysics and Photochemistry: An Introduction to the Study of Photoprocesses in Macromolecues, 1987, Cambridge University Press).

Others have sought to apply Hayes' results in polyimide systems to other materials, but the irradiation of other types of membranes to improve gas separation performance or other physical properties has been unsuccessful. Wright and Paul reported the irradiation of polyarylate copolymers, and showed slight increases in selectivity for gas separations upon irradiation (J. Membrane Sci., 1997, 124: 161-174). However, the presence of ester groups in those systems led to competing chemistries and was problematic with regard to hydrolytic stability in membranes. In an attempt to overcome these deficiencies, Wright and Paul incorporated benzocyclobutene-based monomers into polyarylate systems for purposes of inducing thermal crosslinking. However, this approach required specialized, expensive monomers, and resulted in membranes with gas separation performance inferior to the polyarylate systems (J. Membrane Sci., 1997, 129: 47-53). In addition, the olefin groups introduced for purposes of crosslinking also introduced sites that could lead to undesired thermally-induced reactions during the processing steps required to form thin film membranes or hollow-fiber structures that would subsequently be cross-linked.

Likewise, Zhong has reported the crosslinking of sulfonated polyarlyene ether ether ketone (SPEEK) polymers by incorporating allyl groups into a side chain and using a blended photo-initiator in the polymer film to effect the crosslinking reaction upon irradiation (J. Power Sources, 2007, 164: 65-72). However, as with Wright and Paul's system, a specially prepared monomer was required, and subsequent processing was also required to remove the remaining photo-initiator.

Ishikawa et al. have described the use of crosslinkable polyarylene ethers for fuel cell membranes (U.S. Pat. No. 7,345,135). However, the polymers described in Ishikawa are directed to optimal proton exchange across a membrane. Ishikawa does not describe polymers useful for gas separation membranes.

Thus, there is a continuing need in the art for a gas separation membrane with excellent separation performance and high durability, particularly membranes comprising relatively inexpensive crosslinkable polymers. The present invention addresses this unmet need in the art.

SUMMARY OF THE INVENTION

The present invention relates to crosslinked polymer compositions, gas separation membranes comprising such crosslinked polymer compositions, method of making such gas separation membranes, and methods of separating gases using such membranes. In one embodiment, the present invention further relates to crosslinked polymer compositions for use in liquid purification or separation applications. In another embodiment, the present invention is a composition for a gas separation membrane or for a membrane for liquid purification or separation.

In a first embodiment, a composition for a gas separation membrane comprises at least one crosslinked polymer having the structure of formula (I):

wherein in formula (I):
A is selected from the group consisting of:
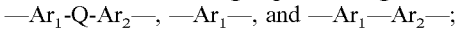
B is selected from the group consisting of:
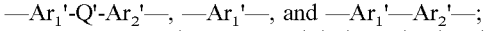
$Ar_1$, $Ar_2$, $Ar_1'$, and $Ar_2'$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group;

each occurrence of $R^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted; p is an integer from 1 to 10; and q is an integer from 1 to 10; wherein at least one occurrence of Ar$_1$, Ar$_2$, Ar$_1$', or Ar$_2$' is substituted with an $R^1$ group comprising a benzylic hydrogen, and at least one occurrence of Q or Q' includes a UV activator.

In one aspect of the first embodiment, the at least one occurrence of Ar$_1$, Ar$_2$, Ar$_1$', or Ar$_2$' substituted with an $R^1$ group comprising a benzylic hydrogen, and the at least one occurrence of Q or Q' including a UV activator are on the same polymer.

In another aspect of the first embodiment, the at least one occurrence of Ar$_1$, Ar$_2$, Ar$_1$', or Ar$_2$' substituted with an $R^1$ group comprising a benzylic hydrogen, and the at least one occurrence of Q or Q' including a UV activator are on different polymers.

In another aspect of the first embodiment, the UV activator is a carbonyl group.

In another aspect of the first embodiment, the polymer comprises at least one crosslink formed via a reaction between a benzylic hydrogen and a Q or Q' carbonyl group.

In a second embodiment, the composition comprises a crosslinked polymer formed by exposing to energetic radiation at least one polymer having the structure of formula (I):

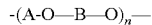

-(A-O—B—O)$_n$— (I)

wherein in formula (I):

A is selected from the group consisting of:
—Ar$_1$-Q-Ar$_2$—, —Ar$_1$—, and —Ar$_1$—Ar$_2$—;

B is selected from the group consisting of:
—Ar$_1$'-Q'-Ar$_2$'—, —Ar$_1$'—, and —Ar$_1$'—Ar$_2$'—;

Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one $R^1$ group;

each occurrence of $R^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted;

p is an integer from 1 to 10; and q is an integer from 1 to 10;

wherein at least one occurrence of Ar$_1$, Ar$_2$, Ar$_1$', or Ar$_2$' is substituted with an $R^1$ group comprising a benzylic hydrogen, and at least one occurrence of Q or Q' includes a UV activator.

In aspect of the second embodiment, the at least one occurrence of Ar$_1$, Ar$_2$, Ar$_1$', or Ar$_2$' substituted with an $R^1$ group comprising a benzylic hydrogen, and the at least one occurrence of Q or Q' including a UV activator are on the same polymer, and the UV activator is a carbonyl group.

In another aspect of the second embodiment, the at least one occurrence of Ar$_1$, Ar$_2$, Ar$_1$', or Ar$_2$' substituted with an $R^1$ group comprising a benzylic hydrogen, and the at least one occurrence of Q or Q' including a UV activator are on different polymers, and the UV activator is a carbonyl group.

In another aspect of the first or second embodiment, A is —Ar$_1$-Q-Ar$_2$— and B is —Ar$_1$'-Q'-Ar$_2$'—. In another aspect of the first or second embodiment, Ar$_1$, Ar$_2$, Ar$_1$' and Ar$_2$' are each phenyl, further wherein each phenyl is independently optionally substituted with 1-2 $R^1$ groups. In another aspect of the first or second embodiment, Q and Q' are each independently selected from the group consisting of —C(=O), —S(=O)$_2$—, —(CH$_2$)$_p$, —C(CH$_3$)$_2$—, —P(=O)C$_6$H$_5$—, —C(CH$_3$)(CF$_3$)—, and —C(=O)C$_6$H$_4$C(=O)—, and p is 1.

In another aspect of the first or second embodiment, the present invention is a crosslinked polymer having the structure of formula (II):

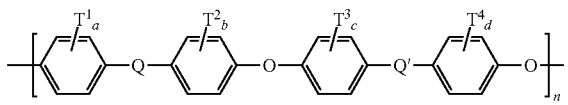

wherein in formula (II):

each occurrence of T$^1$, T$^2$, T$^3$, and T$^4$ is independently selected from the group consisting of H, halo, —CN, —SO$_3$H or a salt thereof, and —C$_1$-C$_{10}$ alkyl;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R¹ groups in —C(R¹)(R¹) may be joined together to form a ring, wherein the ring is optionally substituted;

a is an integer from 0 to 4;

b is an integer from 0 to 4;

c is an integer from 0 to 4;

d is an integer from 0 to 4;

p is an integer from 1 to 10; and q is an integer from 1 to 10; wherein at least one occurrence of T¹, T², T³, or T⁴ comprises a benzylic hydrogen, and at least one occurrence of Q or Q' includes a carbonyl group.

In another aspect of the first or second embodiment, Q is —C(CH₃)₂—, and Q' is —C(=O)—. In another aspect of the first or second embodiment, Q is —C(CH₃)₂— and Q' is —C(=O)C₆H₄C(=O)—. In another aspect of the first or second embodiment, Q is —(CH₂)$_p$, Q' is S(=O)₂—, and p is 1. In another aspect of the first or second embodiment, Q is —C(CH₃)₂—C₆H₄—C(CH₃)₂— and Q' is —C(=O)—. In yet another aspect of the first or second embodiment, Q is —C(CF₃)(C₆H₄)— and Q' is —C(=O)—.

In another aspect of the first or second embodiment, the composition comprises a cross-linked polymer having the structure of formula (III):

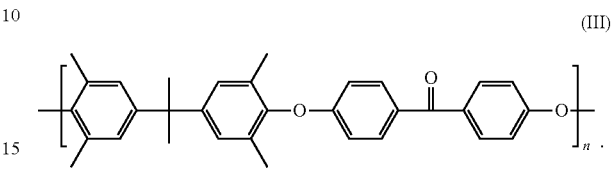

In another aspect of the first or second embodiment, the composition comprises a cross-linked polymer having the structure of formula (IV):

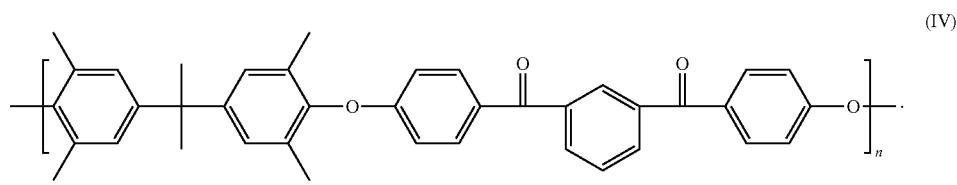

In another aspect of the first or second embodiment, the composition comprises a cross-linked polymer having the structure of formula (V):

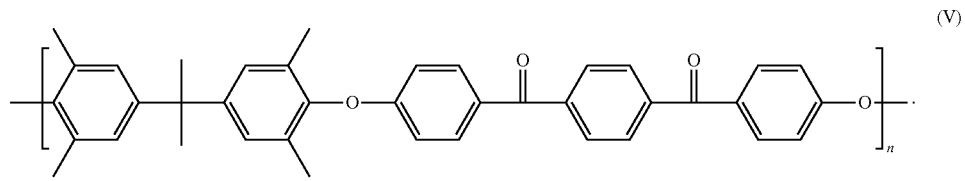

In another aspect of the first or second embodiment, the composition comprises a cross-linked polymer having the structure of formula (VI):

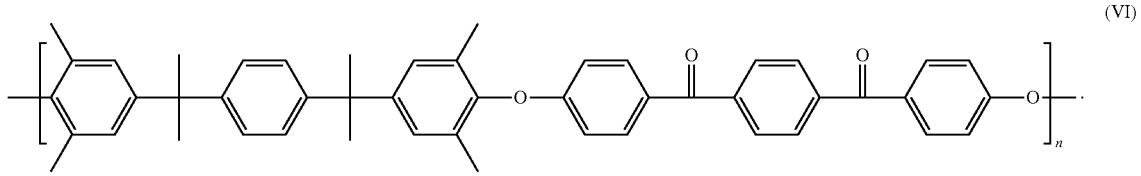

In another aspect of the first or second embodiment, the composition comprises a cross-linked polymer having the structure of formula (VII):

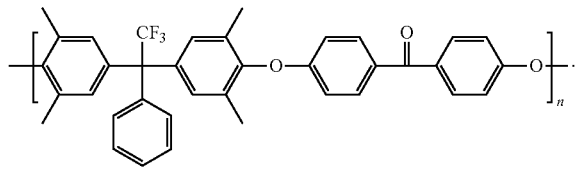

(VII)

The present invention also relates to copolymer compositions for gas separation membranes. In a third embodiment, the composition comprises a crosslinked copolymer comprising structural units (A-O) and (B—O), wherein A is selected from the group consisting of:
—Ar$_1$-Q-Ar$_2$—, —Ar$_1$—, and —Ar$_1$—Ar$_2$—;

B is selected from the group consisting of:
—Ar$_1$'-Q'-Ar$_2$'—, —Ar$_1$'—, and —Ar$_1$'—Ar$_2$'—;

Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more R$^1$ groups may be joined together to form a ring; or two R$^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted p is an integer from 1 to 10; and
q is an integer from 1 to 10; wherein at least one occurrence of Ar$_1$, Ar$_2$, Ar$_1$', or Ar$_2$' is substituted with an R$^1$ group comprising a benzylic hydrogen, and at least one occurrence of Q or Q' includes a carbonyl group.

In one aspect of the third embodiment, the copolymer may comprise additional structural units. For example, the copolymer may further comprising the structural unit (D-O) wherein D is selected from the group consisting of:
—Ar$_1$"-Q'-Ar$_2$"—, —Ar$_1$"—, and —Ar$_1$"—Ar$_2$"—;
wherein Ar$_1$" and Ar$_2$" are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

Q" is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

p is an integer from 1 to 10; and
q is an integer from 1 to 10.

In another aspect of the third embodiment, the copolymer may further comprise the structural unit (E-O), wherein E is selected from the group consisting of:
—Ar$_1$'''-Q'''-Ar$_2$'''—, —Ar$_1$'''—, and —Ar$_1$'''—Ar$_2$'''—;
wherein Ar$_1$''' and Ar$_2$''' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

Q''' is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

p is an integer from 1 to 10; and
q is an integer from 1 to 10.

In a fourth embodiment, the copolymer can be a block copolymer. In such an embodiment, the composition can comprise a copolymer having the structure of formula (VIII):

-[(A-O—B—O)$_k$-(A'-O—B'—O)$_{l-k}$]$_n$—  (VIII)

wherein in formula (VIII):
A is selected from the group consisting of:
—Ar$_1$-Q-Ar$_2$—, —Ar$_1$—, and —Ar$_1$—Ar$_2$—;
B is selected from the group consisting of:
—Ar$_1$'-Q'-Ar$_2$'—, —Ar$_1$'—, and —Ar$_1$'—Ar$_2$'—;
A' is selected from the group consisting of:
—Ar$_1$"-Q"-Ar$_2$"—, —Ar$_1$"—, and —Ar$_1$"—Ar$_2$"—;
B is selected from the group consisting of:
—Ar$_1$'''-Q'''-Ar$_2$'''—, —Ar$_1$'''—, and —Ar$_1$'''—Ar$_2$'''—;

Ar$_1$, Ar$_2$, Ar$_1$', Ar$_2$', Ar$_1$", Ar$_2$", Ar$_1$''', and Ar$_2$''', are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more R$^1$ groups may be joined together to form a ring; or two R$^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q, Q', Q", and Q'" are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

p is an integer from 1 to 10; and q is an integer from 1 to 10, wherein k represents a number from 0.001 to 0.999; and at least one occurrence of Ar$_1$, Ar$_2$, Ar$_1$', Ar$_2$', Ar$_1$", Ar$_2$", Ar$_1$'", or Ar$_2$'" is substituted with an R$^1$ group comprising a benzylic hydrogen, and at least one occurrence of Q, Q', Q", or Q'" includes a carbonyl group.

In various embodiments, the present invention relates to polymer blends. In one embodiment, any of the polymers described herein can be blended with one or more additional polymers prior to crosslinking. In one example of polymer blends, the one or more additional polymers comprises at least one of a poly(2,6 dimethylphenylene oxide) (PPO) and a polysulfone.

In a fifth embodiment, a composition for a gas separation membrane comprises a crosslinked polymer having the structure of formula (I):

wherein in formula (I):

A is selected from the group consisting of:
—Ar$_1$-Q-Ar$_2$—, —Ar$_1$—, and —Ar$_1$—Ar$_2$—;

B is selected from the group consisting of:
—Ar$_1$'-Q'-Ar$_2$'—, —Ar$_1$'—, and —Ar$_1$'—Ar$_2$'—;

Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more R$^1$ groups may be joined together to form a ring; or two R$^1$ groups may be covalently bonded to Y;

Y is selected from the group consisting of —O—, —S—, —C(=O), —CH(OH)—, —S(=O)$_2$, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted; p is an integer from 1 to 10; and q is an integer from 1 to 10; wherein at least one occurrence of Ar$_1$, Ar$_2$, Ar$_1$', or Ar$_2$' is substituted with an R$^1$ group comprising a benzylic hydrogen, and at least one occurrence of Q or Q' includes a carbonyl group.

In a sixth embodiment, the composition comprises a first polymer and a second polymer independently having the structure of formula (I):

wherein in formula (I):

A is selected from the group consisting of:
—Ar$_1$-Q-Ar$_2$—, —Ar$_1$—, and —Ar$_1$—Ar$_2$—;

B is selected from the group consisting of:
—Ar$_1$'-Q'-Ar$_2$'—, —Ar$_1$'—, and —Ar$_1$'—Ar$_2$'—;

Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more R$^1$ groups may be joined together to form a ring; or two R$^1$ groups may be covalently bonded to Y;

Y is selected from the group consisting of —O—, —S—, —C(=O), —CH(OH)—, —S(=O)$_2$, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

p is an integer from 1 to 10; and q is an integer from 1 to 10, wherein the first polymer includes at least one occurrence of Ar$_1$, Ar$_2$, Ar$_1$', or Ar$_2$' substituted with an R$^1$ group comprising a benzylic hydrogen; the second polymer includes at least one occurrence of Q or Q' having a carbonyl group; and the composition comprises at least one crosslink formed between the first polymer and the second polymer.

The present invention also relates to methods of making a gas separation membrane. In a seventh embodiment, a method for making a gas separation membrane comprises the steps of:

a) forming a membrane from one or more polymers having the structure of formula (I):

wherein in formula (I):

A is selected from the group consisting of:
—Ar$_1$-Q-Ar$_2$—, —Ar$_1$—, and —Ar$_1$—Ar$_2$—;

B is selected from the group consisting of:
—Ar$_1$'-Q'-Ar$_2$'—, —Ar$_1$'—, and —Ar$_1$'—Ar$_2$'—;

Ar$_1$, Ar$_2$, Ar$_1$' and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

each occurrence of $R^1$ is independently selected from the group consisting of H, halo, —CN, —$SO_3H$ or a salt thereof, —$CO_2H$ or a salt thereof, —$C_1$-$C_{10}$ alkyl, —$C_1$-$C_{10}$ alkoxy, —$C_1$-$C_{10}$ haloalkyl, —$C_1$-$C_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(=O)NH—, —P(=O)C$_6$H$_5$—, —C(CH$_3$)(CF$_3$)—, —C(=O)C$_6$H$_4$C(=O)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C($R^1$)($R^1$) may be joined together to form a ring, wherein the ring is optionally substituted;

p is an integer from 1 to 10; and q is an integer from 1 to 10; wherein at least one occurrence of $Ar_1$, $Ar_2$, $Ar_1'$, or $Ar_2'$ is substituted with an $R^1$ group comprising a benzylic hydrogen, and at least one occurrence of Q or Q' includes a carbonyl group; and b) exposing at least a portion of said membrane to radiation so as to result in the formation of crosslinks.

In an eighth embodiment, a method for making a gas separation membrane comprises the steps of:

a) forming a membrane from the composition of the first above-described embodiment; and b) exposing at least a portion of said membrane to radiation so as to result in the formation of crosslinks.

In a ninth embodiment, a method for making a gas separation membrane comprises the steps of:

a) forming a membrane from one or more polymers comprising structural units (A-O) and (B—O), wherein A is selected from the group consisting of:
—$Ar_1$-Q-$Ar_2$—, —$Ar_1$—, and —$Ar_1$—$Ar_2$—;

B is selected from the group consisting of:
—$Ar_1'$-Q'-$Ar_2'$—, —$Ar_1'$—, and —$Ar_1'$—$Ar_2'$—;

$Ar_1$, $Ar_2$, $Ar_1'$, and $Ar_2'$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group each occurrence of $R^1$ is independently selected from the group consisting of H, halo, —CN, —$SO_3H$ or a salt thereof, —$CO_2H$ or a salt thereof, —$C_1$-$C_{10}$ alkyl, —$C_1$-$C_{10}$ alkoxy, —$C_1$-$C_{10}$ haloalkyl, —$C_1$-$C_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C($R^1$)($R^1$)—, C(=O)NH—, —P(=O)C$_6$H$_5$—, —C(CH$_3$)(CF$_3$)—, —C(=O)C$_6$H$_4$C(=O)—, —C($R^1$)($R^1$)—C$_6$H$_4$—C($R^1$)($R^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C($R^1$)($R^1$) may be joined together to form a ring, wherein the ring is optionally substituted;

p is an integer from 1 to 10; and q is an integer from 1 to 10; wherein at least one occurrence of $Ar_1$, $Ar_2$, $Ar_1'$, or $Ar_2'$ is substituted with an $R^1$ group comprising a benzylic hydrogen, and at least one occurrence of Q or Q' includes a carbonyl group; and b) exposing at least a portion of said membrane to radiation so as to result in the formation of crosslinks.

In a tenth embodiment, a method for making a gas separation membrane comprises the steps of:

a) forming a membrane from the composition of the third above-described embodiment; and b) exposing at least a portion of said membrane to radiation so as to result in the formation of crosslinks.

In an eleventh embodiment, a method for making a gas separation membrane comprises the steps of:

a) forming a membrane from the composition of the fourth above-described embodiment; and b) exposing at least a portion of said membrane to radiation so as to result in the formation of crosslinks.

In another aspect of any of the above-described embodiments, the crosslinked polymer of the present invention has a gel fraction of at least 20%. In another aspect of any of the above-described embodiments, the polymer is crosslinked via radiation. In another aspect of any of the above-described embodiments, the polymer can be crosslinked via ultraviolet radiation. In another aspect of any of the above-described embodiments, the polymer can be crosslinked via thermal radiation. In another aspect of any of the above-described embodiments, the polymer is crosslinked via chemical treatment.

In a twelfth embodiment, the present invention relates to a membrane for the separation or purification of a gas, liquid, or a gas/liquid mixture, wherein the membrane is made from any of the compositions described herein and has a mixed gas selectivity of various gas pairs or mixtures, and may have applicability for more than one gas pair or mixture. In one aspect of the twelfth embodiment, the membrane is a hollow fiber membrane. In another aspect of the twelfth embodiment, the membrane has an $O_2/N_2$ selectivity of at least about 6. In another aspect of the twelfth embodiment, the membrane has a $H_2/N_2$ selectivity of at least about 85. In yet another aspect of the twelfth embodiment, the membrane has a $H_2/CH_4$ selectivity of at least about 140.

In a thirteenth embodiment, the present invention relates to a method of gas separation using a membrane made from any of the compositions described herein. In one aspect of the thirteenth embodiment, the method of gas separation comprises feeding a gas mixture to a gas separation module, wherein the gas separation module comprises at least one gas separation membrane, and wherein the at least one gas separation membrane comprises a polymer of the present invention. In another aspect of the thirteenth embodiment, the method of gas separation can be used to separate a gas mixture comprising two or more gases selected from the group consisting of $H_2$, He, $O_2$, $N_2$, CO, $CO_2$, water vapor, $CH_4$, saturated $C_2$-$C_4$ hydrocarbons, and unsaturated $C_2$-$C_4$ hydrocarbons.

In one aspect of any of the embodiments described herein, the polymer includes at least about 2 meq/g of benzylic methyl, methylene, or methine groups, and at least about 0.2 meq/g of a UV activator.

In one embodiment, the polymer compositions of the present invention are not crosslinked.

In one embodiment, the polymer compositions described herein are blended with other polymers prior to crosslinking.

In various embodiments, the present invention relates to a method of liquid purification or separation. In one embodiment, the method of liquid purification comprises feeding a liquid to a liquid purification module, wherein the liquid purification comprises at least one liquid purification membrane, wherein the at least one liquid purification membrane comprises a polymer of the present invention. In one embodiment, the method of liquid purification or separation can be used to purify water.

Various of the foregoing embodiments and aspects may be used separately or in any combination with one another, as would be understood by a person of ordinary skill in the art.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 5, comprising FIGS. 5A and 5B, is a series of diagrams of exemplary bisphenol compound structures useful for making the compositions of the present invention.

FIG. 6, comprising

FIG. 10, comprising FIG. 10A is a 1H NMR spectrum of TMBPF-DCDPS prior to oxidation. FIG. 10B is a set of 1H NMR spectra of TMBPF-DCDPS before (top) and after (bottom) oxidation with potassium peroxymonosulfate/KBr. FIG. 10C is a set of 1H-NMR of TMBPF-DCDPS before (top) and after (bottom) thermal oxidization.

FIG. 19 is a table showing data for various PAEK polymers and associated properties of films made from the polymers.

FIG. 20 is a table showing data for various PAEK polymers and associated properties of films made from the polymers.

FIG. 21 is a table showing data for various Polysulfone polymers and blends of PAEK polymers, and associated properties of films made from the polymers.

DETAILED DESCRIPTION

Figure 1:
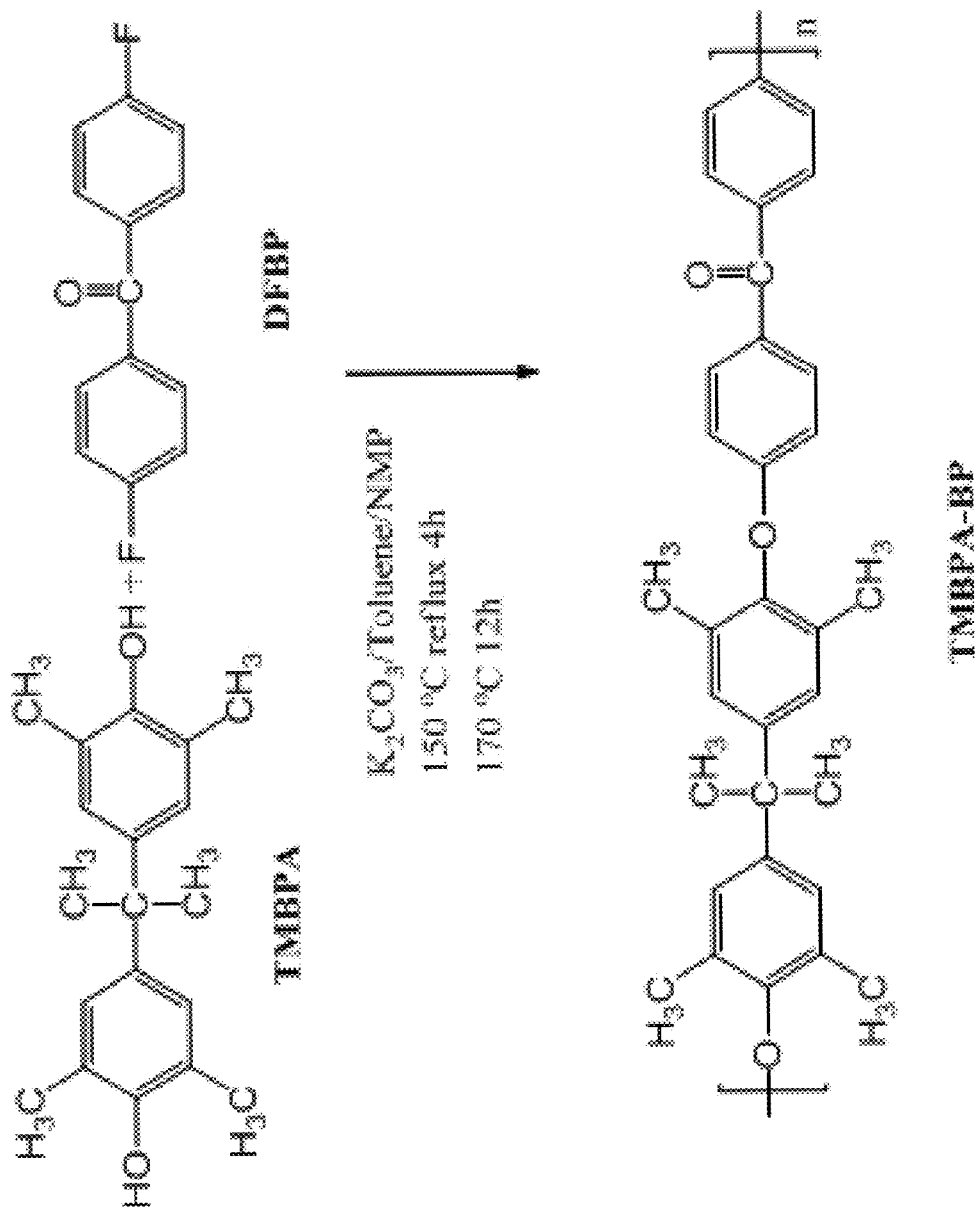
FIG. 1 is a diagram of a scheme for an exemplary synthesis of a polymer useful for the membranes of the present invention, namely TMBPA-BP.

It is to be understood that the figures and descriptions of the present invention have been simplified to illustrate elements that are relevant for a clear understanding of the present invention, while eliminating, for the purpose of clarity, many other elements found in polymer chemistry and gas separation membranes. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

As used herein, the term "alkyl," by itself or as part of another substituent means, unless otherwise stated, a straight or branched chain hydrocarbon having the number of carbon atoms designated (i.e. $C_{1-6}$ means one to six carbon atoms) and including straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is $(C_1-C_6)$alkyl, particularly ethyl, methyl, isopropyl, isobutyl, n-pentyl, n-hexyl and cyclopropylmethyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are $(C_1-C_3)$ alkoxy, particularly ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "cycloalkyl" refers to a mono cyclic or polycyclic non-aromatic radical, wherein each of the atoms forming the ring (i.e. skeletal atoms) is a carbon atom. In one embodiment, the cycloalkyl group is saturated, or partially unsaturated. In another embodiment, the cycloalkyl group is fused with an aromatic ring. Cycloalkyl groups include groups having from 3 to 10 ring atoms. Illustrative

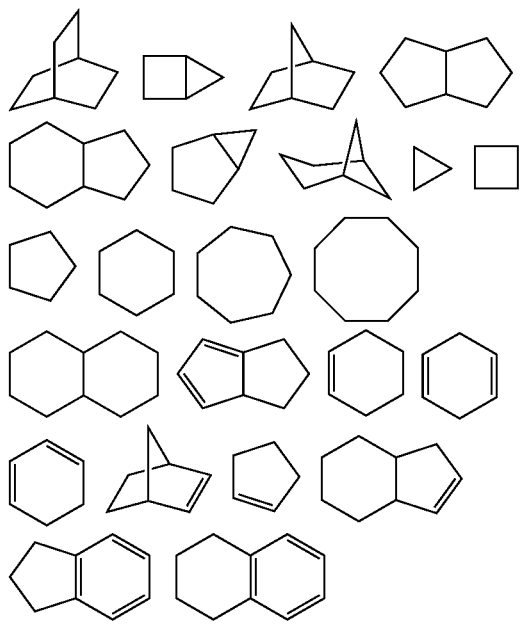

Monocyclic cycloalkyls include, but are not limited to, cyclopropyl, cyclobutyl, cyclopentyl, cyclohexyl, cycloheptyl, and cyclooctyl. Dicyclic cycloalkyls include, but are not limited to tetrahydronaphthyl, indanyl, and tetrahydropentalene. Polycyclic cycloalkyls include adamantine and norbomane. The term cycloalkyl includes "unsaturated nonaromatic carbocyclyl" or "nonaromatic unsaturated carbocyclyl" groups both of which refer to a nonaromatic carbocycle as defined herein, which contains at least one carbon carbon double bond or one carbon carbon triple bond.

As used herein, the term "heterocycloalkyl" or "heterocyclyl" refers to a heteroalicyclic group containing one to four ring heteroatoms each selected from O, S and N. In one embodiment, each heterocycloalkyl group has from 4 to 10 atoms in its ring system, with the proviso that the ring of said group does not contain two adjacent O or S atoms. In another embodiment, the heterocycloalkyl group is fused with an aromatic ring. In one embodiment, the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "aromatic" refers to a carbocycle or heterocycle with one or more polyunsaturated rings and having aromatic character, i.e. having (4n+2) delocalized π (pi) electrons, where n is an integer.

The terms "aryl" or "arylene" are used interchangeably herein, and when employed alone or in combination with other terms, mean, unless otherwise stated, a carbocyclic aromatic system containing one or more rings (typically one, two or three rings), wherein such rings may be attached together in a pendent manner, such as a biphenyl, or may be fused, such as naphthalene. Examples of aryl groups include phenyl, anthracyl, and naphthyl. Preferred examples are phenyl and naphthyl, most preferred is phenyl.

As used herein, the term "aryl-($C_1$-$C_3$)alkyl" means a functional group wherein a one- to three-carbon alkylene chain is attached to an aryl group, e.g., —$CH_2CH_2$-phenyl. Preferred is one of aryl-$CH_2$—, aryl-$CH(CH_3)$—, and aryl-CH3. The term "substituted aryl-($C_1$-$C_3$)alkyl" means an aryl-($C_1$-$C_3$)alkyl functional group in which the aryl group is substituted. Preferred is substituted aryl($CH_2$)—. Similarly, the term "heteroaryl-($C_1$-$C_3$)alkyl" means a functional group wherein a one to three carbon alkylene chain is attached to a heteroaryl group, e.g., —$CH_2CH_2$-pyridyl. Preferred is heteroaryl-($CH_2$)—. The term "substituted heteroaryl-($C_1$-$C_3$)alkyl" means a heteroaryl-($C_1$-$C_3$)alkyl functional group in which the heteroaryl group is substituted. Preferred is substituted heteroaryl-($CH_2$)—.

As used herein, the term "benzylic hydrogen" refers to a hydrogen atom bound to a carbon atom that is directly bound to an aromatic ring. In one embodiment, the polymer of the present invention comprises at least one of the arylene group having a benzylic hydrogen. Benzylic methyl, benzylic methylene, and benzylic methine all contain at least one benzylic hydrogen.

As used herein, the term "substituted" means that an atom or group of atoms has replaced hydrogen as the substituent attached to another group. The term "substituted" further refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two.

As used herein, the term "optionally substituted" means that the referenced group may be substituted or unsubstituted. In one embodiment, the referenced group is optionally substituted with zero substituents, i.e., the referenced group is unsubstituted. In another embodiment, the referenced group is optionally substituted with one or more additional group(s) individually and independently selected from groups described herein.

In one embodiment, the substituents are independently selected from the group consisting of oxo, halogen, —CN, —$NH_2$, —OH, —$NH(CH_3)$, —$N(CH_3)_2$, alkyl (including straight chain, branched and/or unsaturated alkyl), substituted or unsubstituted cycloalkyl, substituted or unsubstituted heterocycloalkyl, fluoro alkyl, substituted or unsubstituted heteroalkyl, substituted or unsubstituted alkoxy, fluoroalkoxy, —S-alkyl, $S(=O)_2$alkyl, —$C(=O)NH$[substituted or unsubstituted alkyl, or substituted or unsubstituted phenyl], —$C(=O)N[H$ or alkyl$]_2$, —$OC(=O)N$[substituted or unsubstituted alkyl$]_2$, —$NHC(=O)NH$ [substituted or unsubstituted alkyl, or substituted or unsubstituted phenyl], —$NHC(=O)$alkyl, —N[substituted or unsubstituted alkyl]$C(=O)$[substituted or unsubstituted alkyl], —$NHC(=O)$[substituted or unsubstituted alkyl], —$C(OH)$[substituted or unsubstituted alkyl]$_2$, and —$C(NH_2)$[substituted or unsubstituted alkyl]$_2$. In another embodiment, by way of example, an optional substituent is selected from oxo, fluorine, chlorine, bromine, iodine, —CN, —$NH_2$, —OH, —$NH(CH_3)$, —$N(CH_3)_2$, —$CH_3$, —$CH_2CH_3$, —$CH(CH_3)_2$, —$CF_3$, —$CH_2CF_3$, —$OCH_3$, —$OCH_2CH_3$, —$OCH(CH_3)_2$, —$OCF_3$, —$OCH_2CF_3$, —$S(=O)_2$—$CH_3$, —$C(=O)NH_2$, —$C(=O)$—$NHCH_3$, —$NHC(=O)NHCH_3$, —$C(=O)CH_3$, and —$C(=O)OH$. In yet one embodiment, the substituents are independently selected from the group consisting of $C_{1-6}$ alkyl, —OH, $C_{1-6}$ alkoxy, halo, amino, acetamido, oxo and nitro. In yet another embodiment, the substituents are independently selected from the group consisting of $C_{1-6}$ alkyl, $C_{1-6}$ alkoxy, halo, acetamido, and nitro. As used herein, where a substituent is an alkyl or alkoxy group, the carbon chain may be branched, straight or cyclic, with straight being preferred.

Throughout this disclosure, polymers are designated or named based on precursors or aromatic backbone structure. For example, the following polymer may be described as TMBPA BP, or by precursor, e.g., TMBPA DCBP or TMBPA DFBP:

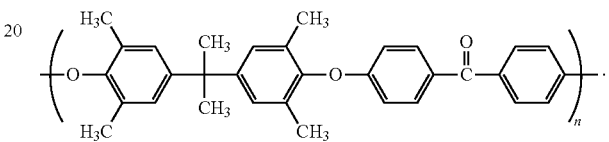

Accordingly, the same polymer may be described in different ways within this disclosure depending on the naming convention used. In addition, in some cases the designation "UNXL" is used to indicate the uncrosslinked version of a polymer and the designation "XL" is used to indicate a version of a polymer that has been crosslinked.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This definition applies regardless of the breadth of the range.

Description

The present invention relates to compositions, systems, and methods for gas separation applications. In one embodiment, the present invention relates to crosslinkable polyarylene ether (PAE) polymers for use in gas separation membranes. Typically, the cross-linkable PAE polymers of the present invention have at least one benzylic hydrogen and at least one carbonyl group that can react to form a crosslink when exposed to energetic radiation. In one embodiment, one of the monomers used to make the polymer of the present invention includes a ketone bridge, and the resulting PAE polymer can be referred to as a polyarylene ether ketone (PAEK). The crosslinking of PAE polymers improves the performance of gas separation membranes by increasing selectivity while maintaining commercially viable permeability values. In addition, the crosslinking of PAE polymers can improve durability and reduce the potential for plasticization. However, in one embodiment, the PAE polymers of the present invention are not crosslinked.

It is well-recognized that polymers utilized in membrane gas separation applications display a trade-off between permeability and selectivity. A thorough review of gas separation membranes and the characteristics of polymers used in such membranes was provided by Sanders et al. (Polymer, 2013, 54: 4729-4761, which is herein incorporated by reference in its entirety). In particular, Sanders' et al. discuss various gas separations of commercial importance including refinery, syn gas and ammonia purge applications (Sanders, Section 4.1), as well as air dehydration and nitrogen enrichment applications for inerting, such as OBIGGS (Sanders, Sections 4.2 & 4.3).

As a consequence, highly permeable polymers generally have limited selectivity for separating the gas-phase components of interest. Conversely, polymers membranes with excellent selectivity generally have low permeability, making them impractical for commercial applications. Further, the polymers used in currently available gas separation membranes can have poor long-term stability, particularly for applications in which water is present, due to hydrolytic instability. In addition, the stability of gas membranes can be affected by the presence of other components, such as carbon dioxide, that may cause swelling, i.e., plasticization, or degradation of the membrane. The present invention eliminates these concerns by utilizing a hydrolysis-resistant polymer that can be crosslinked in order to enhance selectivity, resist swelling, and improve durability while maintaining commercially viable permeability.

Polyarylene ether (PAE) polymers are stable to hydrolysis and have desirable thermal properties for gas separation applications. However, some versions of these polymers can be susceptible to plasticization by $CO_2$ and hydrocarbons, which can lead to swelling and poor performance in gas separation applications. Accordingly, the present invention relates to the finding that by crosslinking suitably modified PAE polymers, the problems of plasticization and poor performance can be avoided or minimized. In various embodiments, the modification of these polymers involves introducing reactive sites that enable crosslinking. When the modified polymers are exposed to energetic radiation, radical elimination/addition reactions occur, resulting in crosslinking. The present invention further relates to the discovery that crosslinked PAE polymers can exhibit improved selectivity while having permeation rates that are of commercial interest.

Compositions

In one aspect, the PAE precursors of the present invention are comprised of a polymer having repeating units of the structure of formula (I):

-(A-O—B—O)—  (I)

wherein in formula (I):

A is selected from the group consisting of:
—$Ar_1$-Q-$Ar_2$—, —$Ar_1$—, or —$Ar_1$—$Ar_2$—;

B is selected from the group consisting of:
—$Ar_1'$-Q'-$Ar_2'$—, —$Ar_1'$—, or —$Ar_1'$—$Ar_2'$—;

$Ar_1$, $Ar_2$, $Ar_1'$ and $Ar_2'$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group;

each occurrence of $R^1$ is independently selected from the group consisting of H, halo, —CN, —$SO_3$H or a salt thereof, —$CO_2$H or a salt thereof, —$C_1$-$C_{10}$ alkyl, —$C_1$-$C_{10}$ alkoxy, —$C_1$-$C_{10}$ haloalkyl, —$C_1$-$C_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C($R^1$)($R^1$)—, C(=O)NH—, —P(=O)C$_6$H$_5$—, —C(CH$_3$)(CF$_3$)—, —C(=O)C$_6$H$_4$C(=O)—, —C($R^1$)($R^1$)—C$_6$H$_4$—C($R^1$)($R^1$)—, -phenyl-($C_1$-$C_6$)alkyl, -phenyl-($C_1$-$C_6$)haloalkyl, phenyl, cycloalkyl, and heterocyclyl, wherein the phenyl, cycloalkyl, and heterocyclyl groups are optionally substituted; or the two $R^1$ groups in —C($R^1$)($R^1$) may be joined together to form a ring, wherein the ring is optionally substituted;

p is an integer from 1 to 10; and
q is an integer from 1 to 10.

In one embodiment, at least one of $Ar_1$, $Ar_2$, $Ar_1'$ or $Ar_2'$ is substituted with at least one carbon-containing $R^1$ group such that the carbon of the $R^1$ group bonded to the $Ar_1$, $Ar_2$, $Ar_1'$ or $Ar_2'$ ring contains a hydrogen. In one embodiment, $R^1$ is —CH$_3$. In one embodiment, at least one occurrence of $Ar_1$, $Ar_2$, $Ar_1'$, or $Ar_2'$ is substituted with an $R^1$ group comprising a benzylic hydrogen. In one embodiment, at least one occurrence of Q or Q' includes a carbonyl group. In one embodiment, the carbonyl group is a ketone.

In one embodiment, A is —$Ar_1$-Q-$Ar_2$—, and B is —$Ar_1'$-Q'-$Ar_2'$—. In another embodiment, $Ar_1$, $Ar_2$, $Ar_1'$ and $Ar_2'$ are each phenyl, wherein each phenyl is independently optionally substituted with 1-2 $R^1$ groups. In another embodiment, Q and Q' are each independently selected from the group consisting of —C(=O), —S(=O)$_2$—, —(CH$_2$)$_p$, —C(CH$_3$)$_2$—, —P(=O)C$_6$H$_5$—, —C(CH$_3$)(CF$_3$)—, and —C(=O)C$_6$H$_4$C(=O)—, and p is 1.

In one embodiment, A is —$Ar_1$-Q-$Ar_2$—, B is —$Ar_1'$-Q'-$Ar_2'$—, $Ar_1$, $Ar_2$, $Ar_1'$ and $Ar_2'$ are each phenyl, wherein each phenyl ring is independently optionally substituted with at least one $R^1$ group. In another embodiment, in $Ar_1$, Q may be in the para-position with respect to the —O— group, and in $Ar_2$, Q may be in the para-position with respect to the —O— group, resulting in para-para (p-p) substitution. A non-limiting example of para-para substitution can be found in TMBPA-BP polymer (FIG. 1). In other embodiments, the substitution may be para-meta (p-m), meta-para (m-p), or meta-meta (m-m). Similarly, the substitution of Q' on $Ar_1'$ and $Ar_2'$ with respect to the —O— group may be para-para (p-p), para-meta (p-m), meta-para (m-p), or meta-meta (m-m). In one embodiment, Q and O are not bonded to adjacent carbons on $Ar_1$ or $Ar_2$, and Q' and O are not bonded to adjacent carbons on $Ar_1'$ or $Ar_2'$.

In another aspect, the PAE precursors of the present invention are comprised of a polymer having the structure of formula (II):

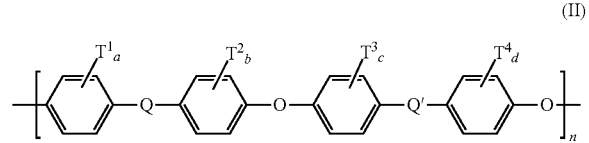

wherein in formula (II):

each occurrence of $T^1$, $T^2$, $T^3$, and $T^4$ is independently selected from the group consisting of H, halo, —CN, —$SO_3H$ or a salt thereof, and —$C_1$-$C_{10}$ alkyl;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

a is an integer from 0 to 4;
b is an integer from 0 to 4;
c is an integer from 0 to 4;
d is an integer from 0 to 4;
p is an integer from 1 to 10; and
q is an integer from 1 to 10.

In one embodiment, at least one of a, b, c, or d is an integer from 1-4, and at least one of $T^1$, $T^2$, $T^3$, or $T^4$ is a carbon-containing group such that the carbon of the R$^1$, R$^2$, R$^3$, or R$^4$ group bonded to the phenyl ring contains a hydrogen. In one embodiment, $T^1$ is —CH$_3$. In one embodiment, $T^2$ is —CH$_3$. In one embodiment, $T^3$ is —CH$_3$. In one embodiment, $T^4$ is —CH$_3$. In one embodiment, at least one occurrence of $T^1$, $T^2$, $T^3$, or $T^4$ comprises a benzylic hydrogen, and at least one occurrence of Q or Q' includes a carbonyl group.

In one embodiment, Q is —C(CH$_3$)$_2$—, and Q' is —C(=O)—. In another embodiment, Q is —C(CH$_3$)$_2$—, and Q' is —C(=O)C$_6$H$_4$C(=O)—. In another embodiment, Q is —(CH$_2$)$_p$, Q' is S(=O)$_2$—, and p is 1. In another embodiment, Q is —C(CH$_3$)$_2$—C$_6$H$_4$—C(CH$_3$)$_2$— and Q' is —C(=O)—. In another embodiment, Q is —C(CF$_3$)(C$_6$H$_4$)— and Q' is —C(=O)—.

Figure 2:
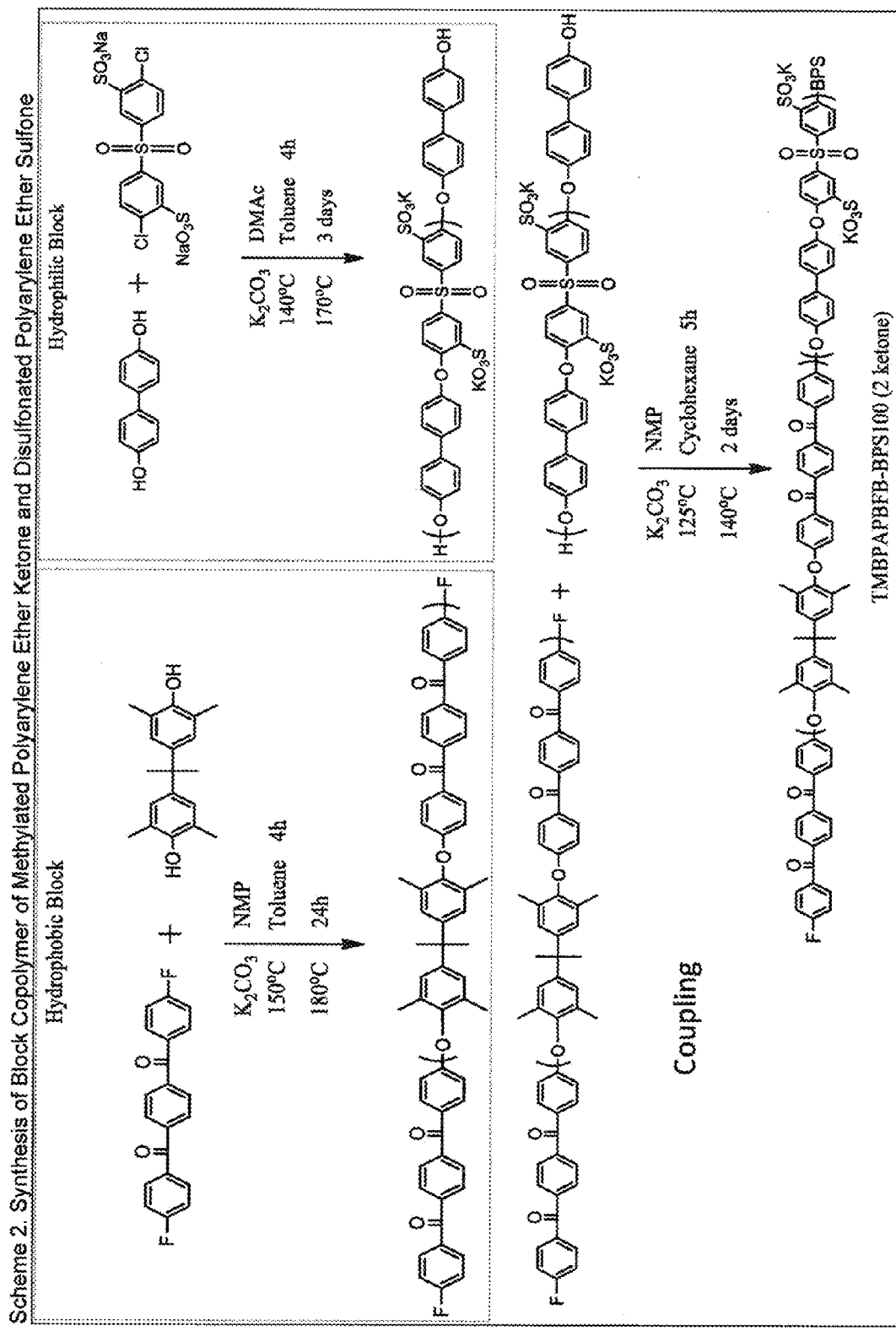
FIG. 2 is a diagram of a scheme for the synthesis of a copolymer of the present invention.

In one embodiment, the polymer of the present invention may further comprise functional groups which serve to allow tailoring of properties based on hydrophilic and hydrophobic component ratios. In one embodiment, at least a portion of the arylene groups of the polymer may be modified with such groups. In one embodiment, the groups are sulfonic acid groups. An example of such an embodiment is shown in FIG. 2, which depicts the synthesis of a block copolymer of methylated polyarylene ether ketone and disulfonated polyarylene ether sulfone. In another embodiment, the groups are carboxylic acid groups. In various embodiments, the polymer can be modified with appropriate groups to result in a polymer with water sorption properties from nearly 0% to nearly 100% water sorption.

In one embodiment, the PAE precursors of the present invention are used to form a crosslinked PAE composition. In one embodiment, the polymer of the present invention comprises at least one crosslink formed via a reaction between a benzylic hydrogen and a Q or Q' carbonyl group. It is contemplated herein that when the PAE precursor structures described herein, for example, the structures described generally by formulae I through VIII, are at least partially crosslinked, at least a portion of the PAE precursor structure will be modified according to a crosslinking reaction. Accordingly, the present description and the claims are not meant to be limited to the specific precursor structures described herein, and it would be understood by a person skilled in the art that the compositions of the present invention can include polymers made from the PAE precursors that include crosslinked portions.

In one embodiment, the compositions of the present invention can include a blend of two or more polymers. As would be understood by a person skilled in the art, the blend can include two or more polymers of the present invention, or the blend can include one or more polymers of the present invention and one or more additional polymers. Non-limiting examples of additional polymers that can be blended with the one or more polymers of the present invention are poly(2,6 dimethylphenylene oxide) (PPO) and polysulfones. In one embodiment, the blend can include at least one crosslink between two or more polymers of the present invention. In another embodiment, the blend can include at least one crosslink between a polymer of the present invention and an additional polymer. In one embodiment, the blend composition of the present invention can include at least one crosslinked polymer of the present invention blended with one or more polymers that are not crosslinked, wherein the one or more additional polymers form an interpenetrating network (IPN) with the at least one crosslinked polymer of the present invention. In one embodiment, the one or more additional polymers are preferably blended with the at least one polymer of the present invention prior to crosslinking. As would be understood by a person skilled in the art, blending the polymers of the present invention with other polymers can be desirable for a number of reasons, including, but not limited to, decreasing the overall cost of a composition or modifying the properties of a composition.

Copolymers

Figure 3:
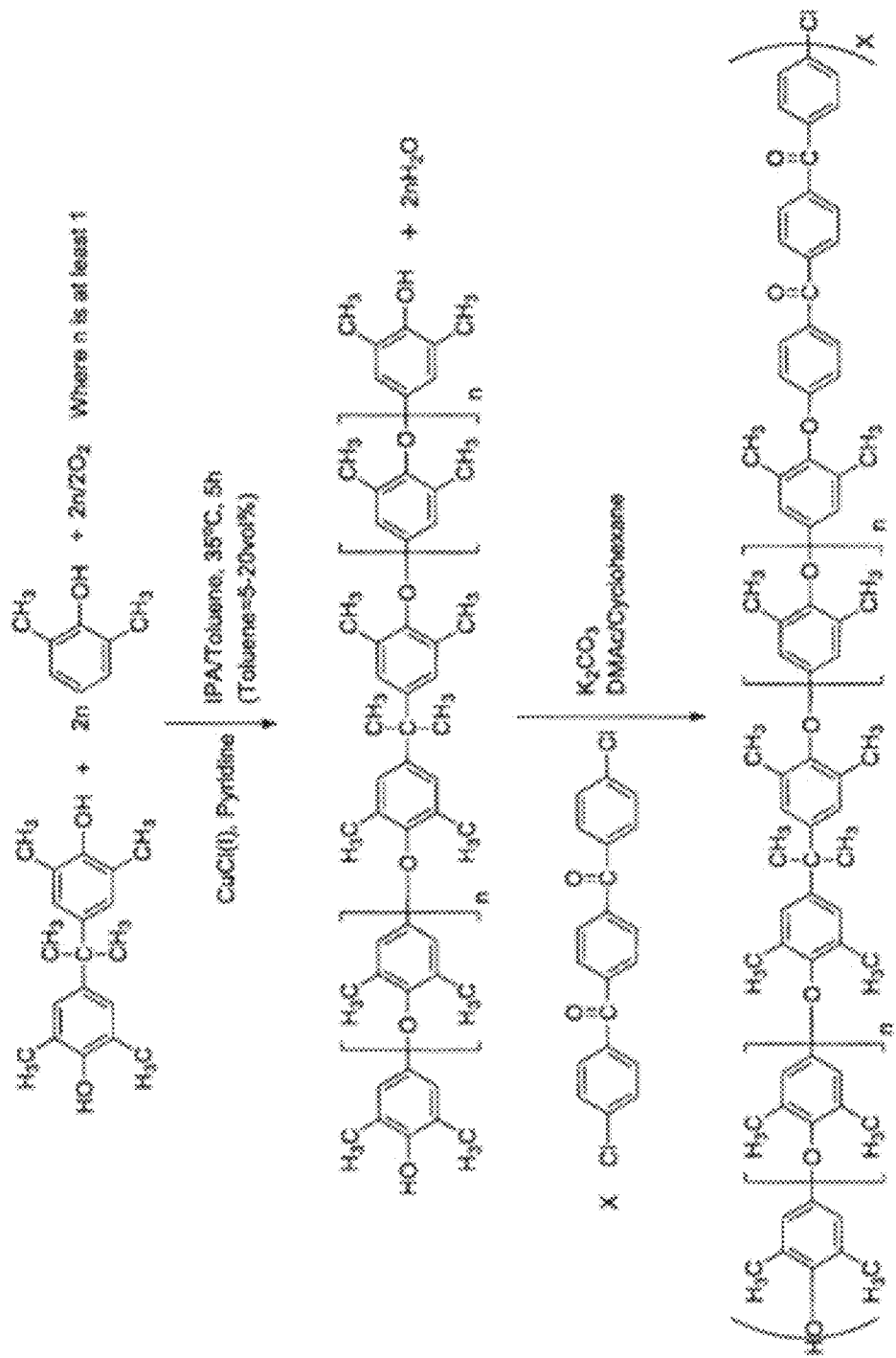
FIG. 3 is a diagram of another scheme for an exemplary synthesis of a copolymer useful for making the membranes of the present invention.
Figure 4:
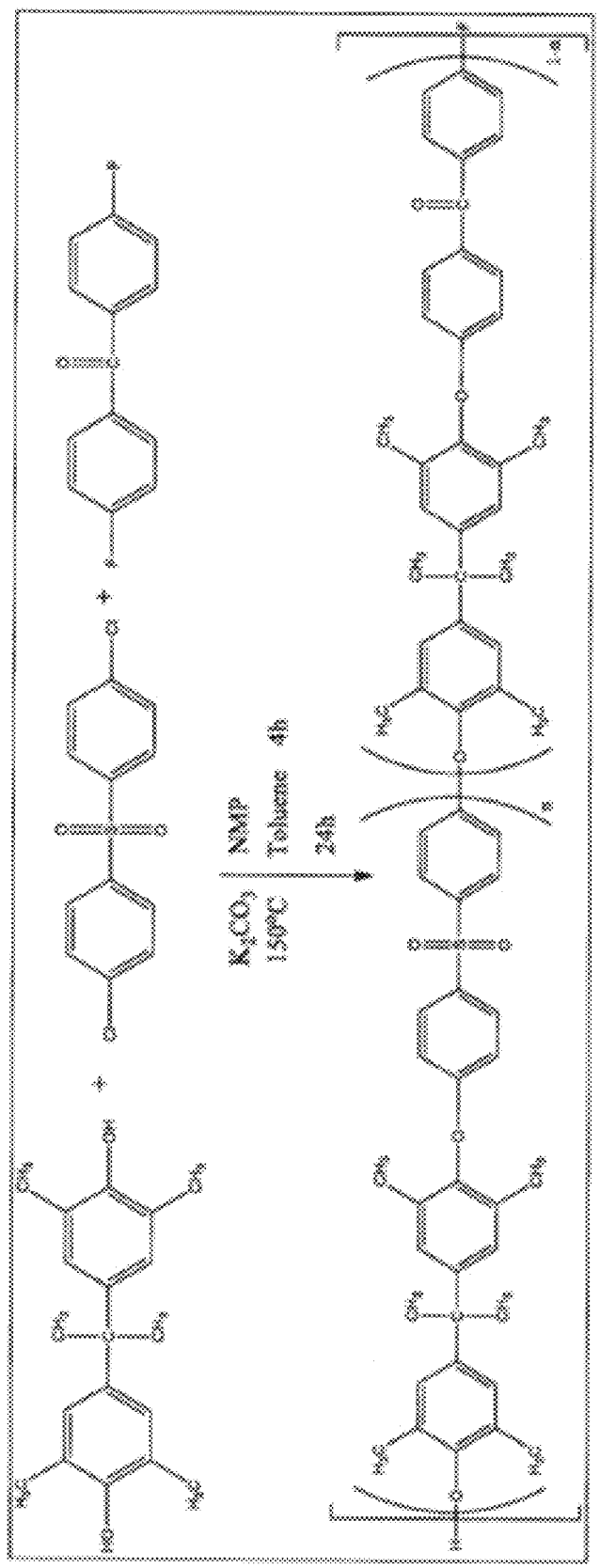
FIG. 4 is a diagram of yet another scheme for an exemplary synthesis of a copolymer of the present invention.

In one embodiment, the present invention also relates to compositions of copolymers comprising PAEs. One skilled in the art would recognize that a wide variety of synthetic strategies are available for providing suitably reactive PAE polymers synthesized from a mixture of monomers to give various types of copolymers, for example random (statistical) or block copolymers. In one embodiment, this can be achieved by synthesizing polymer precursors from monomers containing different phenylene oxide components. An example of such is shown in FIG. 3, which depicts the synthesis of a difunctional 2,6-dimethylated polyphenylene oxide by oxidative coupling and chain extension with a ketone-containing dihalide. Alternatively, a copolymer can be made by the well-known route of mixing monomers so as to give a statistical distribution of the monomers in the final copolymers. An example of such is shown in FIG. 4, which depicts the synthesis of a tetramethylated polysulfone-co-ketone statistical copolymer.

Accordingly, in one aspect, the present invention relates to copolymers comprising structural units (A-O) and (B—O), wherein A is selected from the group consisting of:
—Ar$_1$-Q-Ar$_2$—, —Ar$_1$—, and —Ar$_1$—Ar$_2$—;

B is selected from the group consisting of:
—Ar$_1$'-Q'-Ar$_2$'—, —Ar$_1$'—, and —Ar$_1$'—Ar$_2$'—;

Ar$_1$, Ar$_2$, Ar$_1$', and Ar$_2$' are each independently a bivalent $C_5$-$C_{24}$ arylene or a bivalent $C_5$-$C_{24}$ heterocyclic ring, and wherein the arylene or heterocyclic ring is independently optionally substituted with at least one R$^1$ group each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted p is an integer from 1 to 10; and q is an integer from 1 to 10.

The copolymer composition may comprise one or more additional structural units, i.e., the copolymer may comprise three or more types of structural units. As would be understood by a person skilled in the art, the additional structural units can be described in the same manner as (A-O) and (B—O) above. For example, in one embodiment, the copolymer may further comprise a structural unit (D-O), wherein D is selected from the group consisting of:

—Ar$_1$"-Q"-Ar$_2$"—, —Ar$_1$"—, and —Ar$_1$"—Ar$_2$"—;

wherein Ar$_1$" and Ar$_2$" are each independently a bivalent C$_5$-C$_{24}$ arylene or a bivalent C$_5$-C$_{24}$ heterocyclic ring, and wherein the arylene or heterocyclic ring is independently optionally substituted with at least one $R^1$ group;

Q" is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted;

p is an integer from 1 to 10; and q is an integer from 1 to 10. In one embodiment, at least one occurrence of Ar$_1$, Ar$_2$, Ar$_1$', Ar$_2$', Ar$_1$", or Ar$_2$", or any other Ar group from additional structural units, is substituted with an $R^1$ group comprising a benzylic hydrogen, and at least one occurrence of Q, Q', or Q", or any other Q linkage, includes a carbonyl group.

Methods for Producing PAE Polymers

While the present invention is not limited by this route, the PAE polymers can be synthesized from the corresponding diols: HO—Ar$_1$-Q-Ar$_2$—OH, HO—Ar$_1$—OH, or HO—Ar$_1$—Ar$_2$—OH; and leaving-group-containing monomers of the type: X—Ar$_1$'-Q-Ar$_2$'—X, X—Ar$_1$'—X, or X—Ar$_1$'—Ar$_2$'—X, wherein X is a leaving group such as Cl or F.

Whereas the above method can be considered a nucleophilic route, the PAEs of the present invention can be generated by either nucleophilic step polymerization or electrophilic aromatic substitution as reviewed by Guo and McGrath (Aromatic polyethers, polyetherketones, polysulfides, and polysulfones, Polymer Science: A Comprehensive Reference, Matyjaszewski, K. and Möller, M., eds. Elsevier BV, Amsterdam, 2012, Vol. 5: 377-430, which is hereby incorporated by reference in its entirety). The nucleophilic route is preferred because it is more commercially viable and produces predictable macromolecular structures.

Figure 5A:
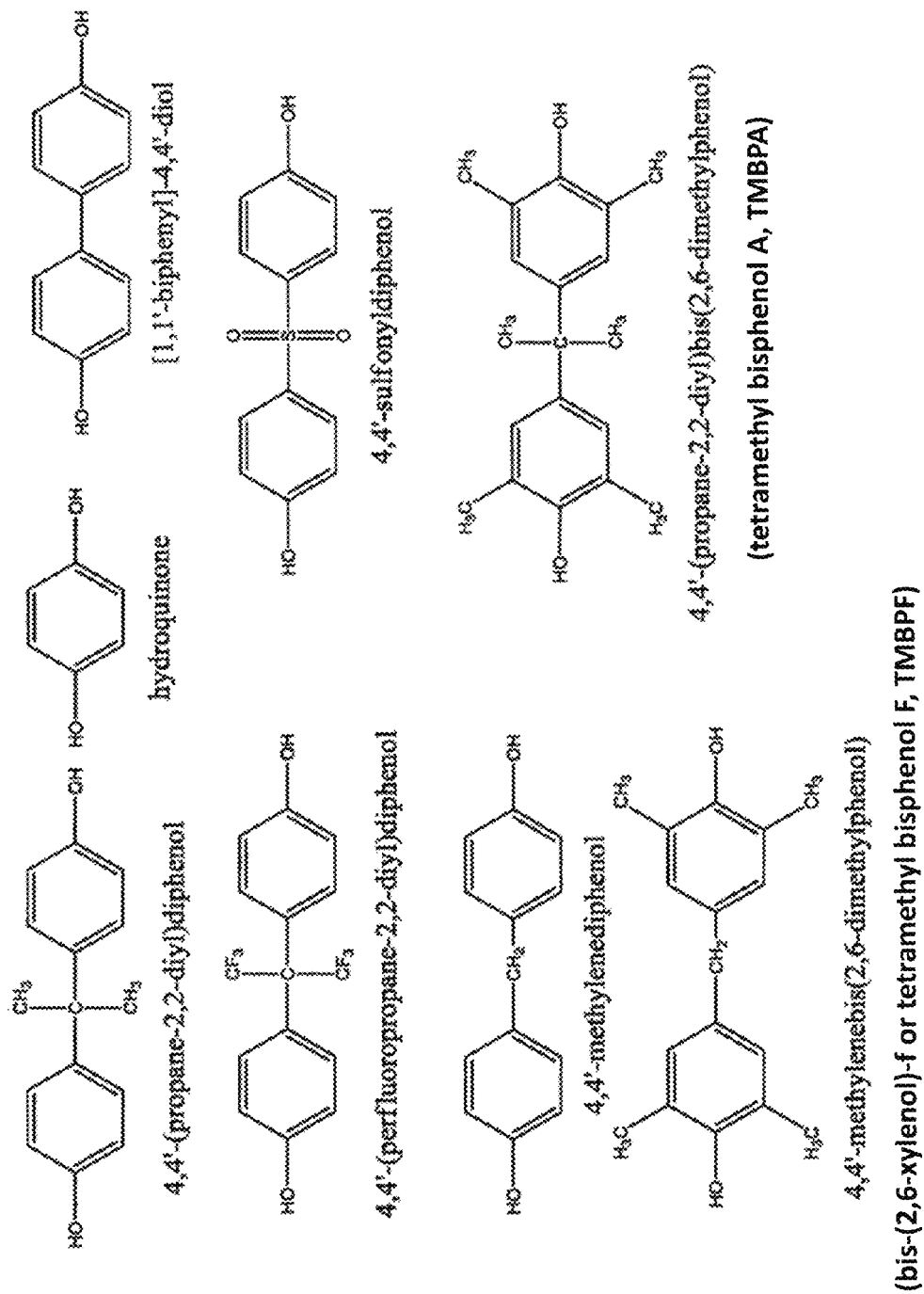

The PAEs of the present invention can be synthesized from monomers produced by reacting a bisphenol, or other aromatic diol, with an aromatic dihalide. A variety of different bisphenols or aromatic diols may be used, such as, but not limited to: hydroquinone, 4,4'-(propane-2,2-diyl) diphenol, biphenyl-4,4'-diol, 2,2-bis-(4-hydroxyphenyl)-hexafluoropropane, 4,4'-dihydroxydiphenylsulfone, 4,4'-methylene diphenol, 4,4'-cyclohexylidenebisphenol (Bisphenol Z), 1,1-bis(4-hydroxyphenyl)-3,3,5-trimethylcyclohexane (Bisphenol TMC), 3,3-bis(4-hydroxyphenyl)-2-phenyl-2,3-dihydro-1H-isoindol-1-one (PPPBP), 4,4'-cyclohexylidenebis(2-methylphenol), 4,4'-(1,3-dimethylbutylidene)diphenol (Bisphenol MIBK), 4,4;-(1-methylpropylidene)diphenol (Bisphenol B), 4,4'-isopropylidenebis(2-phenylphenol) (BisOPP-A), and 4,4'-isopropylidenebis(2-cyclohexylphenol) (BisOCHP-A). Alkylated versions of these bisphenols, such as 4,4'-isopropylidene bis(2,6-dimethylphenol) (TMBPA) are especially preferred. Many of these alkylated bisphenol monomers can be formed by reaction of 2,6-xylenol via electrophilic aromatic substitution with symmetrical or asymmetrical ketones or formaldehydes. It has been especially demonstrated that alkylated bisphenols such as TMBPA, or similar derivatives, result in compositions that are highly permeable to gases such as $O_2$, $N_2$, $H_2$, $CO_2$, and $CH_4$. Representative structures of applicable bisphenol compounds that may be used to synthesize the compositions of the present invention are shown in FIGS. 5A and 5B.

Figure 6A:
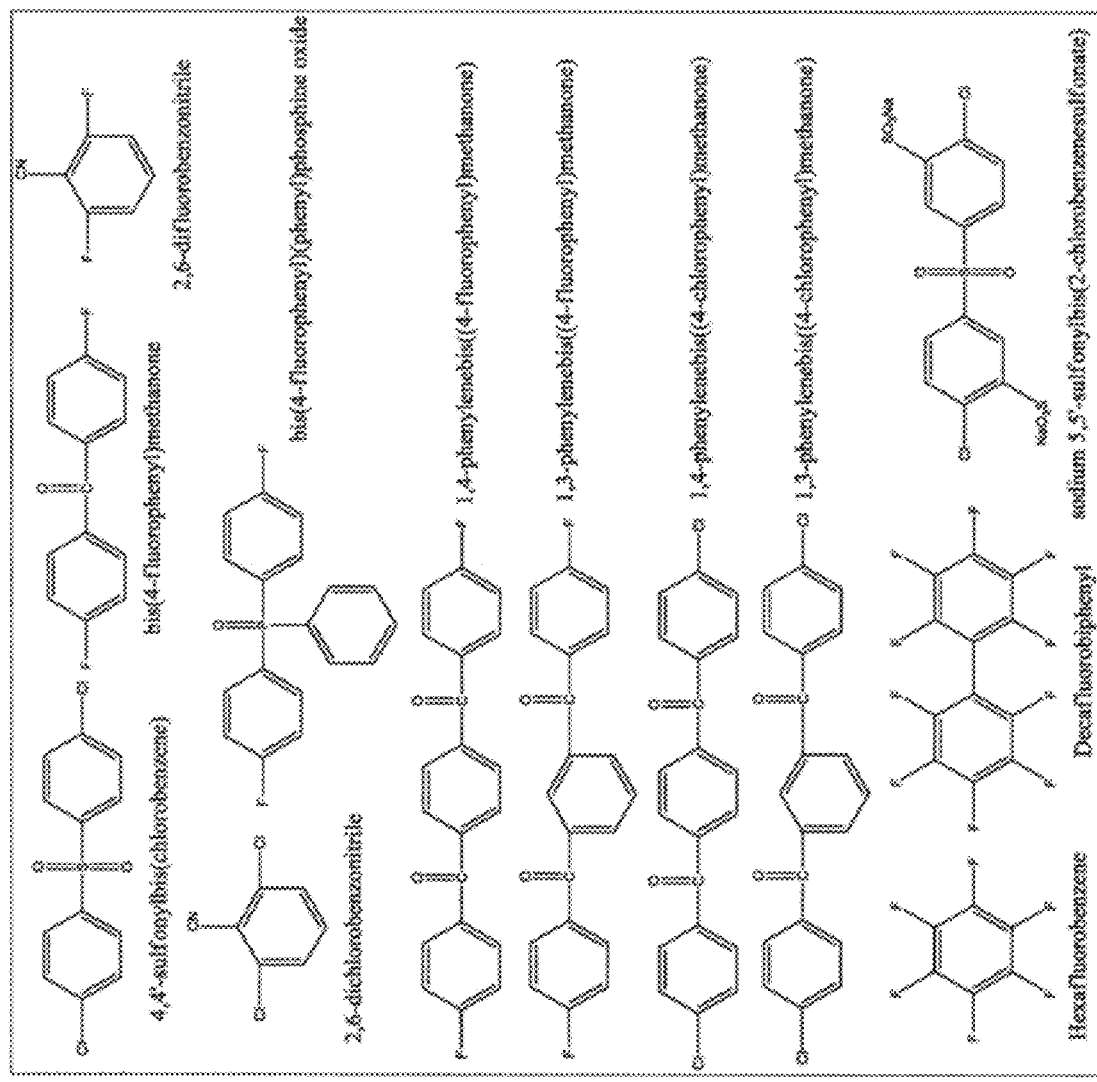
FIGS. 6A through 6C, is a series of diagrams of exemplary activated dihalide compound structures useful for making the compositions of the present invention (FIGS. 6A and 6B) and a diagram showing the synthesis of TMDBPA-PBFB from TMDBPA and PFBP (FIG. 6C).
Figure 6B:
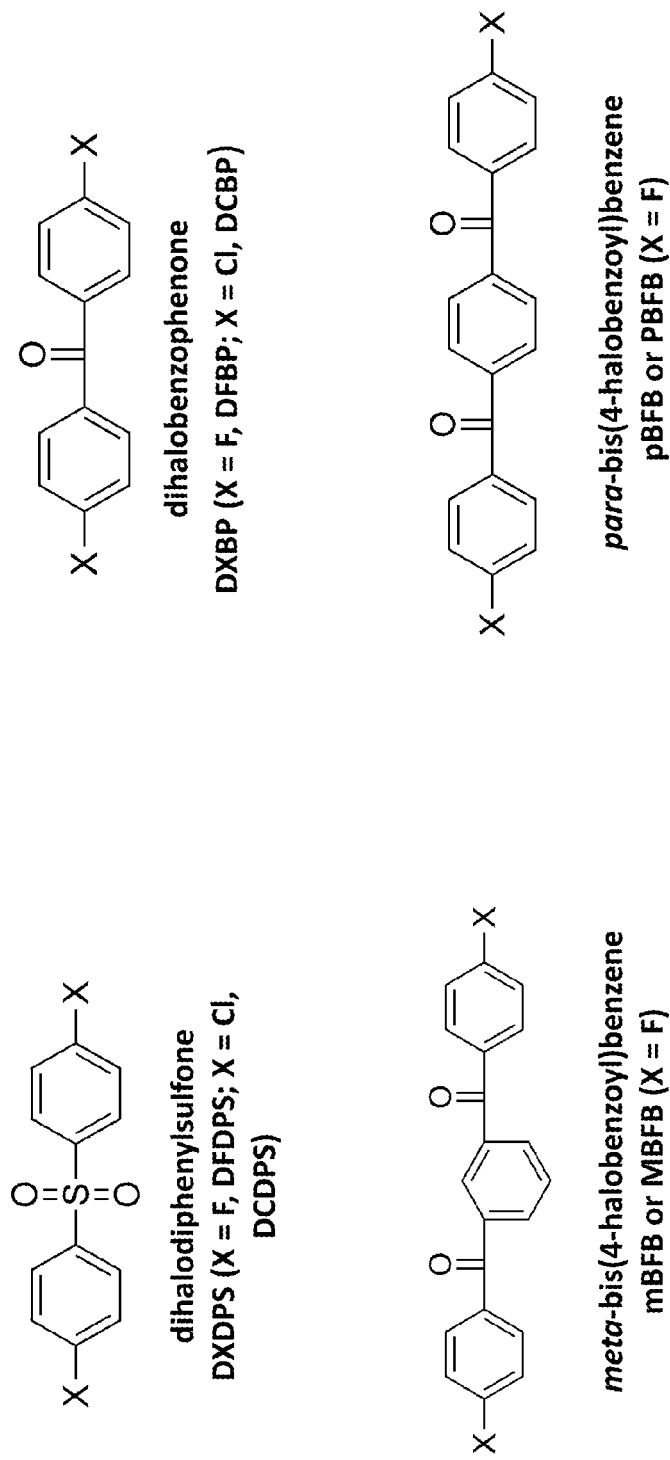

The aromatic dihalide used to synthesize the PAEs of the present invention may be selected from a variety of compounds, such as, but not limited to: 2,6-dichlorobenzonitrile, 2,6-difluorobenzonitrile, 4,4'-difluorobenzophenone, 1,4-phenylene-bis(4-fluorophenyl)methanone, 1,3-phenylenbis(4-fluorophenyl)methanone, 1,4-phenylenebis(4-chlorophenyl)methanone, 1,3-phenylenebis(4-chorophenyl) methanone, bis(4-fluorophenyl)phenylphosphine oxide (BF-PPO), or related activated halides well known to those skilled in the art. Representative structures of applicable activated dihalides are shown in FIGS. 6A and 6B.

Figure 6C:
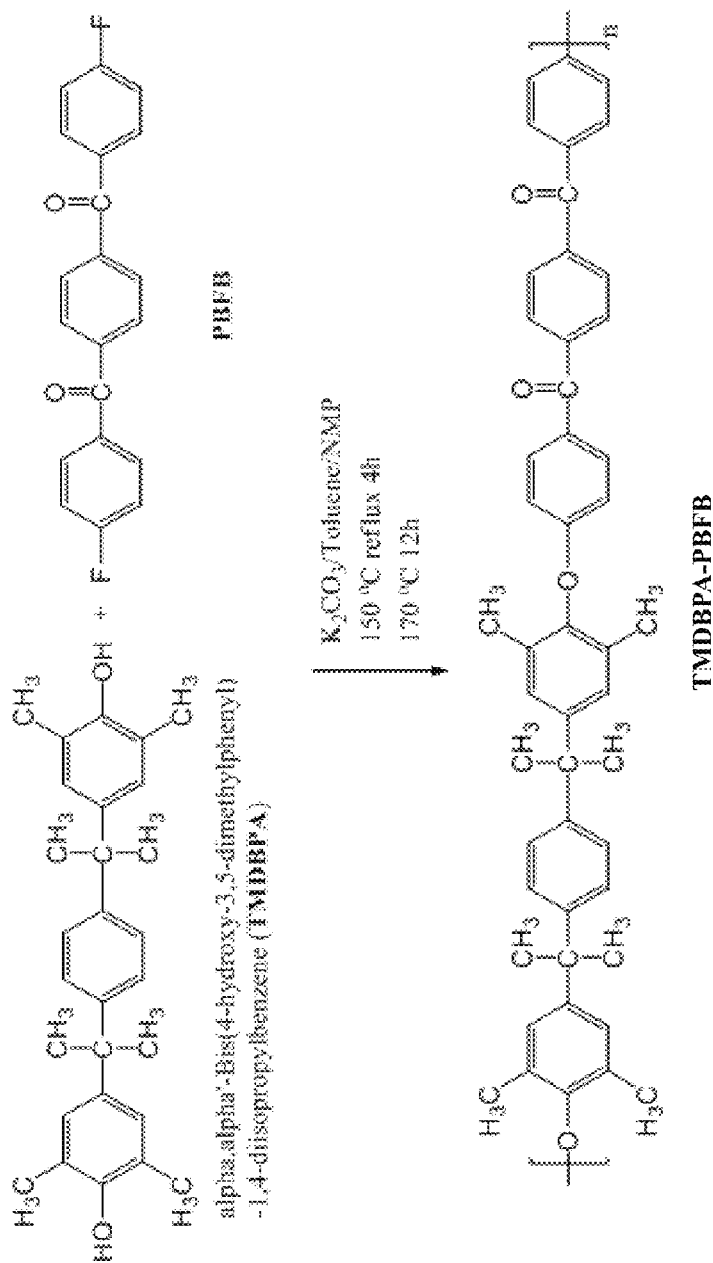

In one embodiment of the present invention, a methylated polyarylene ether ketone suitable for crosslinking may be synthesized using a methylated bisphenol and a ketone containing activated dihalide. An example of such is shown in FIG. 1, which shows the synthesis of TMBPA-BP from TMBPA and DFBP. A second example is shown in FIG. 6C, which shows the synthesis of TMDBPA-PBFB from TMDBPA and PFBP.

Membranes for Fluid Separation

In various embodiments, the present invention relates to membranes for gas separation applications comprising PAE polymers. In a preferred embodiment, the membranes of the present invention comprise a crosslinked polyarylene ether composition. In another embodiment, the membranes comprise a polyarylene ether composition that is not crosslinked. The membrane of the present invention is particularly useful for separating fluid (i.e., gas and/or liquid) components. In one embodiment, the present invention relates to a system or module comprising at least one gas separation membrane. The systems of the present invention may comprise membranes in a variety of embodiments that are well known in the art, such as, but not limited to: hollow fibers, spiral wound membranes, or flat sheets or films. In one embodiment, the PAE polymers of the present invention can be used in membranes or fibers for separating or purifying a gas, liquid, or gas/liquid mixture. In one embodiment, the membranes or fibers comprising a composition of the present invention can be used in water purification or treatment systems.

The molecular weight of the polymer is important in the formation of a membrane. In one embodiment, the polymers of the present invention have a molecular weight above the entanglement molecular weight of the polymer to achieve materials that have high strength and are not brittle. If the molecular weight of the polymer is too low the membrane can be too brittle. If the molecular weight is too high, processability can become difficult. The polymers of the present invention preferably have an average molecular weight of from 10,000 to 400,000, more preferably from 20,000 to 350,000, still more preferably from 25,000 to 300,000.

The membranes produced from the polymer of the present invention can take any form known in the art, for example hollow fibers, tubular shapes, spiral wound, pleated, flat sheet, or polygonal tubes. A preferred form for the hollow fiber membranes is integrally skinned or composite asymmetric hollow fibers, which provides both a very thin selective skin layer and a high packing density, to facilitate use of large membrane areas. Multiple hollow fiber membrane tubes are preferred for their relatively large contact area. The contact area may be further increased by adding additional tubes or tube contours.

Hollow fibers can be formed, for example, by extruding a polymer solution through an annular capillary nozzle, e.g., a spinneret, with a core fluid used for the purpose of retaining the hollow fiber geometry. The process involves the phase inversion of a solution including the polymer of the present invention. A phase inversion process is a known film formation technique in which a polymer solution is brought into contact with a coagulation bath to cause phase inversion. The phase inversion process described by Loeb et al., in U.S. Pat. No. 3,133,132, which is hereby incorporated by reference in its entirety, involves forming a polymer solution into film, evaporating the solvent from the film of the polymer solution, which can lead to the development of a dense layer, then immersing the film into a coagulating bath (a solvent miscible with the solvent of the polymer solution and non-solvent for the polymers (incapable of dissolving the polymer)) to induce phase separation thereby to form fine pores, which can lead to the formation of a porous support layer. The dense layer has such denseness as to have substantially different permeation rates depending on gas species and therefore functions to separate gas species. On the other hand, the porous support layer has such porosity as to have practically no gas separation functionality.

An asymmetric hollow fiber membrane can be provided by extruding a solution of glassy polymer through a spinneret into hollow fiber geometry. The glassy polymer solution is forced through a spinneret with a core fluid used for the purpose of retaining the hollow fiber geometry. Immediately thereafter, the extruded hollow fibers are passed through an air or nitrogen gas atmosphere and then immersed in a coagulation bath substantially incapable of dissolving the polymer components and compatible with the solvent of the glassy polymer solution to form an asymmetric structure. Subsequently, the hollow fibers are dried and, if desired, heat treated to make a separation membrane.

These fibers typically have a diameter similar to a human hair and offer the advantage of very high surface area per unit volume. Industrial hollow fiber membrane modules typically contain up to hundreds of thousands of individual hollow fibers. Specifically, to maximize productivity, the hollow fibers typically include an ultrathin (<2000 Angstroms) dense layer on a porous support. Gas separation is accomplished through this selective dense layer. This selective dense layer may be supported on the same polymer to form an integrally skinned asymmetric hollow fiber membrane. The selective dense layer may be located on either the outer or inner surface of the hollow fiber. Some membranes have an asymmetric sheath with the selective dense layer supported on an inexpensive porous core support layer (different polymer) to form a composite hollow fiber membrane as described in U.S. Pat. No. 5,085,676, which is hereby incorporated by reference in its entirety. The glassy polymers of the present invention can be used both as dense layer and support layer for the hollow fiber membrane.

In order to stably maintain the hollow fiber shape immediately after the extrusion, the glassy polymer solution to be extruded through the spinneret can have a solution viscosity of 20,000 to 300,000 centipoise, preferably 30,000 to 250,000 centipoise, more preferably 40,000 to 200,000 centipoise, at the spinning temperature of between 25° C. to 100° C. Coagulation can be carried out by first immersion in a first coagulation bath where the membrane is coagulated to an extent enough to retain its hollow fiber shape, taking up the membrane by a guide roll, and a second immersion in a second coagulating bath, and optionally into additional successive baths, where the membrane is thoroughly coagulated and effectively washed to remove solvent and nonsolvents. The hollow fiber membranes can then undergo a drying process to remove the coagulating liquid.

Selection of the glassy polymer solutions or polymer matrix/additive mixture solutions for use in the production of the membrane depends on the solubility characteristics of the polymer or polymer matrix/additive, and the viscosity requirement of the solution. Typically, the amount of polymer or polymer matrix/additive in solution can vary from about 10 to about 60 weight percent, preferably from about 15 to about 50 weight percent, more preferably from about 20 to about 45 weight percent. If the concentration is too low and solution has low viscosity, the membrane is prone to have defects during phase inversion process. If the concentration of is too high and the solution has high viscosity, the membrane tends to have thicker dense layer or reduced porosity as porous support layer resulting in reduced rate of permeation.

A viscosity enhancing agent or viscosity enhancing salt may be useful for making a polymer solution suitable for spinning into hollow fibers.

Typical solvents for the glassy polymer solutions include, but are not limited to, solvents such as dimethyl formamide, N,N-dimethylacetamide, N-methylpyrrolidone, dimethyl sulfoxide, and the like.

Mixtures of solvents also may be used in the glassy polymer solutions employed to form the layers of the membrane. The specific mixture of solvents may vary depending on the solubility parameters of the polymer and the viscosity of the solution. For example, two or more solvents may be used which vary in volatility or solvation power.

The solvent mixture can also contain additional components, such as polymer swelling agents, and nonsolvent components. These added components may be useful, for example, to achieve a desired anisotropy in a layer by moving the polymer solution closer to its point of incipient gelation. These additional components may be characterized as extractable or nonextractable in the coagulation bath.

Extractable components, that is, materials which are extractable in an aqueous-based coagulation bath, may be useful, for example, as pore formers in a layer. Examples of extractable components include inorganic salts, and polymers, such as polyvinyl pyrrolidone. Nonextractable components may find utility as, for example, membrane permeation modifiers. Nonextractable materials vary in composition dependent on whether the end use of the polymer is the dense separating layer or the porous support layer, the composition of the polymer, solvent mixture and coagulation bath. Examples of the additional components which may be employed include, for example, discrete monomeric materials which are insoluble in the composition of the coagulation bath, polymerizable materials, such as moisture-curable siloxanes, and compatible or non-compatible polymers. These examples of additional components are merely illustrative and should not be considered limiting.

Suitable coagulation baths for the membranes vary depending on the composition of the polymer solutions employed and the results desired. Generally, the coagulation bath is miscible with the solvents of the polymers, but is a non-solvent for the polymers of each layer. However, the coagulation bath may be varied to achieve desired properties in the layer. This may be desirable depending on the solubility parameters of the dense layer polymer, or when specialized membrane configurations are desired. For example, the solvent of the dense layer polymer solution may be immiscible in the coagulation bath whereas the solvent of the support layer polymer solution may be miscible in the coagulation bath. A coagulation bath therefore may be a multicomponent mixture of water and an organic solvent that is miscible with water and the solvent to be removed from the polymer. The temperature and composition of the bath also may be controlled to affect the extent and rate of coagulation. The desired coagulation media is water as it is nontoxic, nonflammable, low cost and usually an excellent coagulation media for the polymers. Water/alcohol mixtures or other water mixtures with soluble organic species to optimize the membrane properties can also be considered.

In one embodiment, the system of the present invention may comprise a shell-side feed, single-ended hollow fiber membrane module, wherein the permeated gas leaves the bores at one open-end, while the opposite end of bores are closed. Such a module is typically used in high pressure applications, such as $H_2$ recovery in refinery, petrochemical and ammonia purge applications, with transmembrane pressure differentials on the order of 500+ psid (pressure differential in pounds per square inch). Further, in such an embodiment, a high-strength pressure vessel, typically a heavy-schedule steel, flanged vessel, is needed.

In another embodiment, the system of the present invention may comprise a double-ended hollow fiber membrane module, wherein the bores are open at both ends. Such a module is preferred in lower pressure applications, such as air separation, with typical transmembrane pressure differentials <350 psid. In such an embodiment, the hollow fiber itself can serve as the pressure vessel. Further, in such an embodiment, light-weight module shell materials, such as aluminum or ABS plastic can be used because the permeate flows on the outside of the fiber at or near atmospheric pressure.

The gas separation systems or modules of the present invention can include designs or configurations that are well known in the art. In one embodiment, the system or module of the present invention is a one-stage or single-stage system. In another embodiment, the system is multi-stage. Further, in such a multi-stage or cascade design, the system can include the recycling and/or recompression of either the permeate or reject gas streams from a module stage. It is contemplated that one skilled in the art will recognize that the design and configuration of the gas separation systems of the present invention can be modified based on the purity, recovery, and/or economic requirements of the desired application.

In various embodiments, the module design chosen for a particular application can use either counter-current, co-current or cross-flow patterns of flow of the feed gas relative to the permeated gas within the module.

In one embodiment, a sweep gas can be used on the permeate side of the membrane in the module. In such an embodiment, the sweep gas can be used to maximize available transmembrane driving force for the separation, by enhancing removal of permeated gas out of the module. Air dehydration is one example where a sweep of the permeate side of the module is desirable, e.g., to enhance removal of permeated moisture. In such an example, a sweep using a dry gas serves to minimize the partial pressure of moisture on the downstream permeate side of the membrane. In such a swept design, an appropriately small amount of the dry product gas leaving the module is diverted via piping to sweep the permeate side of the module under countercurrent or near-countercurrent flow conditions, with the sweep gas flow direction being opposite the feed gas flow through the upstream side of the membrane.

The membranes or systems of the present invention can be used to separate a mixture of two or more fluids, preferably gases. The mixture of two or more gases may comprise a variety of gases as would be understood by a person skilled in the art, such as, but not limited to: helium or other noble gases, hydrogen, oxygen, nitrogen, carbon monoxide, carbon dioxide, methane, saturated $C_2$-$C_4$ hydrocarbons, unsaturated $C_2$-$C_4$ hydrocarbons, other hydrocarbons, nitrogen trifluoride, hydrogen sulfide, and water vapor. Further, it is contemplated herein that the gases to be separated may include a gas that is readily condensable into a liquid at potential operating conditions. While in preferred embodiments the fluids to be separated are expected to be in the gas or vapor phase, it would be understood by a person skilled in the art that at least a portion of one or more of the fluids to be separated may be a liquid at the operating condition.

For example, applications for which the membranes of the present invention can be used include, but are not limited to: enrichment of air to produce oxygen-enriched or nitrogen-enriched air, hydrogen removal from nitrogen, or methane or other hydrocarbon streams; removal of carbon dioxide, hydrogen sulfide and/or water vapor from any gas, such as, for example, natural gas streams or compressed air; or removal of carbon monoxide from syngas streams. The membranes of the present invention can also be used in hydrogen separation from refinery streams and other process streams, for example, from the dehydrogenation reaction effluent in the catalytic dehydrogenation of paraffins.

In preferred embodiments, the membranes will be used in the separation of a feed fluid comprising a gas pair selected from the group consisting of $O_2$/$N_2$, $CO_2$/$CH_4$, $CO_2$/$N_2$, $H_2$/$N_2$, $He$/$N_2$, $H_2$/$CH_4$, $He$/$CH_4$, $He$/$H_2$, $H_2$/$CO_2$, $H_2O$/at least one other gas, and $He$/$CO_2$. In one embodiment, the membrane has an $O_2$/$N_2$ selectivity of at least about 6. In another embodiment, the membrane has an $O_2$/$N_2$ selectivity of at least about 7. In another embodiment, the membrane has a $H_2/N_2$ selectivity of at least about 85. In another embodiment, the membrane has a $H_2/CH_4$ selectivity of at least about 140.

The membranes of the present invention can be used for air separation, where nitrogen, the relatively non-permeating component, is enriched and available for use as a blanketing atmosphere for flammable fluid protection (such as oil, fuel, e.g., gasoline), and other flammable chemical storage and transportation. One example of this is a membrane system used onboard oil tankers to provide a blanketing nitrogen atmosphere. Enriched nitrogen produced by membranes is also used to inert fuel tanks on various types of aircraft, to minimize fire hazards. Such a membrane system is often referred to as on-board inert gas generation system (OBIGGS). Another well-known use is membranes for providing nitrogen atmospheres for perishable food and flowers. Nitrogen-enriched atmosphere blanketing using membranes is also employed for annealing, carbonizing, sintering, wave soldering, and laser cutting. Nitrogen from membranes is also employed for tire inflation.

Other uses for the membranes of the present invention include, but are not limited to: oxygen enrichment of air for use in applications such as enhanced combustion and scuba diving (i.e., production of so-called Nitrox oxygen-enriched air gas mixtures); $CO_2/CH_4$ separation, for example, natural gas separation from various natural gas sources, including landfill gas, enhanced oil recovery applications involving $CO_2$ injection and coal bed methane purification; $CO_2/N_2$ separation of flue gas to collect the $CO_2$ for environmental sequestration or other purposes; hydrogen sulfide removal from natural gas; hydrogen separation processes, including $H_2/N_2$ separation in ammonia purge gas and $H_2/CH_4$ separation for various petrochemical processes; $H_2/CO$ separation, for example in petrochemical industry applications; gas separation hybrid processes involving purification of streams for pressure swing adsorption or cryogenic separation of gases; helium purification from natural gas sources; helium recovery, for example from helium-based blimps and deep-diving applications; dehydration of compressed air or natural gas; and alkane/alkene separation, for example, the separation of propane/propylene or ethane/ethylene mixtures.

As would be understood by a person skilled in the art, the polymers useful for producing membranes suitable for gas separation applications are substantially soluble in an appropriate solvent or mixture of solvents prior to being cross-linked. Accordingly, it is contemplated that the uncross-linked polymer compositions of the present inventions are primarily amorphous rather than being highly crystalline or semi-crystalline. It is further contemplated that the membranes of the present invention will typically be formed from the polymer compositions described herein prior to cross-linking.

The membranes of the present invention can be used to separate gases at a wide range of temperatures. In one embodiment, the membranes can be used at room temperature. In another embodiment, the membranes can be used at a temperature cooler than room temperature. In yet another embodiment, the membranes can be used at a temperature higher than room temperature. The impact of operating at different temperatures can be predicted based on fundamental properties of the polymer and on generally understood concepts of physical chemistry and gas transport phenomena. For example, it is known that the diffusion of a gas in a polymer is an activated process, i.e., the rate of diffusion generally increases with increased temperature. However, solubility of a gas in a polymer tends to decrease somewhat with increased temperature.

Further, a number of trends are typically observed for the effect of temperature on gas transport characteristics in polymeric membranes. Increasing the temperature at which a gas separation membrane polymer is used, i.e., the operating temperature, generally results in an increase of the permeability of the polymer for most gases, due to the increase in diffusion of gas molecules within the polymer at higher temperature. This trend is generally observed for gases in which the solubility of the gas in the polymer is a weak function of temperature. In addition, increasing the operating temperature generally decreases the selectivity for the separation of two different gases in cases where the gas molecules differ in effective size. This trend is generally due to the fact that the diffusivity in the polymer of the larger of the two gas molecules tends to increases more quickly as the temperature increases compared to the diffusivity of the smaller gas molecule in the polymer. Conversely, as operating temperature is decreased, gas permeability tends to decrease, and selectivity for the separation of two different gases tends to increase.

An exception to these trends can occur when one gas component has significant solubility in a polymer. The solubility of such a gas in the polymer will typically decrease at higher temperature. In such a case, the decrease in solubility at higher temperature, or increase in solubility at lower temperature, for such a gas component can dominate all other effects on gas transport characteristics of the polymer membrane. Therefore, it is possible for the membrane to exhibit a higher selectivity at higher temperature, or a lower selectivity at lower temperature, than would typically be predicted. Such effects are discussed in Rowe et al. (J. of Membrane Science, 2010, 360: 58-69, e.g., FIG. 4 provides a summary of temperature effects for various gas pairs).

A person skilled in the art would recognize that an Arrhenius plot can be generated by measuring permeability values for a given gas in a given polymer at several different temperatures. An Arrhenius plot can be used to extrapolate or interpolate permeability values of a polymer for various temperatures based on relatively few measured data points. Accordingly, generating an Arrhenius plot for different gases in the same polymer enables the calculation of the selectivity of any gas pair at various temperatures. An example of such calculation is shown in Moll et al. (U.S. Pat. No. 5,452,272, see FIG. 12 and the discussion starting at Col. 20, line 61).

Crosslinking

In one embodiment, once the gas separation membrane of the present invention is formed, the polymer can be cross-linked to optimize the durability, gas separation properties, or any other property of the polymer as would be understood by a person skilled in the art. In a preferred embodiment, cross-linking of the polymers of the present invention can be induced via UV irradiation. For example, UV radiation having a wavelength in the range of about 190 to 400 nm can be used to cross-link the polymers of the present invention. It is contemplated herein that a person skilled in the art would understand how to determine an appropriate wavelength and UV irradiation method, and that the methods of cross-linking using UV irradiation are not limited to the specific methods described herein.

In another embodiment, cross-linking can be induced via another form of radiation, such as thermal energy or an electron beam, instead of, or in addition to, UV radiation.

Figure 7:
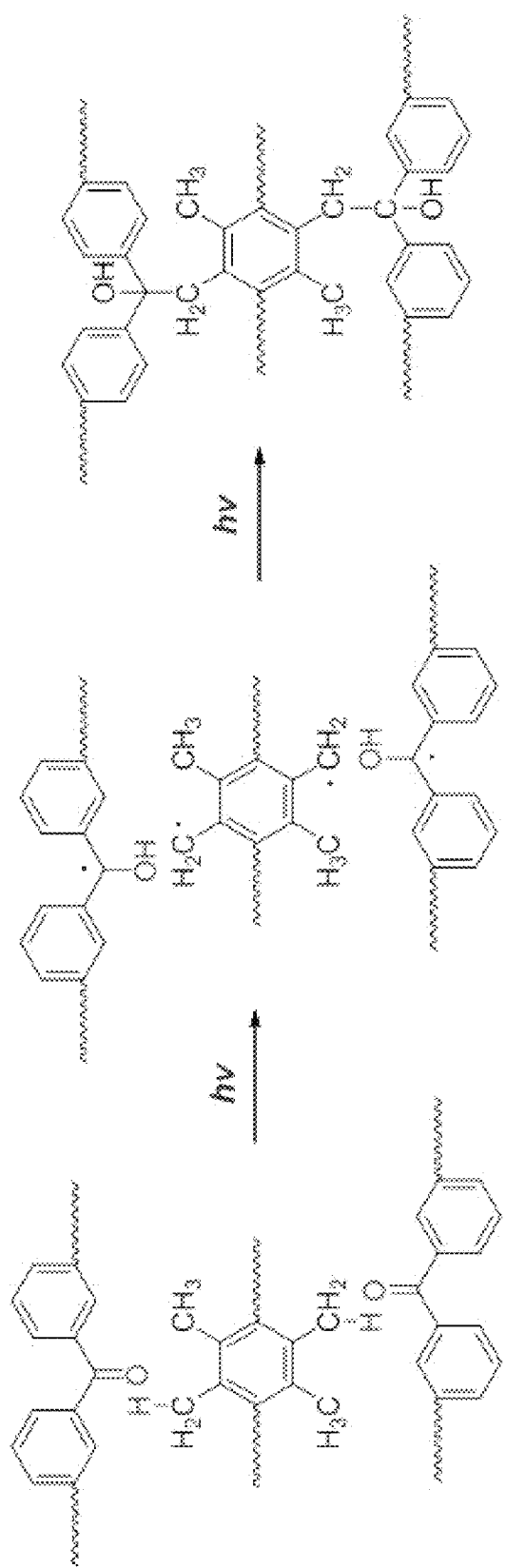
FIG. 7 is a diagram of a potential mechanism for the crosslinking of a polymer, according to one aspect of the present invention.

While not bound by theory, one crosslinking mechanism of the present invention involves a photo-excited intermediate state induced by the presence of a chromophore in the polymer backbone, which leads to a radical extraction of a hydrogen bound to a carbon directly bound to an aromatic ring, followed by crosslinking to other parts of the polymer chain. Such a proposed cross-linking mechanism is shown in FIG. 7.

In one embodiment, to facilitate crosslinking of the polymer, at least one of the arylene groups described above has at least one hydrogen bound to a carbon directly bound to the aromatic ring, i.e., a benzylic hydrogen. In such an embodiment, the polymer also has at least one Q linkage, which can also be referred to herein as Q, Q', Q'', Q''' etc. In one embodiment, the Q linkage is C(=O) or another carbonyl group. In various embodiments, the polymer of the present invention includes a chromophore portion, wherein the chromophore portion is suitable for sensitizing a benzylic hydrogen extraction reaction. A person skilled in the art would understand that the term "chromophore" can also be referred to as a "UV activator." Preferably, the polymer has at least about 2 Milli-equivalents (meq) of benzylic methyl, methylene, or methine groups per gram of polymer, and more preferably at least about 3 meq of benzylic methyl, methylene, or methine groups for gram of polymer. Preferably, the polymer has at least about 0.2 meq of a UV activator group per gram of polymer, and more preferably at least about 0.4 meq of a UV activator group per gram of polymer. The UV activator may include, but is not limited to, benzophenone. In various embodiments, the amount of benzylic hydrogens and the amount of chromophores on a polymer can be modified to affect the degree of crosslinking, as would be understood by a person skilled in the art. For example, increasing or decreasing the total amounts of benzylic hydrogens and chromophores on a polymer, or changing the amounts of benzylic hydrogens and chromophores relative to each other, can have an effect on the degree of crosslinking of a polymer of the present invention. Accordingly, the present invention is not limited to any specific examples described herein of the total or relative amounts of benzylic hydrogens and chromophores on a polymer, and the present invention can include any total amount or relative amount of benzylic hydrogens and chromophores.

In one embodiment, the compositions of the present invention may further comprise crosslinking agents. Such crosslinking agents can include low molecular weight crosslinking compounds comprising ketone functionality, or another appropriate chromophore, that can absorb energy to facilitate the crosslinking of polymers of the present invention. In one embodiment, a crosslinking agent can be used to crosslink a PAE polymer composition, wherein the PAE polymer could not otherwise be crosslinked without the use of the crosslinking agent. In another embodiment, a crosslinking agent can be used to supplement the crosslinking of a PAE polymer that has been suitably modified for crosslinking, i.e., at least a portion of the UV absorbing groups in the composition prior to crosslinking are attached to the polymer backbone.

In one embodiment, the PAE polymer can also be crosslinked using a low molecular weight bi-functional or multi-functional photoinitiator additive that is not incorporated into the polymer backbone. The additive can be used in addition to, or in place of, a photoactive monomer where Q or Q' is C(=O). A non-limiting example of such a photoinitiator is dibenzoyl benzene.

Similarly, the PAE can also be crosslinked through the use of a thermal initiator additive that is not incorporated into the polymer backbone. The thermal initiator decomposes in response to temperature instead of UV light. The membrane would be thermally cured to start the crosslinking reaction. The cure temperature is dependent on the decomposition temperature of the initiator. The additive can be used in place of the photoactive monomer where Q or Q' is C(=O). Examples of thermal initiators include, but are not limited to, tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

Additional thermal initiators and photoinitiators useful for crosslinking the polymers of the present invention can be found in The Polymer Handbook, $4^{th}$ Ed., Brandrup et al., eds., John Wiley & Sons, which is incorporated by reference herein in its entirety.

Membrane Characteristics

In one embodiment, the polymer composition of the present invention exhibits relatively high gas permeability prior to being crosslinked. In addition, the compositions of the present invention may exhibit higher flexibility after crosslinking compared to other polymers used in gas separation membranes. As would be understood by a person skilled in the art, the crosslinking of a polymer will likely reduce gas permeability. Therefore, polymers with relatively high permeability prior to crosslinking are desirable because the durability and other characteristics of the polymer may be improved via crosslinking, without resulting in a rigid, brittle, or relatively impermeable polymer. Polymers with low permeability prior to crosslinking, on the other hand, will typically not be commercially viable in gas separation membrane applications. Further, such low-permeability polymers tend to be less flexible, i.e., more brittle, after crosslinking compared to the polymers of the present invention, and, therefore, such polymers tend to have lower durability.

It would also be understood by a person of ordinary skill that the degree of crosslinking of the polymers of the present invention can significantly affect the overall performance of these polymers in gas separation membranes. A composition that is exposed to a relatively low degree of crosslinking will likely be more permeable and more flexible than the same composition that has been exposed to a relatively high degree of crosslinking. In various embodiments, the gas separation membranes of the present invention may be formed from compositions exhibiting a broad range in degree of crosslinking. In one embodiment, the gas separation membrane of the present invention comprises a composition that is not crosslinked, or is minimally crosslinked. In another embodiment, the gas separation membrane of the present invention comprises an extensively crosslinked composition. In various embodiments, different degrees of crosslinking of a polymer can be set by varying the time the composition is exposed to UV radiation, or by varying the intensity of the radiation. A relatively short UV irradiation time and/or or a low intensity typically results in a low level of crosslinking, while relatively long exposure to UV radiation and/or relatively high intensity typically results in a high level of crosslinking. As would be understood by a person skilled in the art, the UV irradiation time or intensity used to form the membranes of the present invention can be manipulated to achieve the desired gas permeability and durability of the membranes.

The degree or level of crosslinking in the polymers of the present invention can be determined using a solubility test. The gel fraction, i.e., the percent of the initial starting weight of a polymer that is insoluble in a given solvent, is indicative of the degree of crosslinking. Accordingly, the presence and level of crosslinking in a polymer of the present invention can be determined via gel fraction analysis. Further, the crosslinked polymer compositions of the present invention will demonstrate unique mechanical properties, for example in stress/strain analysis, compared to uncrosslinked polymers of the same or similar composition. As would be understood by a person skilled in the art, the crosslinked compositions of the present invention may have a degree of crosslinking suitable for gas separation membrane applications. In one embodiment, the degree of crosslinking can be any value in the range of about 0.1% to 100%. In one embodiment, the degree of crosslinking is greater than 10%. In another embodiment, the degree of crosslinking is greater than 20%. In yet another embodiment, the degree of crosslinking can be greater than 30%, 40%, 50%, 60%, 70%, 80%, or 90%. However, the degree of crosslinking of polymers of the present invention is not limited to any value listed herein. Further, it would be understood by a skilled artisan that the degree of crosslinking suitable for gas separation membrane applications can vary depending on the specific composition of the polymer. By way of non-limiting example, one embodiment of a polymer of the present invention may have a degree of crosslinking of 35%, yet that embodiment would have the same or similar permeability as a different embodiment of a polymer of the present invention with a degree of crosslinking of 90%.

In various embodiments, the compositions of the present invention may be characterized by analytical methods other than gel fraction analysis. For example, the polymers of the present invention can be characterized by NMR prior to cross-linking, or by solid-state NMR after crosslinking. In addition, the polymers of the present invention can be analyzed by any method known to those skilled in the art, for example, but not limited to: differential scanning calorimetry (DSC), thermogravimetric analysis (TGA), dynamic mechanical analysis (DMA), FT-IR, or UV/Vis spectroscopy.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1

Synthesis of TMBPA-BP

Figure 8:
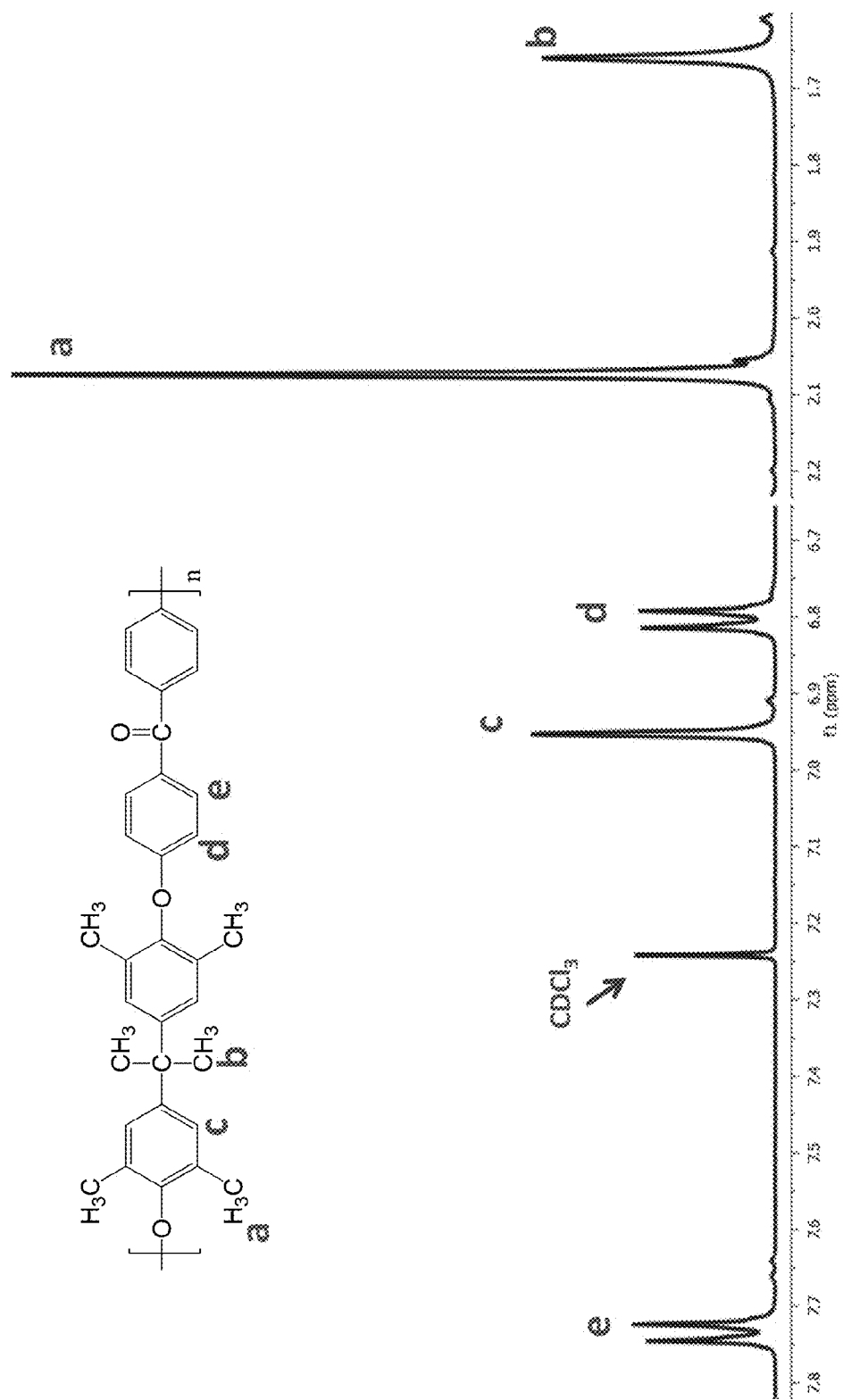
FIG. 8 is a $^1$H NMR spectrum for one embodiment of a polymer useful in the compositions of the present invention.
Figure 9:
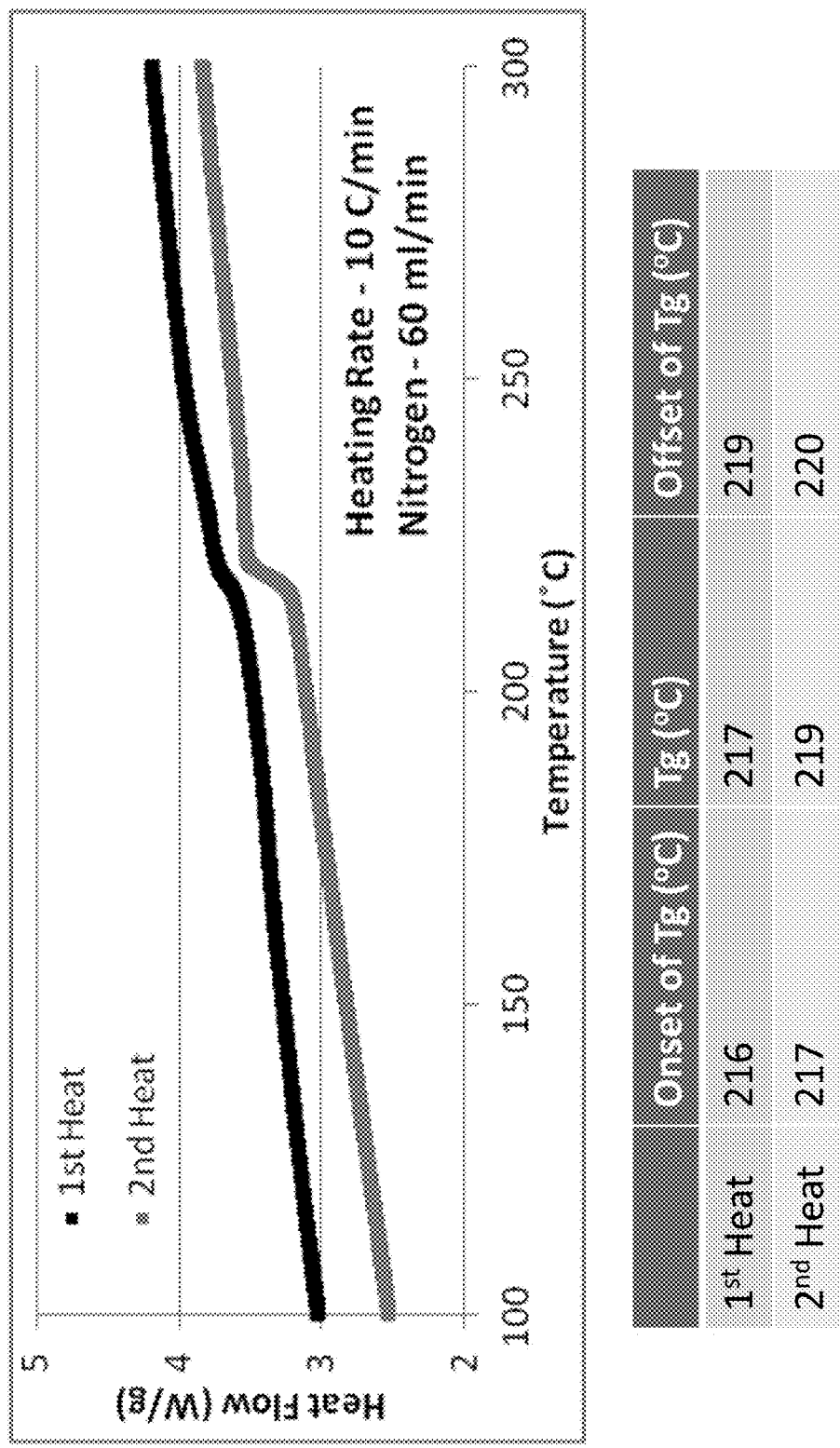
FIG. 9 is a graph showing DSC data for a polymer of the present invention.

Synthesis of a polymer of Compound 1 was prepared from tetramethyl bisphenol A (TMBPA) and difluorobenzophenone (DFBP) as follows: TMBPA (8.100 g, 28.48 mmol), DFBP (6.215 g, 28.48 mmol), and NMP (95 mL) were placed into a 250 mL three neck round bottom flask equipped with an overhead stirrer, a condenser, a nitrogen inlet, and a Dean-Stark trap. The mixture was heated to 155° C. and stirred until the monomers were completely dissolved. Once a clear solution was obtained, $K_2CO_3$ (4.590 g, 32.75 mmol) and toluene (48 mL) were added into the flask. The reaction was allowed to reflux at 155° C. for 4 h to azeotropically remove water from the system. The toluene and water were removed from the Dean Stark trap and the reaction mixture heated to 170° C. for 24 h. The reaction was cooled to room temperature in the reaction flask and then diluted with NMP (95 mL). The solution was stored in the reaction flask for at least 12 h to allow precipitated salt and unreacted base to settle. The solution was then filtered to remove insoluble salts and excess base. The filtered solution was precipitated into stirred water (1.0 L) and filtered. The precipitated fibrous polymer was dried under vacuum at 120° C. for 12 h. The $^1H$ NMR spectrum of the resulting TMBPA-BP polymer is shown in FIG. 8. Differential Scanning Calorimetry (DSC) analysis of the resulting TMBPA-BP polymer is shown in FIG. 9.

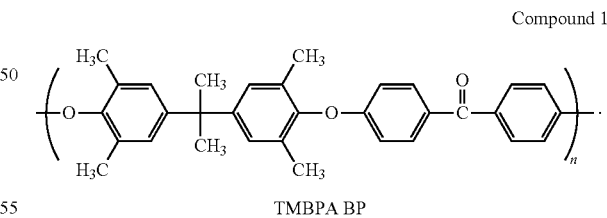

Compound 1

TMBPA BP

Example 2

Synthesis of TMBPA-MBFB

The procedure described in Example 1 was repeated in substantially the same manner, except that DFBP was replaced with meta-bis(4-fluorobenzoyl)benzene (mBFB) to make a polymer of Compound 2.

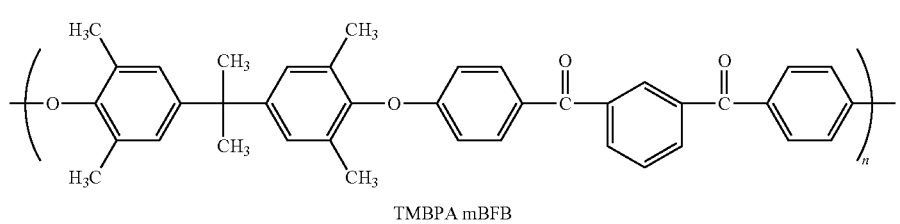

Compound 2

TMBPA mBFB

Example 3

Synthesis of TMBPA-PBFB

The procedure described in Example 1 was repeated in substantially the same manner, except that DFBP was replaced with para-bis(4-fluorobenzoyl)benzene (pBFB) to make a polymer of Compound 3.

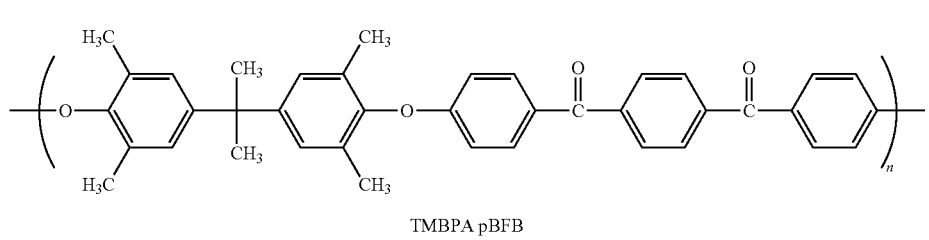

Compound 3

TMBPA pBFB

Example 4

Synthesis of TMBPA DFDPS

The procedure described in Example 1 was repeated in substantially the same manner, except that DFBP was replaced with 4,4'-difluorodiphenylsulfone (DFDPS) to make a polymer of Compound 4. As would be understood by a person skilled in the art, Compound 4 can also be made using other reagents, for example 4,4'-dichlorodiphenylsulfone (DCDPS).

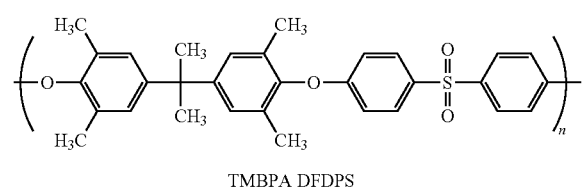

Compound 4

TMBPA DFDPS

Example 5

Synthesis of Oxidizable Precursors from Formaldehyde and 2.6,Xylenol to Photosensitive Polyketones A chromophore useful for cross-linking the polymer does not need to be present in the originally synthesized polymer. For example, it is known in the art that a ketone group can be formed via oxidation of a methylene group, particularly in a case where the methylene group connects two aromatic rings (Guo et al., 2013, J Molecular Catalysis A: Chemical 367: 7-11). Therefore, in one embodiment of the present invention, an in situ oxidation of a methylene group to generate a chromophore within the polymer film can be performed. For example, as shown in Scheme 1, a polymer containing an oxidizable methylene group can be oxidized to form a photosensitive polyketone.

Scheme 1

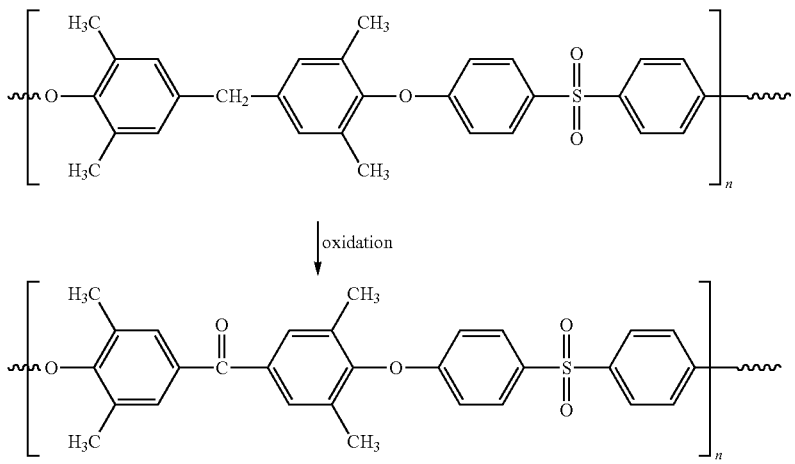

Example 6

Synthesis of Bis-(2,6-xylenol)-f-DCDPS Copolymer and Subsequent Oxidation and Crosslinking The synthesis of the oxidizable polymer of Example 5 is shown in scheme 2.

Figure 10A:
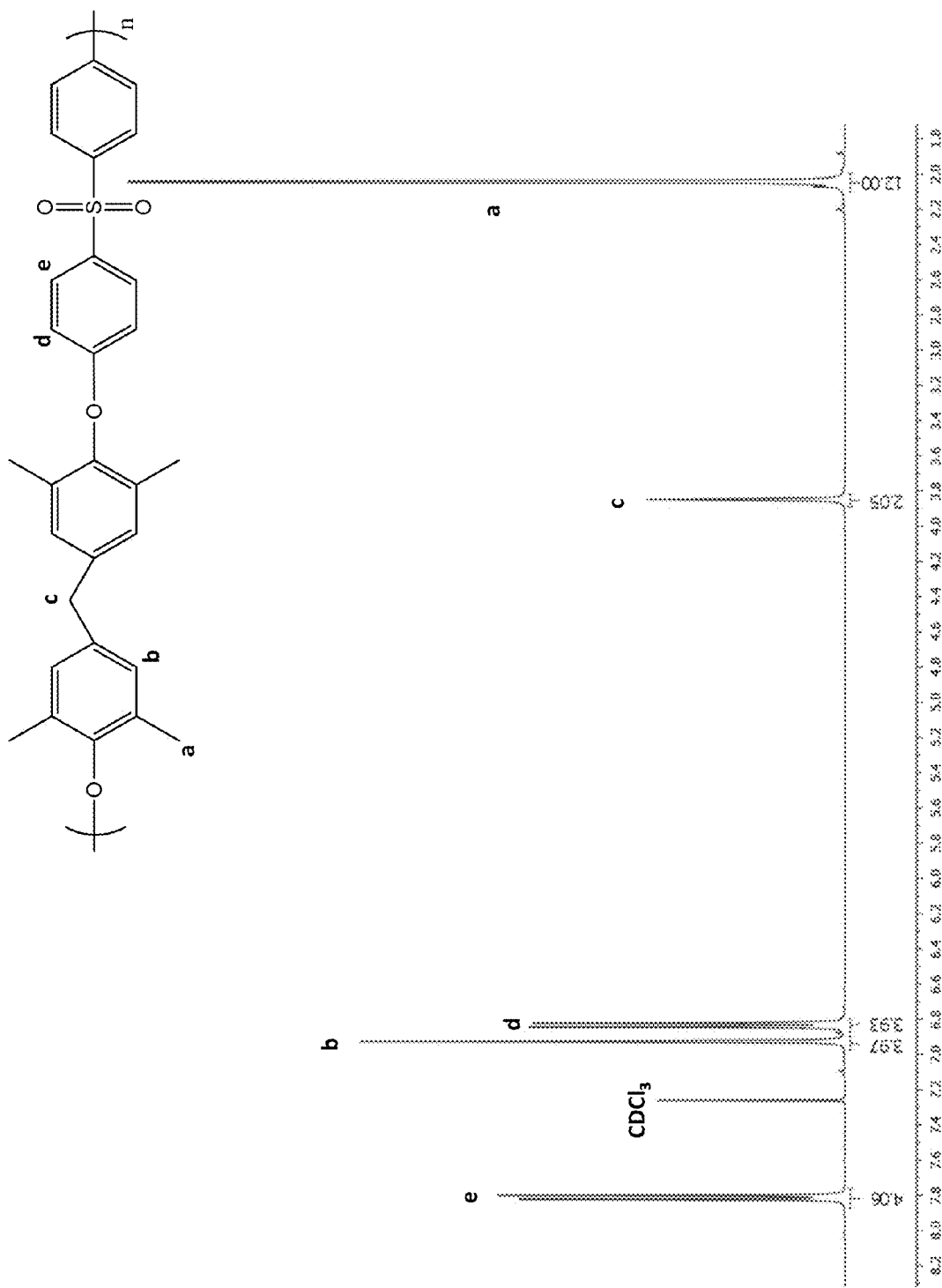
FIGS. 10A through 10C, is a set of spectra for one embodiment of a polymer useful in the compositions of the present invention, before and after exposure to oxidation conditions.

The NMR of Bis-(2,6-xylenol)-f-DCDPS copolymer is shown in FIG. 10A.

Scheme 2

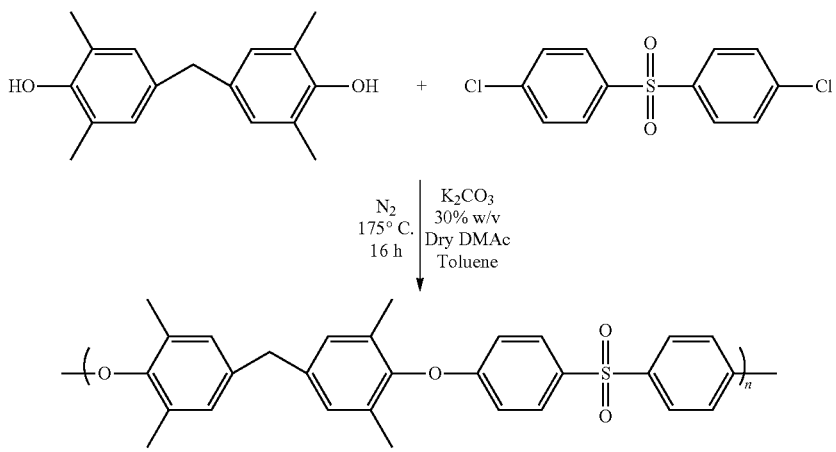

Oxidation of TMBPF-DCDPS Polymer with potassium Peroxymonosulfate/KBr

The polymer from scheme 2 above (which can be referred to by either of the following designations: Bis-(2,6-xylenol)-f-DCDPS or TMBPF-DCDPS) (1.0 g) was added to $CH_3CN$ (26 mL) and DI water (2 mL) in a 100-mL round bottom flask. Potassium peroxymonosulfate (4.675 mmol, 0.712 g) and KBr (1.063 mmol, 0.126 g) were added to the flask. The flask, under air, was sealed with septa and stirred in a thermocouple regulated water bath at 45° C. After several hours, the temperature was raised to 60° C., and the reaction was stirred overnight. The heterogeneous reaction was poured directly into stirring DI water (250 mL), stirred for several hours, filtered on an aspirator, and dried overnight at 70° C. in a convection oven.

Figure 10B:
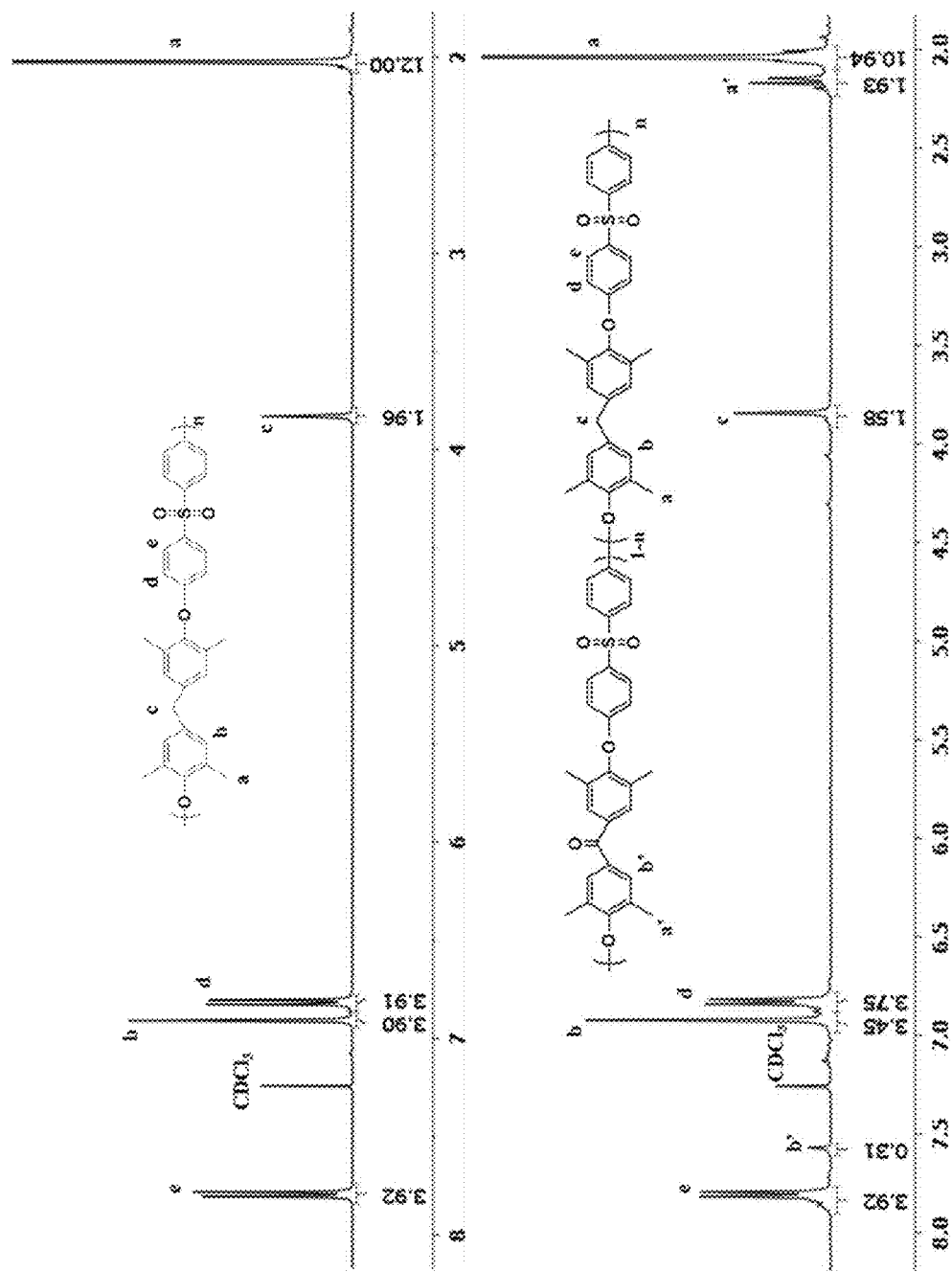

Examination of the oxidized polymer by $^1$H-NMR and comparison with the starting material shows changes consistent with the formation of an oxidized polymer (FIG. 10B).

Thermal Oxidation of TMBPF-DCDPS Polymer

Figure 10C:
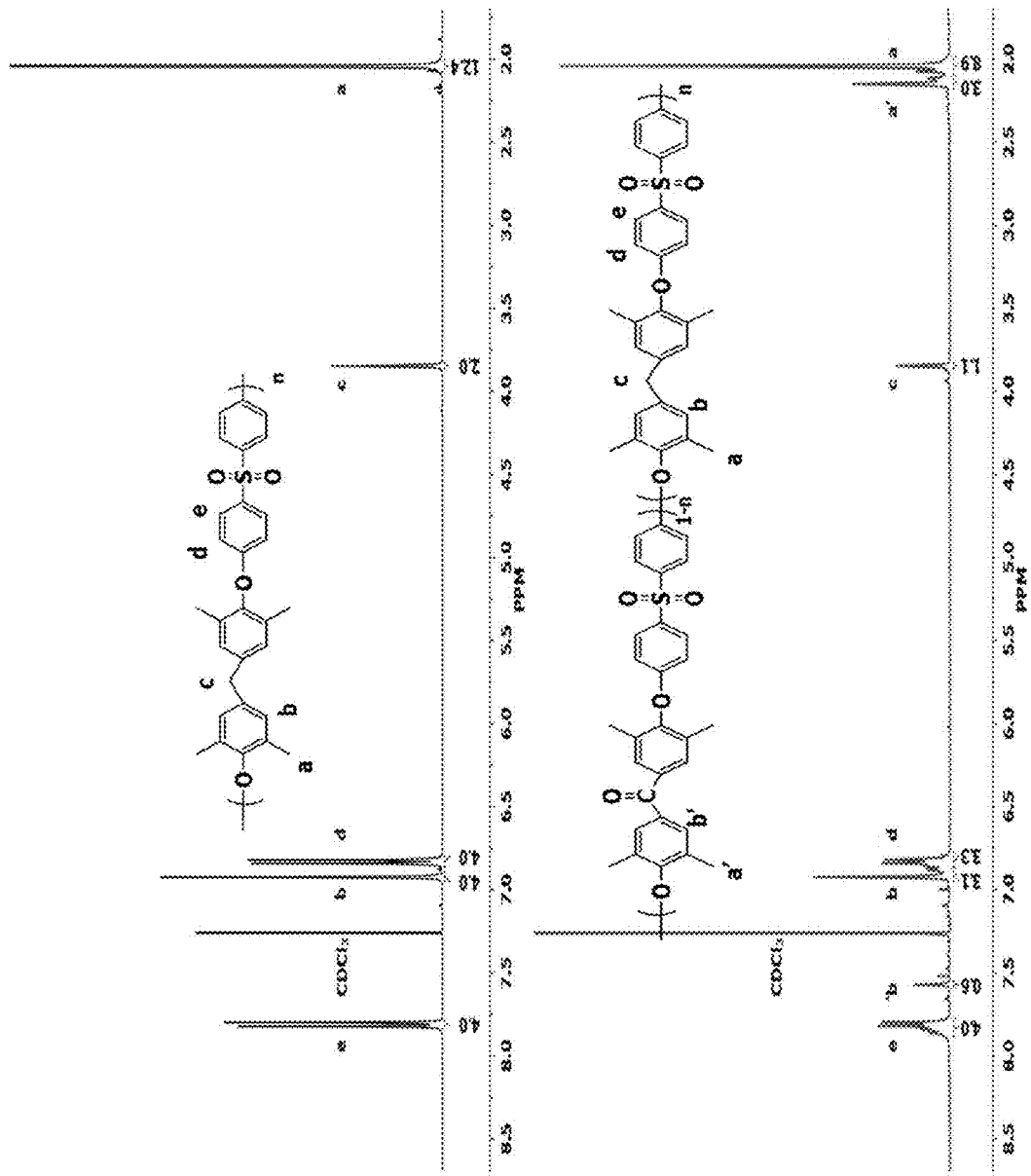

The polymer from scheme 2 above was heated to 280° C. in air, i.e., well above $T_g$, and held for 120 min. During this time, the polymer changed from white to a light yellow color. The H-NMR spectrum of oxidized TMBPF-DCDPS is shown in FIG. 10C, showing again the presence of species consistent with oxidation of the methylene group to a carbonyl group.

UV Crosslinking of Oxidized TMBPF-DCDPS Polymer

Two films were prepared to test the self-crosslinking reaction, one of the TMBPF-DCDPS control (i.e., prior to submitting TMBPF-DCDPS to oxidation) and one of the partially oxidized system. Both films were cast from chloroform, dried, and then exposed to UV light. After irradiation, both films were weighed and extracted with chloroform. The TMBPF-DCDPS film quickly dissolved, indicating 0% gel fraction and no crosslinking. However, the partially oxidized TMBPF-DCDPS film was largely undissolved after one day and had a gel fraction of 80%, demonstrating a high level of crosslinking.

Example 7

Synthesis of Bis-(2,6-xylenol)-f-DFBP Copolymer

Figure 11:
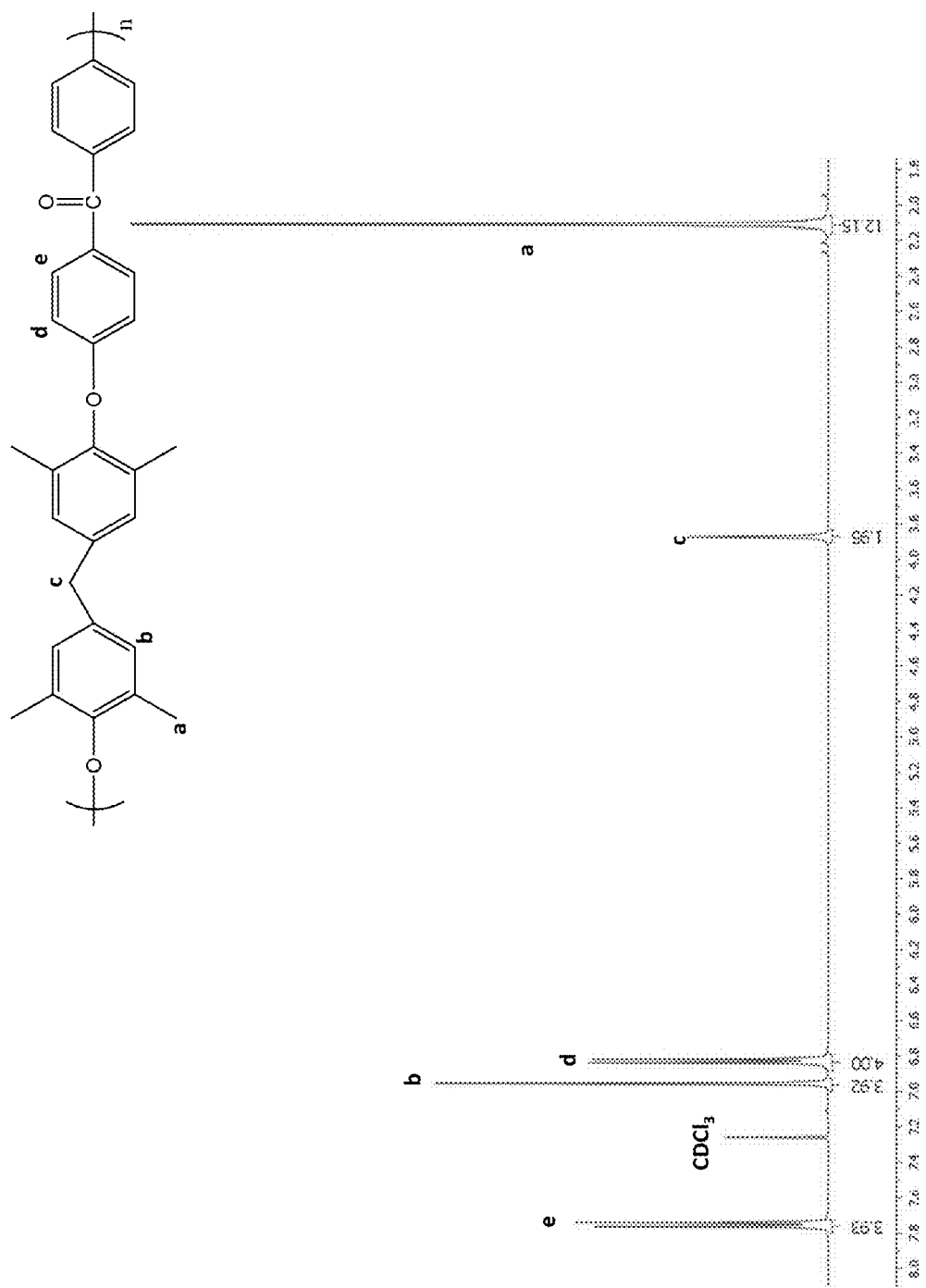
FIG. 11 is a $^1$H NMR spectrum for one embodiment of a polymer useful in the compositions of the present invention.

The synthesis of another oxidizable copolymer is shown in scheme 3. The NMR of Bis-(2,6-xylenol)-f-DFBP copolymer is shown in FIG. 11.

UV Crosslinking

Initially prepared films were crosslinked using a Spectrolinker™ XL-1000 crosslinker manufactured by Spectronics Corporation. The films were placed within the chamber, and the crosslinker was operated in intensity mode. The crosslinker equipment indicated the intensity measured in the chamber when the lamp was turned on. The intensity was manually recorded initially and then every 15 minutes thereafter during the exposure time. The average intensity of the UV light was 2439 micro watts/cm$^2$. The wavelength was set at 254 nm. The total energy that the films were exposed to was approximately 8.7 Joules/cm$^2$ per hour. This irradiation process was continued for either 1 or 2 hours.

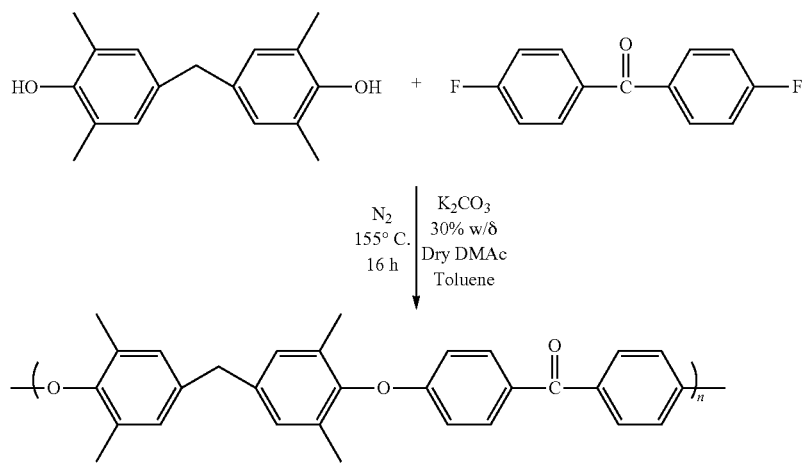

Scheme 3

Example 8

Membrane Preparation and Properties

Film-casting

A solution of the polymer synthesized in Example 1 was prepared by adding about 0.5 grams of polymer to approximately 10 to 15 ml of chloroform and mixed using a magnetic stir bar until a homogeneous solution was obtained. The polymer weight and solution concentration can be varied based on the desired film size and thickness. To remove any dust or other particulate matter from the solution prior to casting, the solution was filtered using a syringe filter equipped with a membrane having pores of nominal size 0.45 μm. The filtered solution was then slowly poured onto a clean, level glass plate and covered to inhibit dust and other particles from contaminating the film. Covering the film controls the evaporation rate of chloroform from the surface of the film, which contributes to obtaining a uniform film from such a film casting process. The film was maintained at room temperature for 1 hour, allowing the evaporation of most of the chloroform. To remove the solvent trapped by the polymer, the glass plate was heated to 60° C. for about 1 hour. Afterwards, the glass plate was submerged in deionized water, which caused the film to delaminate from the plate. The free standing film was dried at 50° C. in a forced air oven for 12 h and stored in a dark environment (i.e., with minimal exposure to light).

Tensile Testing

Figure 12:
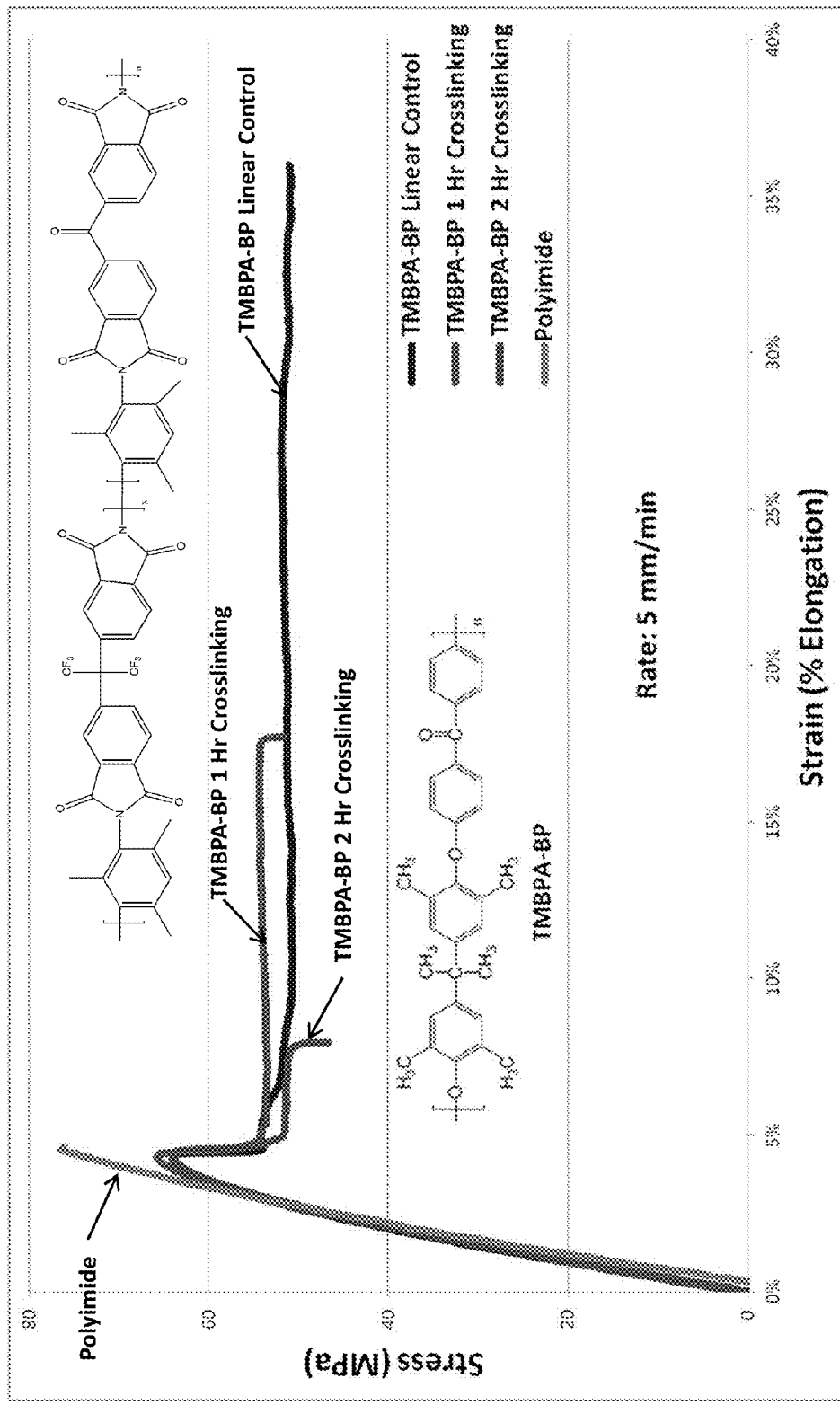
FIG. 12 is a graph showing the plot of stress vs. strain for a number of polymer compositions.
Figure 13:
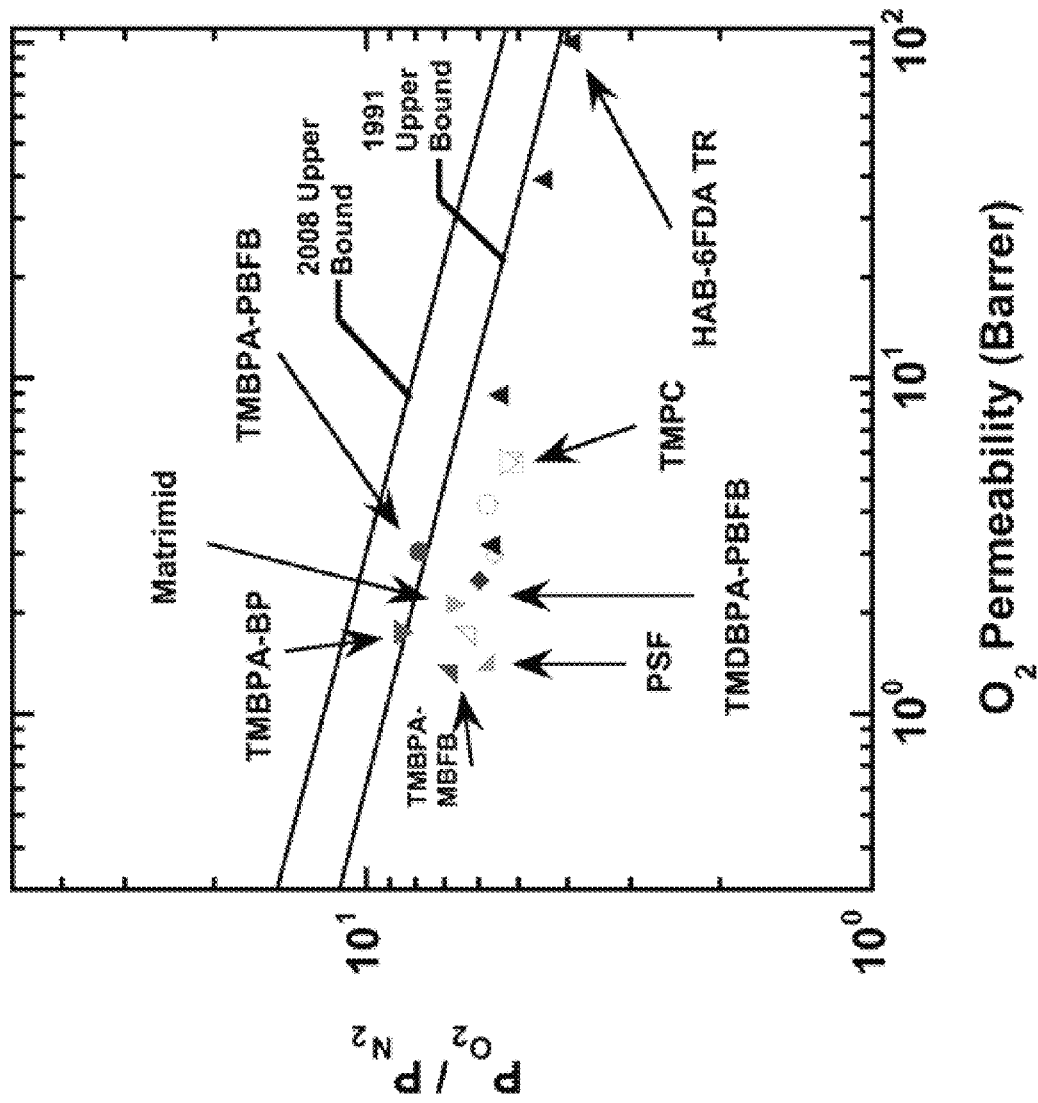
FIG. 13 is a graph of gas selectivity vs. gas permeability for $O_2/N_2$ separation for a number of polymer compositions. All pure gas permeabilities were measured at 35° C. and 10 atm feed pressure except for polysulfone (PSF) (5 atm), Matrimid (3.5 atm), and tetramethyl polycarbonate (1 atm). For the poly(arylene ether ketone) materials of the present invention (i.e., TMBPA-BP, TMBPA-MBFB, TMDBPA-PBFB, and TMBPA-PBFB), an unfilled symbol represents data for an uncrosslinked polymer and a filled symbol represents data for an crosslinked polymer. For HAB-6FDA TR samples, the least permeable sample is the polyimide precursor, and samples having higher $H_2$ permeabilities represent materials of increasing degree of conversion to their thermally rearranged (i.e., TR) analog.
Figure 14:
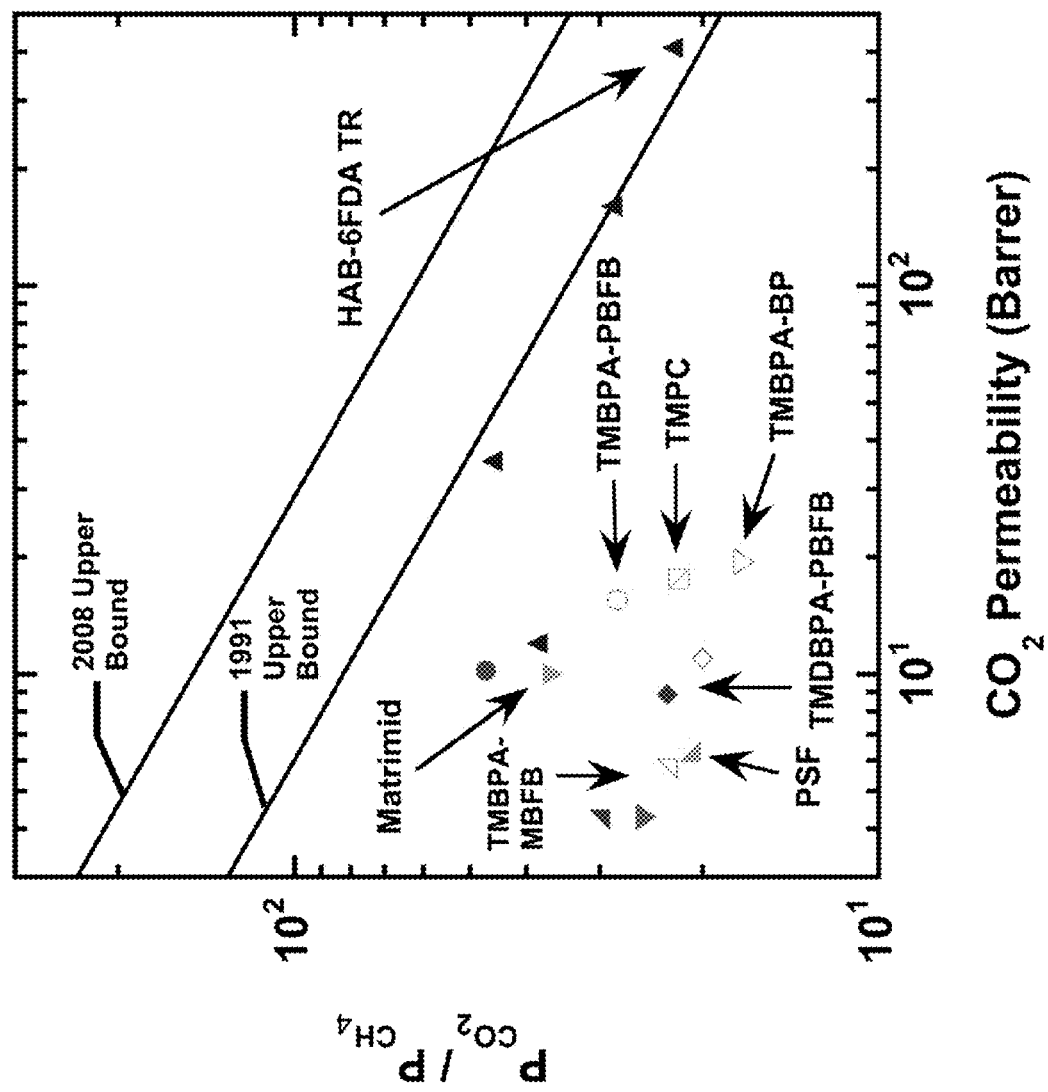
FIG. 14 is a graph of gas selectivity vs. gas permeability for $CO_2/CH_4$ separation for a number of polymer compositions. All pure gas permeabilities were measured at 35° C. and 10 atm feed pressure except for PSF (5 atm), Matrimid (3.5 atm), and tetramethyl polycarbonate (20 atm). For the poly(arylene ether ketone) materials of the present invention (i.e., TMBPA-BP, TMBPA-MBFB, TMDBPA-PBFB, and TMBPA-PBFB), an unfilled symbol represents data for an uncrosslinked polymer and a filled symbol represents data for an crosslinked polymer. For HAB-6FDA TR samples, the least permeable sample is the polyimide precursor, and samples having higher H2 permeabilities represent materials of increasing degree of conversion to their thermally rearranged (i.e., TR) analog.
Figure 15:
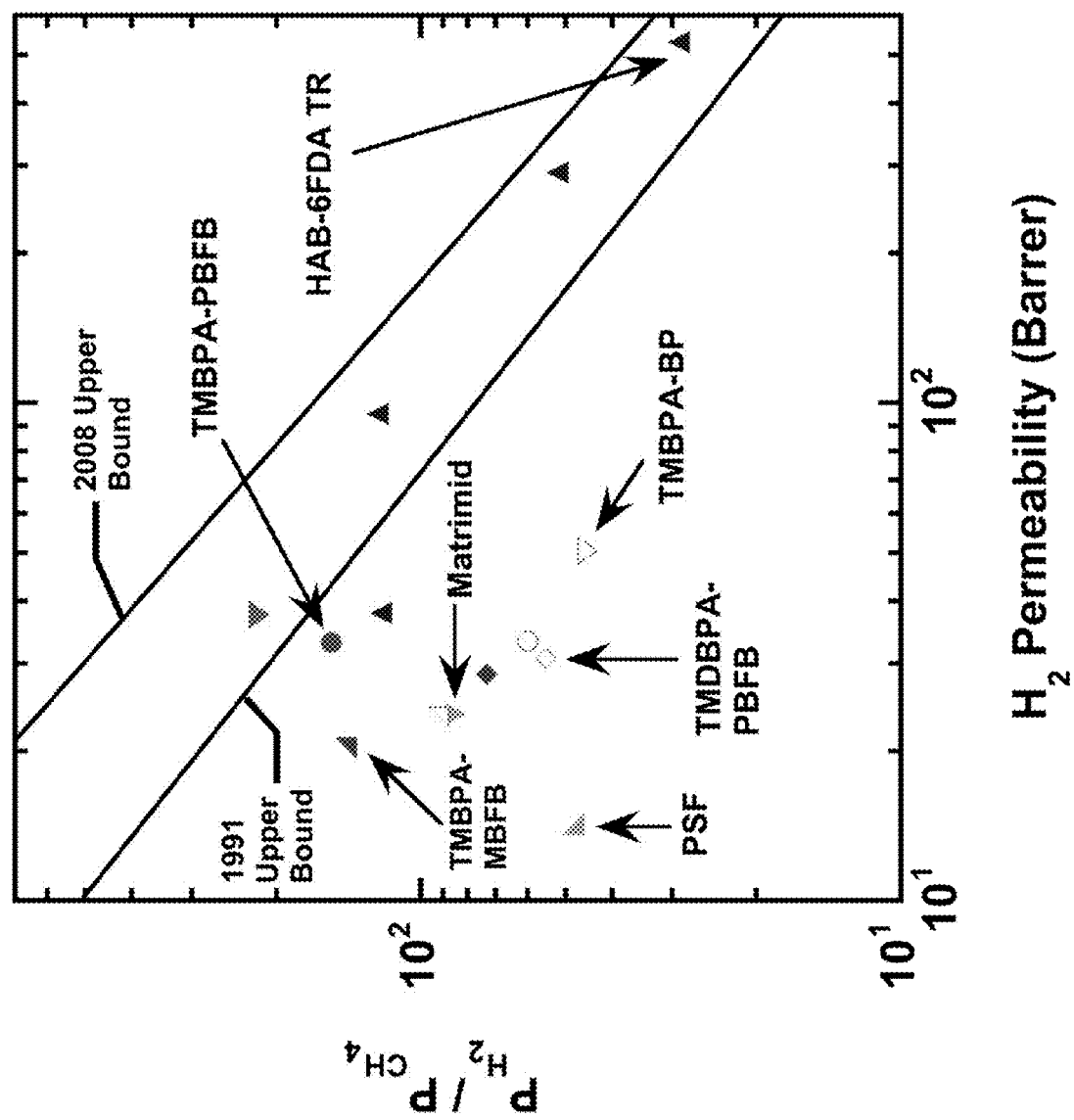
FIG. 15 is a graph of gas selectivity vs. gas permeability for $H_2/CH_4$ separation for a number of polymer compositions. All pure gas permeabilities were measured at 35° C. and 10 atm feed pressure except for PSF (5 atm) and Matrimid (3.5 atm). For the poly(arylene ether ketone) materials of the present invention (i.e., TMBPA-BP, TMBPA-MBFB, TMDBPA-PBFB, and TMBPA-PBFB), an unfilled symbol represents data for an uncrosslinked polymer and a filled symbol represents data for an crosslinked polymer. For HAB-6FDA TR samples, the least permeable sample is the polyimide precursor, and samples having higher $H_2$ permeabilities represent materials of increasing degree of conversion to their thermally rearranged (i.e., TR) analog.
Figure 16:
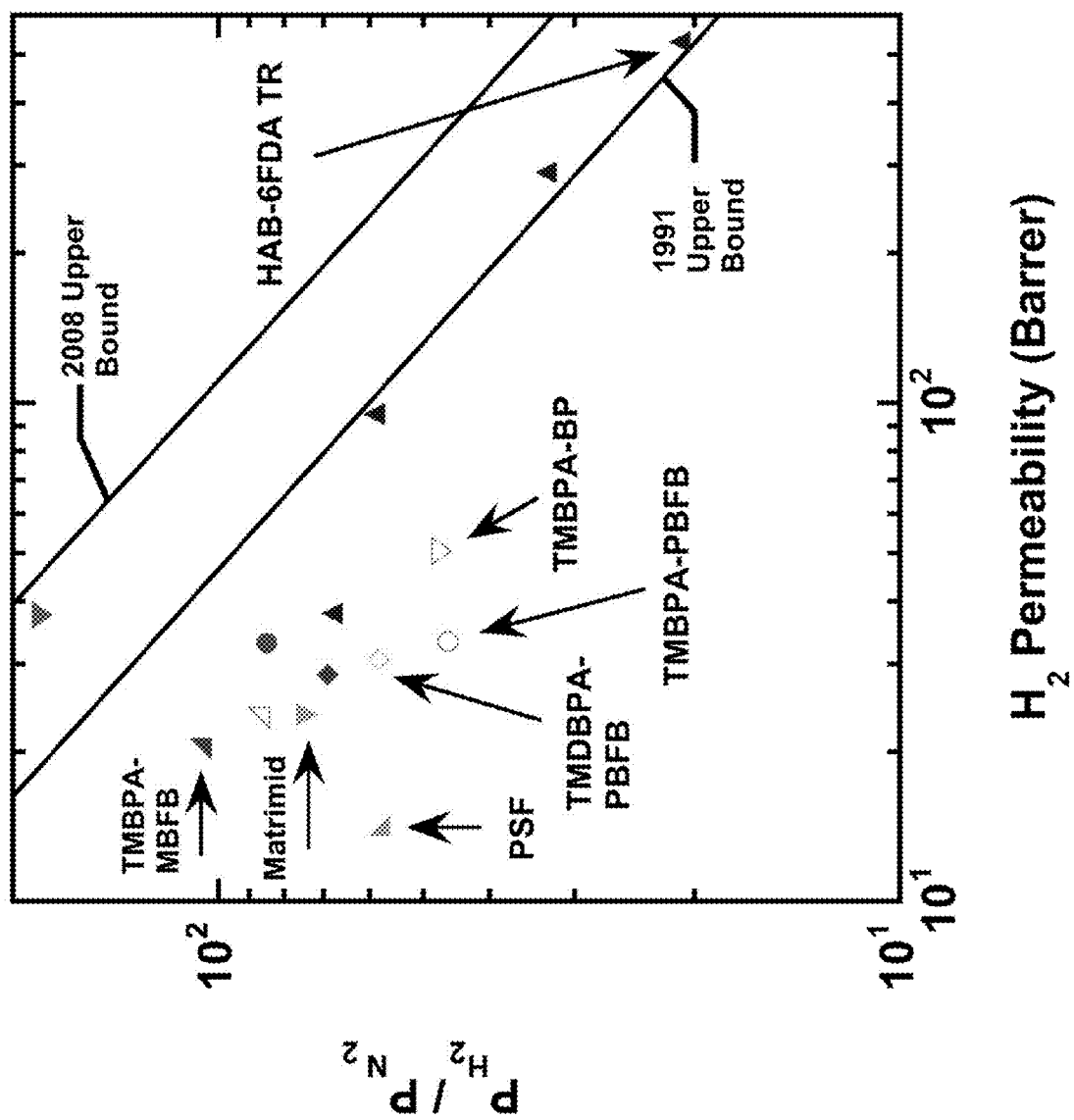
FIG. 16 is a graph of gas selectivity vs. gas permeability for $H_2/N_2$ separation for a number of polymer compositions. All pure gas permeabilities were measured at 35° C. and 10 atm feed pressure except for PSF (5 atm) and Matrimid (3.5 atm). For the poly(arylene ether ketone) materials of the present invention (i.e., TMBPA-BP, TMBPA-MBFB, TMDBPA-PBFB, and TMBPA-PBFB), an unfilled symbol represents data for an uncrosslinked polymer and a filled symbol represents data for an crosslinked polymer. For HAB-6FDA TR samples, the least permeable sample is the polyimide precursor, and samples having higher $H_2$ permeabilities represent materials of increasing degree of conversion to their thermally rearranged (i.e., TR) analog.

For mechanical testing, an ASTM standard dogbone was used having dimensions of 3.75 mm×26.5 mm for width and gauge length, respectively, with film thickness between 50 and 100 μm. The strain rate was set to 5 mm/min. The results for TMBPA-BP without crosslinking (labeled TMBPA-BP Linear Control), TMBPA-BP with 1 h of crosslinking, and TMBPA-BP with 2 h of crosslinking, along with the results for a polyimide, are shown in FIG. 12. As expected, the elongation at break decreased with increased crosslinking, demonstrating successful crosslinking.

Gas Permeation

Gas permeation properties were measured using a constant-volume/variable-pressure method as described by Lin and Freeman (Permeation and Diffusion, Springer Handbook for Materials Measurement Methods, Czichos et al., eds., Springer, 2011).

The upstream portion of the system was constructed from commercially available Swagelok parts using Swagelok tube fittings. Welded joints and VCR connections were used in the downstream portion to minimize leaks. The membrane was housed in a stainless steel Millipore filter holder (Millipore, Billerica, Mass., USA) with an included support. A Honeywell Super TJE 1500 psi transducer (Honeywell Sensotec, Columbus, Ohio, USA) was used to track upstream pressure, and a MKS Baratron 626 transducer (MKS, Andover, Mass., USA) was used to measure downstream pressure. The upstream and downstream pressures were recorded using the National Instruments LabVIEW software. The permeabilities of $CH_4$, $H_2$, $N_2$, $O_2$, and $CO_2$ were measured over pressures ranging from 3 atm to 17 atm at 35°

C., and gases (UHP grade, Airgas, Radnor, Pa., USA) were used in the order shown to ensure safety and consistency. The results of these permeation measurements are presented in Tables 1 and 2.

Table 1 shows oxygen and nitrogen pure gas permeability and selectivity data for a number of polymer compositions of the present invention, and also includes data for the commercially available polymers polysulfone, Matrimid polyimide, and tetramethyl polycarbonate. Table 2 shows carbon dioxide and methane pure gas permeability and selectivity data for a number of polymer compositions of the present invention, and also includes data for the commercially available polymers polysulfone, Matrimid polyimide, and tetramethyl polycarbonate. For example, the $CO_2/CH_4$ selectivity of TMBPA-PBFB, 28, is calculated as the ratio of the $CO_2$ permeability of this polymer (15.5 Barrer) divided by the $CH_4$ permeability of this polymer (0.56 Barrer). All other selectivity values were calculated using the same method. Selectivity values were calculated for several gas pairs of interest for industrial gas separation applications. In both tables, the names of the polymer compositions of the present invention with the suffix "-XL" have been cross-linked. The polymer membranes of the present invention demonstrate superior performance to known membrane materials, particularly when considering the selectivities observed at specific permeabilities.

TABLE 1

| Example No. | Polymer | Permeability (Barrer) $O_2$ | Permeability (Barrer) $N_2$ | $O_2/N_2$ Selectivity | Temp. (° C.) | Feed Pressure (atm) |
|---|---|---|---|---|---|---|
| 8-1 | TMBPA-PBFB | 4.21 | 0.73 | 5.8 | 35 | 10 |
| 8-2 | TMBPA-PBFB-XL | 3.04 | 0.39 | 7.9 | | |
| 8-3 | TMDBPA-PBFB | 2.97 | 0.53 | 5.6 | | |
| 8-4 | TMDBPA-PBFB-XL | 2.49 | 0.42 | 6.0 | | |
| 8-5 | TMBPA-BP | 5.62 | 1.08 | 5.2 | | |
| 8-6 | TMBPA-BP-XL | 1.75 | 0.21 | 8.4 | | |
| 8-7 | TMBPA-MBFB | 1.74 | 0.27 | 6.4 | | |
| 8-8 | TMBPA-MBFB-XL | 1.34 | 0.19 | 6.9 | | |
| 8-9 | Polysulfone | 1.4 | 0.24 | 5.8 | 35 | 5 |
| 8-10 | Matrimid polyimide | 2.12 | 0.32 | 6.6 | 35 | 3.5 |
| 8-11 | Tetramethyl Polycarbonate | 5.59 | 1.09 | 5.1 | 35 | 1 |

TABLE 2

| Example No. | Polymer | Permeability (Barrer) $CO_2$ | Permeability (Barrer) $CH_4$ | $CO_2/CH_4$ Selectivity | Temp. (° C.) | Feed Pressure (atm) |
|---|---|---|---|---|---|---|
| 8-1 | TMBPA-PBFB | 15.5 | 0.56 | 28 | 35 | 10 |
| 8-2 | TMBPA-PBFB-XL | 10.2 | 0.22 | 47 | | |
| 8-3 | TMDBPA-PBFB | 11.0 | 0.55 | 20 | | |
| 8-4 | TMDBPA-PBFB-XL | 8.87 | 0.39 | 23 | | |
| 8-5 | TMBPA-BP | 19.5 | 1.13 | 17 | | |
| 8-6 | TMBPA-BP-XL | 4.28 | 0.17 | 25 | | |
| 8-7 | TMBPA-MBFB | 5.82 | 0.26 | 23 | | |
| 8-8 | TMBPA-MBFB-XL | 4.30 | 0.14 | 30 | | |
| 8-9 | Polysulfone | 6.2 | 0.29 | 21 | 35 | 5 |
| 8-10 | Matrimid polyimid | 10.0 | 0.28 | 36 | 35 | 3.5 |
| 8-11 | Tetramethyl Polycarbonate | 17.6 | 0.80 | 22 | 35 | 20 |

FIGS. 13 through 16 show selectivity versus permeability plots, i.e., upper bound plots, for various polymers and for different gas pairs. These figures were constructed using the data in Tables 1 and 2 above plus data on HAB-6FDA TR polymers from the literature (Sanders et al., 2012, J. of Membrane Science, 409-410, 232-241). Polymers of the present invention (i.e., TMBPA-BP, TMBPA-MBFB, TMDBPA-PBFB, and TMBPA-PBFB) are shown in each plot, in addition to commercial polymers currently available (i.e., Matrimid polyimide and Polysulfone (PSF)), and other polymers previously considered for gas separation applications (i.e., tetramethyl bisphenol-A polycarbonate (TMPC) and thermally rearranged 3,3'-dihydroxy-4,4'-diaminobiphenyl/2,2'-bis-(3,4-dicarboxyphenyl) hexafluoropropane dianhydride polymers (HAB-6FDA TR)). The 2 lines in each of the plots labeled "upper bound" represent the upper bound predictions based on the best known combinations of gas permeability and selectivity as of 1991 and 2008, as discussed by Robeson (J. Membrane Sci., 1991, 62: 165-185; J. Membrane Sci., 2008, 320: 390-400).

The data related to polymers of the present invention in Tables 1 and 2 were measured at a feed pressure of 10 atm, whereas the comparison data for other polymers were reported at different, lower feed pressures. To provide some perspective of the relatively insignificant influence of lower values of feed pressure on the permeability and selectivity values reported in Tables 1 and 2, Tables 3 and 4 are provided below. Table 3 shows oxygen and nitrogen pure gas permeability and selectivity data for a number of polymer compositions of the present invention, reported at a feed pressure of 3 atm, and also includes the same data for reference materials listed in Table 1. Table 4 shows carbon dioxide and methane pure gas permeability and selectivity data for a number of polymer compositions of the present invention, reported at a feed pressure of 3 atm, and also includes, for comparison, the same data for reference materials listed in Table 2.

TABLE 3

| Example No. | Polymer | Permeability (Barrer) $O_2$ | Permeability (Barrer) $N_2$ | $O_2/N_2$ Selectivity | Temp. (° C.) | Feed Pressure (atm) |
|---|---|---|---|---|---|---|
| 8-1 | TMBPA-PBFB | 4.24 | 0.74 | 5.7 | 35 | 3 |
| 8-2 | TMBPA-PBFB-XL | 3.09 | 0.39 | 7.9 | | |
| 8-3 | TMDBPA-PBFB | 3.0 | 0.53 | 5.7 | | |
| 8-4 | TMDBPA-PBFB-XL | 2.50 | 0.41 | 6.1 | | |
| 8-5 | TMBPA-BP | 5.63 | 1.10 | 5.1 | | |
| 8-6 | TMBPA-BP-XL | 1.76 | 0.21 | 8.4 | | |
| 8-7 | TMBPA-MBFB | 1.76 | 0.27 | 6.5 | | |
| 8-8 | TMBPA-MBFB-XL | 1.36 | 0.20 | 6.8 | | |

TABLE 3-continued

| Example No. | Polymer | Permeability (Barrer) O$_2$ | N$_2$ | O$_2$/N$_2$ Selectivity | Temp. (°C.) | Feed Pressure (atm) |
|---|---|---|---|---|---|---|
| 8-9 | Polysulfone | 1.4 | 0.24 | 5.8 | 35 | 5 |
| 8-10 | Matrimid polyimide | 2.12 | 0.32 | 6.6 | 35 | 3.5 |
| 8-11 | Tetramethyl Polycarbonate | 5.59 | 1.09 | 5.1 | 35 | 1 |

TABLE 4

| Example No. | Polymer | Permeability (Barrer) CO$_2$ | CH$_4$ | CO$_2$/CH$_4$ Selectivity | Temp. (°C.) | Feed Pressure (atm) |
|---|---|---|---|---|---|---|
| 8-1 | TMBPA-PBFB | 18.0 | 0.60 | 30 | 35 | 3 |
| 8-2 | TMBPA-PBFB-XL | 11.2 | 0.22 | 51 | | |
| 8-3 | TMDBPA-PBFB | 12.9 | 0.59 | 22 | | |
| 8-4 | TMDBPA-PBFB-XL | 10.3 | 0.42 | 25 | | |
| 8-5 | TMBPA-BP | 22.6 | 1.21 | 19 | | |
| 8-6 | TMBPA-BP-XL | 4.86 | 0.23 | 21 | | |
| 8-7 | TMBPA-MBFB | 6.62 | 0.27 | 25 | | |
| 8-8 | TMBPA-MBFB-XL | 4.81 | 0.14 | 34 | | |
| 8-9 | Polysulfone | 6.2 | 0.29 | 21 | 35 | 5 |
| 8-10 | Matrimid polyimide | 10.0 | 0.28 | 36 | 35 | 3.5 |
| 8-11 | Tetramethyl Polycarbonate | 17.6 | 0.80 | 22 | 35 | 20 |

For the data presented in FIGS. 13-16, the polymers of the present invention typically have higher selectivity and lower permeability than other materials recently considered for use as gas separation membranes, such as the thermally rearranged polymers (i.e., the samples labeled HAB-6FDA TR in FIGS. 13-16). In certain applications, polymers of the present invention having high selectivity and reasonable permeability coefficients are advantageous compared to polymers having very high permeability, but lower selectivity, such as the HAB-6FDA TR materials shown in FIGS. 13-16. For example, in separating air to prepare high purity, nitrogen-enriched air, higher selectivity values typically result in less permeation of nitrogen across the membrane, thereby reducing the amount of nitrogen lost to the low pressure permeate stream, which reduces the compression energy required to produce a given amount of N$_2$-enriched air in the retentate stream leaving the membrane. Similarly, applications other than air separation may also advantageously use highly selective membrane materials to reduce the loss of a valuable product, improve the purity of the permeate and/or retentate gas streams, or perform a desired gas separation using less energy.

References for the non-PAE materials in Tables 1-4 and FIGS. 13-16 are as follows: Polysulfone (PSF), McHattie et al., 1991, Polymer 32(5): 840-850; Matrimid polyimide: Vu et al., 2003, J. of Membrane Science 211(2): 311-334; Tetramethyl Polycarbonate (TMPC): Muruganandam, et al., 1987, J. of Polymer Science Part B: Polymer Physics 25(9): 1999-2026; HAB-6FDA TR: Sanders et al., 2012, J. of Membrane Science 409-410(0): 232-241.

Tables 5 and 6 below show relevant gas transport properties, namely pure gas permeability and selectivity data, for a number of polymer compositions of the present invention, and also include data for the commercially available polymers polysulfone, Matrimid polyimide, and tetramethyl polycarbonate.

TABLE 5

Gas Permeability (Barrer) for Selected Gases at 10 atm and 35° C.

| Example No. | Polymer | CO$_2$ | O$_2$ | H$_2$ | N$_2$ | CH$_4$ |
|---|---|---|---|---|---|---|
| 8-1 | TMBPA-PBFB | 15.5 | 4.21 | 33.2 | 0.73 | 0.56 |
| 8-2 | TMBPA-PBFB-XL | 10.2 | 3.04 | 33.0 | 0.39 | 0.22 |
| 8-3 | TMDBPA-PBFB | 11.0 | 2.97 | 30.6 | 0.53 | 0.55 |
| 8-4 | TMDBPA-PBFB-XL | 8.87 | 2.49 | 28.5 | 0.42 | 0.39 |
| 8-5 | TMBPA-BP | 19.5 | 5.62 | 50.5 | 1.08 | 1.13 |
| 8-6 | TMBPA-BP-XL | 4.28 | 1.75 | 37.5 | 0.21 | 0.17 |
| 8-7 | TMBPA-MBFB | 5.82 | 1.74 | 23.7 | 0.27 | 0.26 |
| 8-8 | TMBPA-MBFB-XL | 4.30 | 1.34 | 20.6 | 0.19 | 0.14 |
| 8-9 | Polysulfone[1,2,6] | 5.6 | 1.4 | 14.0 | 0.24 | 0.29 |
| 8-10 | Matrimid[1,3,4,6] | 10.0 | 2.12 | 23.7 | 0.32 | 0.28 |
| 8-11 | Tetramethyl Polycarbonate[5,6] | 17.6 | 5.59 | NR | 1.09 | 0.80 |

1: Rowe, et al., 2009, Polymer 50(23): 5565-5575.
2: McHattie, et al., 1991, Polymer, 32, 840.
3: Vu, et al., 2003, J. of Membrane Science, 211, 311.
4: Shao, et al., 2008, J. of Membrane Science, 312, 174.
5: Muruganandam, et al., 1987, J. of Polymer Science Part B: Polymer Physics, 25(9), 1999-2026.
6: Data shown for this polymer may have been measured at condition other than 10 atm and 35° C.
NR = not reported

TABLE 6

Selectivity for Selected Gases at 10 atm and 35° C.

| Example No. | Polymer | CO$_2$/CH$_4$ | O$_2$/N$_2$ | H$_2$/N$_2$ | H$_2$/CH$_4$ | CO$_2$/N$_2$ |
|---|---|---|---|---|---|---|
| 8-1 | TMBPA-PBFB | 28 | 5.8 | 46 | 60 | 21 |
| 8-2 | TMBPA-PBFB-XL | 47 | 7.9 | 85 | 150 | 26 |
| 8-3 | TMDBPA-PBFB | 20 | 5.6 | 58 | 55 | 21 |
| 8-4 | TMDBPA-PBFB-XL | 23 | 6.0 | 69 | 73 | 21 |
| 8-5 | TMBPA-BP | 17 | 5.2 | 47 | 45 | 18 |
| 8-6 | TMBPA-BP-XL | 25 | 8.4 | 180 | 220 | 21 |
| 8-7 | TMBPA-MBFB | 23 | 6.4 | 87 | 92 | 21 |
| 8-8 | TMBPA-MBFB-XL | 30 | 6.9 | 110 | 140 | 22 |
| 8-9 | Polysulfone[1,2,6] | 19 | 5.8 | 58 | 48 | 23 |
| 8-10 | Matrimid[1,3,4,6] | 36 | 6.6 | 74 | 85 | 31 |
| 8-11 | Tetramethyl Polycarbonate[5,6] | 22 | 5.1 | NR | NR | 16 |

1: Rowe, et al., 2009, Polymer 50(23): 5565-5575.
2: McHattie, et al., 1991, Polymer, 32, 840.
3: Vu, et al., 2003, J. of Membrane Science, 211, 311.
4: Shao, et al., 2008, J. of Membrane Science, 312, 174.
5: Muruganandam, et al., 1987, J. of Polymer Science Part B: Polymer Physics, 25(9), 1999-2026.
6: Data shown for this polymer may have been measured at condition other than 10 atm and 35° C.
NR = not reported Example 9

Effect of Crosslinking Conditions

Figure 18:
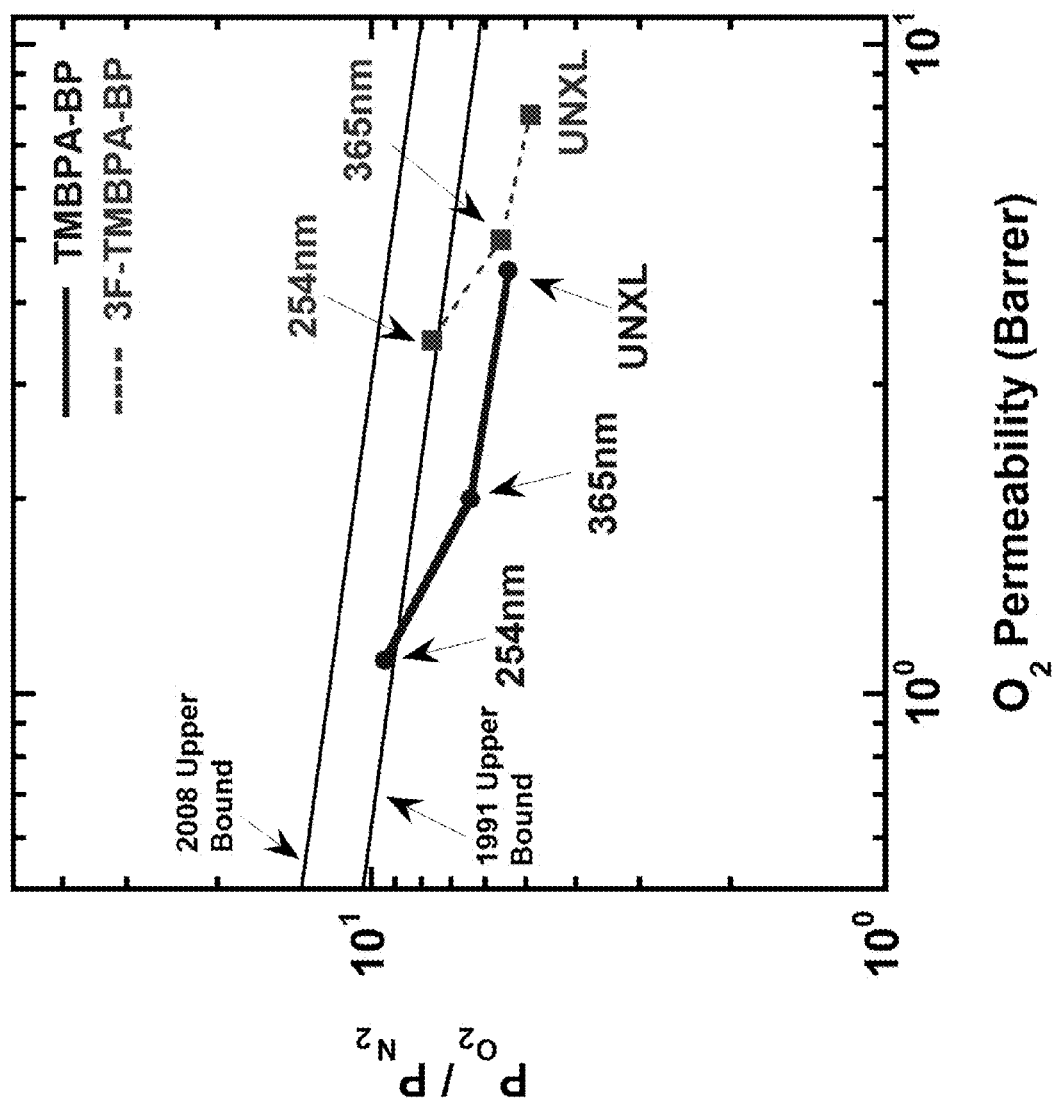
FIG. 18 is a graph showing the effects of crosslinking conditions on transport properties of TMBPA-PA and 3F-TMBPA-BP polymer films.

The effects of varying crosslinking conditions on a polymer of the present invention were examined. Sample films of TMBPA-BP of different thicknesses were crosslinked according to the conditions listed in Table 7 and analyzed. Properties of the TMBPA-BP samples prior to crosslinking are shown in Table 8. Measured transport property data is shown in Table 9 and FIG. 18 (XL- crosslinked; UNXL=uncrosslinked).

TABLE 7

| Treatment Condition | Crosslinker | UV Lamp |
|---|---|---|
| UV wavelength | 254 nm | 365 nm |
| Environment | Air | Air |

TABLE 7-continued

| Treatment Condition | Crosslinker | UV Lamp |
|---|---|---|
| Exposure time | 1 hr each side | 1 hr each side |
| Bulb intensity | 3.6 mW/cm² | 19.7 mW/cm² |

TABLE 8

| Polymer | Thickness (μm) | Absorbance @ 365 nm wavelength |
|---|---|---|
| TMBPA-BP | 27 | 1.313 |
|  | 8 | 0.450 |

TABLE 9

| Film | Thickness (μm) | $O_2$ (Barrer) | $N_2$ (Barrer) | $O_2/N_2$ |
|---|---|---|---|---|
| 31 μm film UNXL | 31 | 4.50 | 0.84 | 5.4 |
| 31 μm film XL @ 365 nm | 26 | 1.98 | 0.31 | 6.4 |
| 31 μm film XL @ 254 nm | 29 | 1.13 | 0.12 | 9.4 |
| 8 μm film UNXL | 8.0 | 4.3 | 0.80 | 5.4 |
| 8 μm film XL @ 365 nm | 8.0 | 1.0 | 0.14 | 7.1 |
| 8 μm film XL @ 254 nm | 7.4 | 0.37 | 0.039 | 9.5 |

Example 10

3F-TMBPA-BP

Figure 17:
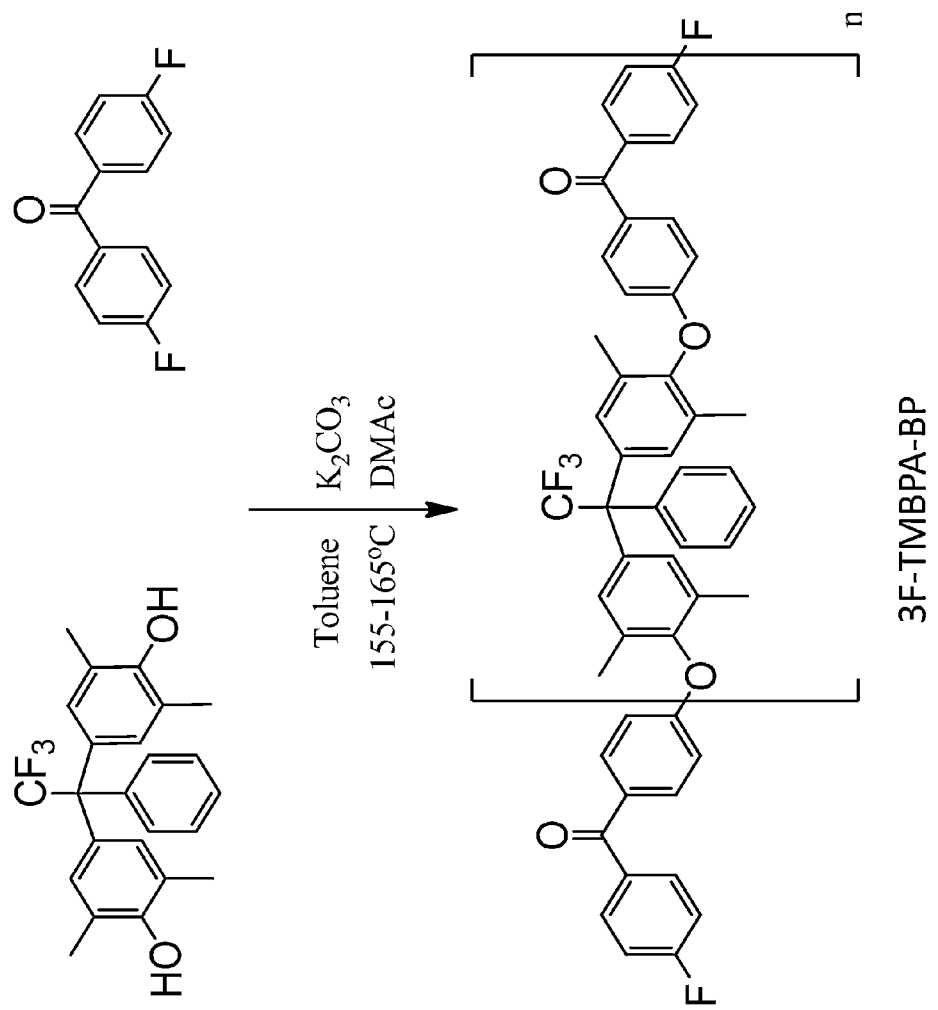
FIG. 17 is a diagram of a scheme for an exemplary synthesis of a polymer useful for the membranes of the present invention, namely 3F-TMBPA-BP.

3F-TMBPA-BP was synthesized as shown in FIG. 17 and formed into films. The films were crosslinked according to the same conditions described in Example 9. Data for the resulting crosslinked and uncrosslinked films are shown in Table 10 and FIG. 20. Table 11 shows a comparison of gel fraction and density data for TMBPA-BP and 3F-TMBPA-BP polymer films.

TABLE 10

Transport Properties of 3F-TMBPA-BP Films

| Film | Thickness (μm) | $O_2$ (Barrer) | $N_2$ (Barrer) | $O_2/N_2$ |
|---|---|---|---|---|
| UNXL | 49 | 7.8 | 1.6 | 4.9 |
| XL @ 365 nm | 40 | 5.0 | 0.89 | 5.6 |
| XL @ 254 nm | 40 | 3.5 | 0.46 | 7.6 |

TABLE 11

| Material | Film | Gel fraction* (%) | Density (g/mL) |
|---|---|---|---|
| TMBPA-BP (31 micron uncrosslinked) | Uncrosslinked | — | 1.089 |
|  | XL @ 365 nm | 98 | 1.628 |
|  | XL @ 254 nm | 47 | 1.107 |
| 3F-TMBPA-BP (49 micron uncrosslinked) | Uncrosslinked | — | 1.176 |
|  | XL @ 365 nm | 97 | 1.197 |
|  | XL @ 254 nm | 30 | 1.184 |

*Gel fraction was measured with thick films (~27 μm for TMBPA-BP and ~40 μm for 3F-TMBPA-BP) using a Soxhlet extractor.

Synthesis of Trifluoromethylphenyl Tetramethyl Bisphenol Monomer (3F-TMBPA)

The bisphenol monomer for synthesizing 3F-TMBPA-BP can be made as follows. Triflic acid (trifluoromethanesulfonic acid) was slowly added to a mixture of 2,6-xylenol and acetophenone in dichloromethane over 30 min at 20° C. to make a monomer of Compound 5. Crude product was stirred in refluxing water to remove excess 2,6-xylenol. Product was filtered off to yield orange off-white powder, 87% yield.

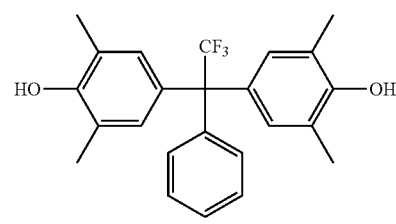

Compound 5

3F-TMBPA

Example 11

Effects of Varying Benzylic Methyl Group and/or Ketone Group Amounts in PAEK Polymer Films Films were made using PAEK polymers and analyzed for various properties.

Polymer Synthesis

An exemplary synthesis of the PAEK polymers is described as follows, which corresponds to sample PAEK 35/36-5-0 in Table 12 below. 21.50 g of TMBPA (0.0756 moles, Aldrich) and 16.57 g of DFBP (0.0759 Moles, Synquest Labs) was weighed into a 3-neck round bottom flask using a heating mantle as the heat source. The flask was equipped with a Dean-Stark type trap and reflux condenser, nitrogen head space purge and mechanical stirrer. 204.69 g of NMP was then added and the mixture stirred at room temperature until all of the monomers had dissolved. 49.57 grams of toluene was next added to the reactor as an azeotrope agent. The Dean-Stark trap was prefilled with toluene. Flask was refluxed with toluene to make sure system was free of water. Reactor was cooled to <80° C. and 11.98 g of potassium carbonate (0.0867 moles, Fisher Scientific) was added to reactor. Reaction was refluxed for at least 6 hours at 155-165° C. Toluene was then removed from reactor and it was cooled to room temperature overnight. The next day the reactor was heated to 175° C. Samples were pulled for SEC analysis and reaction was cooled when Mw reached the desired value. Typical reaction times were 4-12 hours. Polymer solution was filtered with Celite (Aldrich) through a 25 micron polypropylene filter and then through a 10 micron membrane filter to remove the KF salt byproduct.

Other PAEK polymers were synthesized according to the general procedure described above, but with varying precursor or reagent amounts (see Table 12). The precursors were varied to yield polymers with varying levels of benzylic methyl groups or ketone groups. These polymers were then used to make films that were analyzed as described below.

TABLE 12

| Ex. No. | Composition | TMBPA g (moles) | BPA g (moles) | DFBP g (moles) | DFDPS g (moles) | NMP g | Toluene g | K2CO3 g (moles) | Wt. avg. MW (daltons) |
|---|---|---|---|---|---|---|---|---|---|
| 11-1 | TMBPA/DFDPS | 17.07 (0.0600) | 0 | 0 | 15.34 (0.0603) | 170.6 | 42.7 | 10.01 (0.0724) | 65100 |
| 11-2 | TMBPA/10DFBP/90DFDPS | 20.06 (0.0709) | 0 | 1.55 (0.0071) | 16.22 (0.0638) | 196.8 | 48.63 | 11.70 (0.0847) | 128000 |
| 11-3 | TMBPA/20DFBP/80DFDPS | 23.06 (0.0811) | 0 | 3.57 (0.0164) | 16.66 (0.0655) | 224.5 | 56.87 | 13.44 (0.0972) | 70000 |
| 11-4 | TMBPA/30DFBP/70DFDPS | 19.79 (0.0696) | 0 | 4.59 (0.0210) | 12.44 (0.0489) | 192.06 | 48.15 | 11.14 (0.0806) | 111200 |
| 11-5 | TMBPA/50DFBP/50DFDPS | 26.51 (0.0932) | 0 | 10.28 (0.0471) | 11.98 (0.0471) | 256.9 | 63.7 | 15.52 (0.1120) | 72300 |
| 11-6 | TMBPA/70DFBP/30DFDPS | 20.95 (0.0737) | 0 | 11.35 (0.0520) | 5.68 (0.0223) | 201.34 | 120.63 | 12.22 (0.0884) | 62500 |
| 11-7 | TMBPA/DFBP | 21.50 (0.0756) | 0 | 16.57 (0.0759) | 0 | 204.69 | 49.57 | 11.98 (0.0867) | 84600 |
| 11-8 | BPA/DFBP | 0 | 16.76 (0.0734) | 16.19 (0.0742) | 0 | 168.85 | 42.45 | 12.25 (0.0886) | 80900 |
| 11-9 | 20TMBPA/80BPA/DFBP | 4.76 (0.0167) | 15.28 (0.0669) | 18.36 (0.0841) | 0 | 196.27 | 90.32 | 13.87 (0.1004) | 50100 |
| 11-10 | 30TMBPA/70BPA/DFBP | 8.03 (0.0282) | 15.05 (0.0659) | 20.73 (0.0950) | 0 | 225.36 | 57 | 15.63 (0.1131) | 47300 |
| 11-11 | 50TMBPA/50BPA/DFBP | 13.06 (0.0459) | 20.14 (0.0460) | 20.14 (0.0923) | 0 | 226.67 | 56.67 | 14.62 (0.1058) | 78100 |
| 11-12 | 70TMBPA/30BPA/DFBP | 17.78 (0.0625) | 6.12 (0.0268) | 17.74 (0.0813) | 0 | 227.66 | 58.9 | 14.82 (0.1072) | 52100 |
| 11-13 | TMBPA/BPA/DFBP/DFDPS | 9.99 (0.0351) | 8.03 (0.0351) | 7.79 (0.0357) | 9.06 (0.0357) | 180.86 | 41.69 | 11.65 (0.0843) | 53700 |

Gel Fraction

Gel fractions were determined by immersing about 0.1 g of the polymer film in THF in a glass vial for 16-20 hours. The vials were agitated occasionally (2-3 times). The swollen polymer was filtered onto pre-dried and weighed filter paper and washed with additional THF. The filter paper and filtered polymer were then dried overnight in a vacuum oven at 105° C. The sample is cooled in a desiccator and reweighed to determine the remaining polymer content. The gel fraction is ratio of the remaining polymer and the starting polymer weights. In some cases the filtrate from the process (soluble portion) was analyzed for molecular weight using SEC (GPC).

DMA/Molecular Weight Between Crosslinks

DMA analyses were performed using a TA Instruments RSA-G2 Rheometer and film/fiber fixture. The samples were cut to size using a die and press. The die dimensions were ½"wide by 3"long. Actual sample length in the instrument was 25 mm. The samples were analyzed in tension from 25 to 350° C. The temperature was ramped at a rate of 3° C./min taking data every 30 seconds. A preload of 100 g was applied to the sample at the start of the test. Measurements were taken using a frequency of 6.28 rad/sec.

Molecular weight between crosslinks was determined using the Theory of Rubber Elasticity using the following formula:

$$Mc = 3(d*T*R)/E'$$

Where: d=density=1
T=Temperature (° K)
R=Universal Gas Constant=83140000
E=Storage Modulus SEC (GPC) Molecular Weight Determination The samples were analyzed using a Waters Alliance 2695 HPLC unit equipped with a 2414 Refractive Index Detector. Two PL1110-6100LS columns (Agilent Technologies) are used in series with tetrahydrofuran (THF) as the mobile phase at 35° C. Molecular weight results are calibrated relative to polystyrene standards (Easical PS-1, Agilent Technologies). Samples are prepared in THF at approximately 0.15% solids with 1-methyl-2-pyrrolidinone (NMP) as the reference.

Transport

Permeation coefficients were measured on a Dow Cell permeation unit. Film sections were cut into ~4"diameter circular pieces for permeation testing. These films were then masked so that 4 cm diameter films were exposed for permeation testing and were sealed by a viton o-ring into a brass cell. The film formed a semi-permeable barrier between two compartments in the cell.

During the experiment, a slow purge of pure gas is passed across the upper surface of the membrane and vented through a silicone oil-filled bubbler. The opposite (lower) membrane surface and cell compartment is initially under vacuum. The permeability of the gas is determined by measuring the pressure rise in the lower compartment as a function of time, generally up to ~3 torr but to ~0.5 torr when the transmission rate is very slow. The measurement is performed until repeatable permeation values are achieved.

The transmission rate was calculated from the pressure rise data using the ideal gas law (since the system volume and temperature are known) and from knowledge of the sample area exposed during the experiment. The transmission rate is a measure of the flux of gas through the membrane and as such has units of gas quantity transmitted per area per time. The transmission rate (or flux) was evaluated by dividing the rate of mass transfer (quantity transmitted per time) by the cross-sectional area of the sample. This flux value was then converted to a permeation coefficient (P*) using Equation 1:

$$P^* = \frac{\text{Flux} \times L}{\Delta P} \quad (1)$$

Here, L is the sample thickness and ΔP is the differential pressure driving force. For the permeation test, ΔP is equal to ~1 atm since pure gas flows on one side of the membrane in an open system while the other side is under vacuum (~0 torr). Sample thickness and diameter were measured with a micrometer prior to analysis. The permeability is generally expressed in units of Barrers where 1 Barrer is equal to $10^{-10}$ $cm^3$ STP-cm/($cm^2$-cm Hg-sec).

Film Casting

The polymer, dissolved in NMP, is drawn down on glass plates using a 20 mil (0.020") draw down bar. % Solids of the polymer solution is typically between 15 and 20% to obtain suitable viscosity for casting. Films were dried under vacuum (<10 Torr with slight $N_2$ sweep) using the following temperature program: heat 2° C./min to 60° C. and hold for 1 hour, heat at 2°/min to 100° C. and hold for 1 hour, heat at 2°/min to 150° C. and hold for 1 hour, heat at 2°/min to 200° C. and hold for 12 hours; cool to room temperature under vacuum. The films were removed from the glass plates by soaking and water and then were air-dried. Uniform sections of the film measuring about 3"×4" were then UV crosslinked.

UV Crosslinking Films were crosslinked using a Fusion LC-6B Benchtop Conveyor equipped with an F-300S UV lamp (Heraeus Nobelight Fusion UV Inc.). The conveyor is operated at 6-7 feet/min. An H bulb with significant intensity in the 190-300 nm range was used. Films are sandwiched between a coated steel test panel (ACT B952 P60, ACT Test Panels LLC) and a ⅛"thick quartz glass plate (Chemglass). Quartz has a UV cutoff <190 nm. Films are sent through the conveyor for multiple passes as necessary to achieve the desired exposure. The UV energy that the film is exposed to is a function of the belt speed and the lamp intensity. A UV Power Puck (EIT) is sent through the conveyor before and after each set of 4 passes. A ⅛"quartz plate is also used to cover the detector. The UV energy measured by the puck is recorded. Energy values (J/$cm^2$) measured for each run are averaged and multiplied by the number of passes through the conveyor. Results are reported for UVC (250-260 nm) and UVB (280-320 nm). The lamp system is turned off and the system is allowed to cool for 3-6 minutes after each set of 4 passes to minimize thermal heating of the films. Maximum temperature measured by the Power Puck was <43° C. The films are flipped after 2 passes so that each side receives equal exposure.

Results

The data for the samples in Example 11 are given in FIGS. 19 and 20. In this example the amount of the benzylic methyls (TMBPA) or UV activator (DFBP) are varied. Most of the examples show an increase in crosslinking with increase in UV exposure (number of passes through UV system) as measured by gel fraction and molecular weight between crosslinks ($M_c$). In addition, as the crosslinking increases a significant increase in the gas pair selectivity (α) is observed, accompanied by a modest decrease in the gas permeability (P).

FIG. 19 shows the impact of reducing the TMBPA content in the polymer and replacing it with BPA which lacks benzylic methyls or methylenes. When the mole fraction of TMBPA is reduced below 0.3 (Examples 11-8 and 11-9) there is little effective crosslinking in the films even at high UV exposures (20 passes) as measured by gel fraction or $M_c$. A significant increase in a is also not observed. The concentration of benzylic methyls is not high enough to enable effective crosslinking. The crosslinking that does occur may involve other sites in the polymer.

Similarly, FIG. 20 shows the impact in reducing the DFBP component, the UV activator and replacing it with DFDPS. When the mole fraction of DFBP is reduced below 0.1 we no longer obtain a crosslinked film even at high UV exposures (20 passes). Significant degradation is observed in Example 11-1 with UV exposure. The weight average molecular weight Mw of the soluble portion of the cured film was reduced to 50600 for the film cured with 10 passes and 48900 for the film cured with 20 passes as compared to 65100 for the uncured polymer. In addition the polymer has become embrittled with UV exposure. The 4, 10 and 20 pass films for Example 11-1 all readily break when creased while the control uncured polymer is easily creased without breaking. Similarly, Example 11-2 cured with 20 passes is also embrittled and breaks when creased. The films of all of the other examples, both cured and uncured can all be creased without breaking. Embrittlement of the polymer will limit its applicability in membrane applications due to poor mechanical properties. Example 11-2 appears to be on the edge of acceptable performance. While it does crosslink to a high degree, degradation is also occurring which will limit its applicability. Only a small amount of DFBP is required to overcome the degradation of the DFDPS component and result in a crosslinked polymer with high gel fraction as shown in Example 11-3.

In order to get sufficient crosslinking and improved performance it is preferred to have at least about 2 meq/g polymer and more preferably at least about 3 meq/g polymer of benzylic methyl, methylene, or methine groups. This is achieved when the mole fraction of TMBPA is preferably greater than about 0.2 and more preferably greater than about 0.3 in a MBPA/BPA/DFBP copolymer. To demonstrate this calculation, for a copolymer of the composition 20TMPBA/80BPA/DFBP (for shorthand, DFBP refers to 100DFBP relative to the 20/80 TMPBA/BPA mix), the copolymer can be represented by an average repeat unit having an equivalent weight 418. This repeat unit contains on average of 0.8 methyl equivalents per unit. Thus, in this example, the co-polymer contains approximately 2 meq/g of methyl groups.

Similarly, in order to get sufficient crosslinking and improved performance it is preferred to have at least about 0.2 meq/g polymer and more preferably at least about 0.4 meq/g of UV activator groups such as benzophenone. This is achieved when the mole fraction of DFBP is greater than about 0.1 and more preferably greater than about 0.2 in a TMBPA/DFBP/DFDPS copolymer.

Example No. 11-14

Udel P3500 polysulfone was purchased from Solvay. This polymer is Bisphenol A diphenylsulfone which contains neither the benzylic methyls (methylenes) nor UV activator and is outside the parameters of this invention. Films were prepared and tested using the same methods as in Example 11.

FIG. 21 shows the properties for the Udel polysulfone (Example No. 11-14). The polymer only crosslinks slightly in response to UV cure as measured by gel fraction and $M_c$. While the $M_w$ of the soluble portion of the film remains constant the molecular weight distribution ($M_w/M_n$) increases significantly from 2.7 to 3.8 indicating a mixture of polymer degradation with some crosslinking. There is also no significant improvement in α under these conditions. In addition, the 10 and 20 pass films have become more brittle. UV degradation of polysulfone films is well known in the literature (A. Rivaton, J. L. Gardette, Polymer Degradation and Stability, 66 (1999) 385-403).

Example 11-15

A 50/50 weight % blend of Example Nos. 11-13 and Example No. 11-14 (Udel polysulfone). Films were prepared and tested using the same methods as in Example 11. Clear films were obtained indicating significant compatibility. The blend film was cured using 20 passes through the UV equipment. High gel fraction was obtained indicating crosslinking.

Example 12

Hydrolytic Stability of Cross-linked PAEK Materials

To examine the hydrolytic stability of XL-PAEK materials, samples of TMBPA-DFBP and TMBPA-MBFB were subjected to an accelerated aging test.

Polymers were synthesized as described previously in examples 1 and 2. Films were cast from a 2% solution of polymer in chloroform, which was partially covered and allowed to dry slowly overnight under ambient conditions. Films were further dried under vacuum at 100° C. for 24 hours. The resulting films were nominally 10 m thick. These films were UV-crosslinked using a low pressure mercury lamp with peak wavelength of 365 nm. Each side of the films were exposed at a fluence of 4 J/cm² over a period of about 1 hour. Film samples exposed in this manner were characterized for gel fraction in a Soxhlet extractor, all samples had gel fractions in excess of 98%. Half of the samples were placed into a sealed stainless steel exposure chamber along with a quantity of liquid water. Air was removed from the chamber using a vacuum pump, and the chamber was placed into an oven at 120° C. for 7 days. At this temperature, water vapor in the cell was maintained at a pressure of 2 bar (i.e., at the saturation pressure). Each material was tested for light gas permeability before and after the exposure period in order to probe for subtle changes in polymer microstructure. Results of the permeation tests are shown in Table 13. Both samples maintained their original selectivity with very little change in permeability. FTIR-ATR was used to probe for changes to chemical structure upon exposure. No discernible changes were observed in the spectra.

This same exposure protocol was used to test a polyimide film made from HAB-6FDA. The polyimide film was severely degraded under these conditions. The film became extremely brittle and changed color from light yellow before exposure to black. The physical changes to the polyimide film rendered it unusable as a permeation membrane.

TABLE 13

Permeability [Barrer] and selectivity at 35° C. and 10 atm before and after exposure

|  | Before Exposure | | | After Exposure | | |
| --- | --- | --- | --- | --- | --- | --- |
|  | $CO_2$ | $N_2$ | $CO_2/N_2$ | $CO_2$ | $N_2$ | $CO_2/N_2$ |
| TMBPA-DFBP | 12.3 | 0.53 | 23 | 12.6 | 0.55 | 23 |
| TMBPA-MBFB | 4.2 | 0.18 | 23 | 4.3 | 0.19 | 23 |

Example 13

Poly(2,6-dimethylphenylene oxide)-poly(arylene ether ketone) Blends

A blend of a low molecular weight poly(2,6-dimethylphenylene oxide) oligomer (1600 g/mole number average molecular weight) was blended with a poly(arylene ether ketone) prepared from bisphenol A and difluorobenzophenone. The number average molecular weight of the poly(arylene ether ketone) was 26,000 g/mole. The composition of the components in the blend was 33.33 wt % poly(2,6-dimethylphenylene oxide) and 66.67 wt % poly(arylene ether ketone). The blend produces a transparent film with a single glass transition temperature as measured by Dynamic Scanning Calorimetry (DSC) that is intermediate between the two components, suggesting that the blend consists of two miscible polymers.

In this case, the blend was dissolved in chloroform (~2% w/v), stirred for 1 h, and the solution was filtered through a 5-μm Teflon syringe filter. Afterwards, the solution was cast onto a clean glass plate and dried at 80° C. under partial vacuum (−25 cmHg) for 12 hours. The film was carefully peeled off and sandwiched between two glass plates covered with Al foil. Then, the film was heated under vacuum overnight at 130° C. to remove the residual solvent. Solvent removal was checked using thermogravimetric analysis (TGA).

The blend was crosslinked under UV irradiation at each of two wavelengths, either at 254 nm or at 365 nm. The crosslinking at 365 nm was done via a high-intensity, long-wavelength mercury UV lamp (Model B-100, UVP, Upland, Calif., USA) equipped with a 365 nm light filter. The measured UV intensity was 19.7 mW/cm². Each sample was irradiated at a distance of 3.5 cm from the UV lamp for one hour per side. UV crosslinking at 254 nm was done via a UV apparatus (Model XL-1000, Spectroline, Westbury, N.Y., USA) equipped with five light bulbs with 254 nm light filters. The reported UV intensity for this apparatus was 3.6 mW/cm². Each film was irradiated at a distance of 10 cm from the UV bulbs for one hour per side.

In this Example, gel fractions of the crosslinked samples were measured using a soxhlet extractor with chloroform as the solvent. After six hours of extraction, the crosslinked sample was dried at 100° C. for 12 hours under vacuum and the weight was compared to the starting weight to determine the gel fraction.

The oxygen and nitrogen permeabilities and their selectivities are shown in Table 14.

TABLE 14

Permeabilities and selectivities of the blend before crosslinking, after crosslinking with 365-nm light, and after crosslinking at 254 nm.

| Polymer | Gas permeability (Barrer) and Selectivity @ 10 atm & 35° C. | | | Gel Fraction (%) |
|---|---|---|---|---|
|  | $O_2$ | $N_2$ | $O_2/N_2$ |  |
| PPO-BPA-PAEK UNXL | 0.97 | 0.159 | 6.1 | NA |
| PPO-BPA-PAEK XL @ 365 nm | 0.74 | 0.115 | 6.4 | 67 |
| PPO-BPA-PAEK XL @ 254 nm | 0.64 | 0.088 | 7.3 | ~0.5 |

As the results show, substantial crosslinking occurred upon exposure to the 365 nm irradiation, resulting in an increase in the $O_2/N_2$ selectivity. At 254 nm, very little crosslinking occurred in the bulk. One skilled in the art would recognize that crosslinking of these films requires a balance of transparency to and absorption of the wavelength of irradiation. For example, if the absorption is too strong, only the very surface of the film will get crosslinked and the irradiation will not penetrate into the bulk of the film. It is presumed that at 254 nm, virtually all of the irradiation is absorbed at the surface, which leads to sufficient crosslinking at the surface to enhance the selectivity while still leaving the bulk of the film uncrosslinked. However, in some applications, a relatively high degree of crosslinking at the surface with a relatively low level of crosslinking in the bulk, i.e., a relatively non-uniform degree of crosslinking, may be desirable. A non-limiting example of such an application is a hollow fiber membrane. Other examples can include any use of a polymer in a thin film or any other application involving the use of a polymer in a component having a relatively high surface area compared to bulk volume.

Example 14

Synthesis of Poly(phenylene oxide)-poly(arylene ether ketone) Copolymers (PPO-PAEK)

Copolymers were synthesized via nucleophilic aromatic substitution. A representative synthesis is provided. Sabic PPO™ SA-90, a difunctional PPO oligomer of ~1,650 g/mol (8.70 g, 5.27 mmol), difluorobenzophenone (1.15 g, 5.27 mmol), and DMAc (50 mL) were charged into a 100-mL, 3-neck, round-bottom flask equipped with a mechanical stirrer, nitrogen inlet and Dean-Stark trap. The mixture was heated to 140° C. and stirred until the monomers were completely dissolved. Once dissolved, $K_2CO_3$ (1.10 g, 7.96 mmol) and toluene (25 mL) were added into the flask. The reaction was allowed to reflux at 140° C. for 4 h to azeotropically remove water from the system and then it was slowly heated to 160° C. to remove toluene. The reaction was allowed to proceed at 160° C. for 12 h and then cooled to room temperature. After 12 h the solution was very viscous, and was diluted with 50 mL of DMAc. Filtration of the solution to remove the by-product salt was difficult. Therefore, the product was precipitated into boiling DI water to afford a white fibrous product. Afterwards, the copolymer was stirred in DI water (~80° C.) overnight to remove any residual salt or solvent, filtered, and then dried in vacuo at 180° C. for 24 h.

The polymer obtained above was cast as a film as described in Example 8. The film was crosslinked using the following conditions: type of treatment: UV Lamp; UV wavelength: 365 nm; environment: air, Exposure time: 1 hr each side; UV bulb intensity: 19.7 mW/cm².

After crosslinking, the gel fraction was 94% and the gas transport properties were measured. Results are shown in Table 15 below.

TABLE 15

| Polymer | Gas Permeability (Barrer) and Selectivity at 10 atm & 35° C. | | |
|---|---|---|---|
|  | $O_2$ | $N_2$ | $O_2/N_2$ |
| PPO-PAEK | 11 | 2.40 | 4.7 |
| PPO-PAEK-XL | 5.0 | 0.95 | 5.3 |

Example 15

Thermal Crosslinking of TMBPA/DFBP PAEK polymer

A polymer derived from TMBPA and DFBP of molecular weight 61,000 was cast as a film and placed in an oven under a flow of air. After heating at 275° C. for one hour a small amount of crosslinking occurred resulting in a gel fraction of <10%. Heating for about 12 hours under the same conditions gave a gel fraction of 91%, indicating substantial crosslinking with the longer heating period.

Example 16

Synthesis of TMHO-DFB and MHO-DFB

Figure 22:
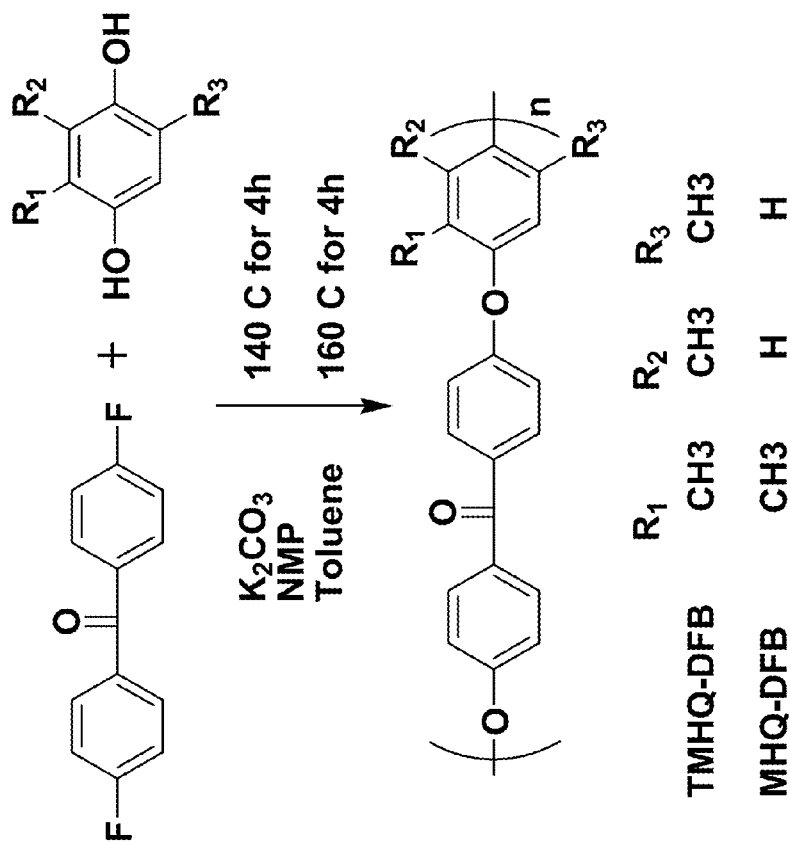
FIG. 22 is a diagram of a scheme for an exemplary synthesis of a PAEK polymer from a hydroquinone.

An exemplary synthesis of a PAEK polymer from a hydroquinone is shown in FIG. 22. Embodiments of the synthesis are described below.

Synthesis of a Poly(arylene ether ketone) from Trimethylhydroquinone and Difluorobenzophenone Trimethylhydroquinone (5.000 g, 0.033 mol), difluorobenzophenone (7.168 g, 0.033 mol), and potassium carbonate (4.768 g, 0.034 mol) were charged to a 3-necked, 250-mL roundbottom flask equipped with an overhead mechanical stirrer, a Dean-Stark trap containing ~30 mL of toluene with a condenser, and a nitrogen inlet. N-methylpyrrolidone (NMP, 60 mL) and toluene (30 additional mL) were added to dissolve the monomers. The reaction bath was heated to 140° C. and kept at this temperature for 4 h to dehydrate the system by distilling the water/toluene azeotrope. After 4 hours, the toluene was removed and the reaction was continued for another 4 h at 160° C. The reaction mixture was allowed to cool to room temperature, then filtered through a Buchner funnel with coarse filter paper to remove the insoluble salt. The solution was then diluted with ~40 mL of NMP and precipitated into DI water. The precipitated polymer was stirred in hot DI water for 24 h, and then dried under vacuum at 120° C. for 18 h. The weight average molecular weight was 93,100 g/mole (measured by size exclusion chromatography).

Synthesis of Poly(arylene ether ketone) from Methylhydroquinone and Difluorobenzophenone Methylhydroquinone (5.000 g, 0.040 mol), difluorobenzophenone (8.785 g, 0.040 mol), and potassium carbonate (5.843 g, 0.042 mol) were charged to a 3-necked, 250-mL roundbottom flask equipped with an overhead mechanical stirrer, a Dean-Stark trap containing ~30 mL of toluene with a condenser, and a nitrogen inlet. N-methylpyrrolidone (NMP, 70 mL) and toluene (35 additional mL) were added to dissolve the monomers. The reaction bath was heated to 140° C. and kept at this temperature for 4 h to dehydrate the system by distilling the water/toluene azeotrope. After 4 hours, the toluene was removed and the reaction was continued for another 4 h at 160° C. The reaction mixture was allowed to cool to room temperature, then filtered through a buchner funnel with coarse filter paper to remove the insoluble salt. The solution was then diluted with ~40 mL of NMP and precipitated into DI water. The precipitated polymer was stirred in hot DI water for 24 h, and then dried under vacuum at 120° C. for 18 h. The weight average molecular weight was 41,800 g/mole (measured by size exclusion chromatography).

Films were cast from these materials by dissolving the polymer in NMP by stirring overnight at room temperature, filtering the solution through a 0.45 μm PTFE syringe filter, sonicating the solution for ~1 h, cooling to room temperature, then casting on a glass plate. The film was partially dried at room temperature for 2 h in a vacuum oven, then the temperature of the vacuum oven was raised to 100° C. and the film was further dried for 8 h under these conditions. The film was cooled to room temperature and the glass plate and film were soaked in DI water for 18 h. During this time the film released from the glass plate. The film was dried at 80° C. for 1 h, then dried under vacuum in the vacuum oven at 100° C. for 18 h.

Example 17

Figure 23:
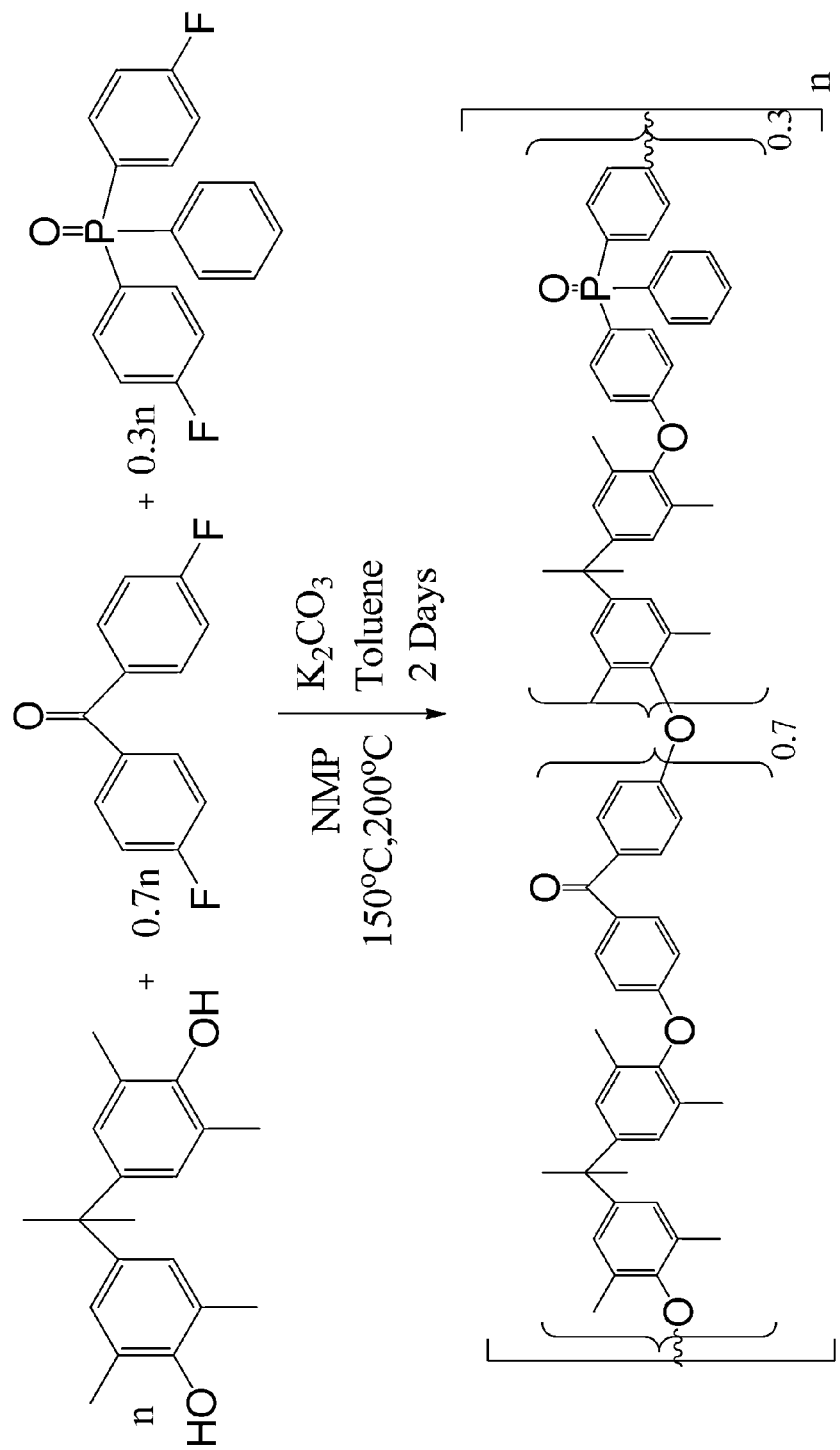
FIG. 23 is a diagram of a scheme for an exemplary synthesis of a Tetramethylbisphenol-A-difluorobenzophenone-bis(4-fluorophenyl) phenyl phosphine oxide random copolymer.

Synthesis of Tetramethylbisphenol-A-Difluorobenzophenone-Bis(4-Fluorophenyl)Phenyl Phosphine Oxide Random Copolymer The scheme for the synthesis of a Tetramethylbisphenol-A-Difluorobenzophenone-Bis(4-Fluorophenyl) Phenyl Phosphine Oxide Random Copolymer is shown in FIG. 23. A 250 mL, 3-neck flask equipped with a Dean Stark trap, a condenser, a motorized glass rod stirrer and a nitrogen inlet was charged with 2.6854 (0.0123 moles) of difluorobenzophenone, 5 g (0.0176 moles) of tetramethylbisphenol A, 1.6576 g {0.0052 moles} of bis(4-fluorophenyl)phenyl phosphine oxide and 31 mL of N-methyl-2-pyrrolidone so that the concentration of the reactants was ca. 0.3 g/mL. The dean stark trap was filled with 30 mL of toluene and the reaction flask was heated to 120° C. Toluene (16 mL) and potassium carbonate (1.832 g, 0.0246 moles) were added to the reaction flask as azeotroping agent and base respectively. The temperature was increased to 150° C. to distill the water-toluene azeotrope as it formed. The system was allowed to dehydrate at 150° C. for 4 hours after which the temperature was raised to 200° C. The system was held at 200° C. for 40 hours. A viscous dark brown solution was obtained. The reaction mixture was cooled to room temperature and the solution was first filtered to remove inorganic salts and then precipitated in deIonized water to obtain a fibrous brown polymer. The polymer fibers were boiled in water for 4 hours to remove excess solvent and any residual salts. The fibers were then filtered and dried at ca 130° C. in a vacuum oven for 12 hours before casting a film.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A composition for a gas separation membrane, wherein the composition comprises at least one crosslinked polymer having the structure of formula (I):

wherein in formula (I):
A is selected from the group consisting of:
—$Ar_1$-Q-$Ar_2$—, —$Ar_1$—, and —$Ar_1$—$Ar_2$—
B is selected from the group consisting of:
—$Ar_1'$-Q'-$Ar_2'$—, —$Ar_1'$—, and —$Ar_1'$—$Ar_2'$—;
$Ar_1$, $Ar_2$, $Ar_1'$, and $Ar_2'$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group;
each occurrence of $R^1$ is independently selected from the group consisting of H, halo, —CN, —$SO_3H$ or a salt thereof, —$CO_2H$ or a salt thereof, —$C_1$-$C_{10}$ alkyl, —$C_1$-$C_{10}$ alkoxy, —$C_1$-$C_{10}$ haloalkyl, —$C_1$-$C_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;
Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;
Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl- (C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;
p is an integer from 1 to 10; and
q is an integer from 1 to 10;
wherein at least one occurrence of Ar$_1$, Ar$_2$, Ar$_1'$, or Ar$_2'$ is substituted with an R$^1$ group comprising a benzylic hydrogen, and at least one occurrence of Q or Q' includes a UV activator, wherein the UV activator is a carbonyl group.

2. The composition of claim 1, wherein the at least one occurrence of Ar$_1$, Ar$_2$, Ar$_1'$, or Ar$_2'$ substituted with an R$^1$ group comprising a benzylic hydrogen, and the at least one occurrence of Q or Q' including a UV activator are on the same polymer.

3. The composition of claim 1, wherein A is —Ar$_1$-Q-Ar$_2$— and B is —Ar$_1'$-Q'-Ar$_2'$—.

4. The composition of claim 1, wherein Ar$_1$, Ar$_2$, Ar$_1'$ and Ar$_2'$ are each phenyl, further wherein each phenyl is independently optionally substituted with 1-2 R$^1$ groups.

5. The composition of claim 1, wherein the polymer comprises at least one crosslink formed via a reaction between a benzylic hydrogen and a Q or Q' carbonyl group.

6. The composition of claim 1, wherein the polymer has the structure of formula (II):

(II)

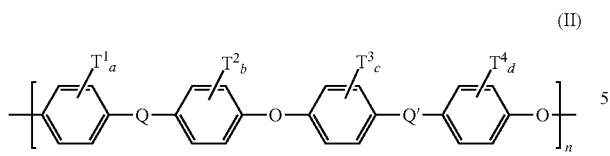

wherein in formula (II):
each occurrence of $T^1$, $T^2$, $T^3$, and $T^4$ is independently selected from the group consisting of H, halo, —CN, —SO$_3$H or a salt thereof, and —C$_1$-C$_{10}$ alkyl;
Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl- (C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;
a is an integer from 0 to 4;
b is an integer from 0 to 4;
c is an integer from 0 to 4;
d is an integer from 0 to 4;
p is an integer from 1 to 10; and
q is an integer from 1 to 10
wherein at least one occurrence of $T^1$, $T^2$, $T^3$, or $T^4$ comprises a benzylic hydrogen, and at least one occurrence of Q or Q' includes a carbonyl group.

7. The composition of claim 6, wherein Q and Q' are selected from the group consisting of: (a) Q is —C(CH$_3$)$_2$— and Q' is —C(=O)—; (b) Q is —C(CH$_3$)$_2$— and Q' is —C(=O)C$_6$H$_4$C(=O)—; (d) Q is —C(CH$_3$)$_2$—C$_6$H$_4$—C(CH$_3$)$_2$— and Q' is —C(=O)—; and (e) Q is —C(CF$_3$)(C$_6$H$_4$)— and Q' is —C(=O)—.

8. The composition of claim 1, wherein the polymer has a structure selected from the group consisting of: the structure of formula (III):

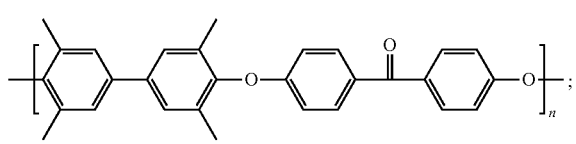

(III)

the structure of formula (IV):

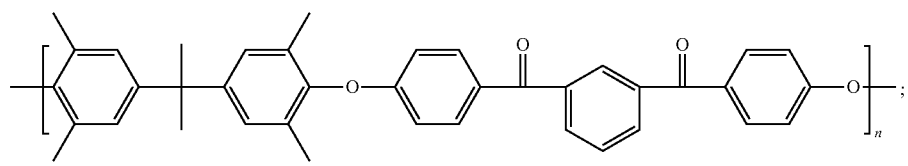

(IV)

the structure of formula (V):

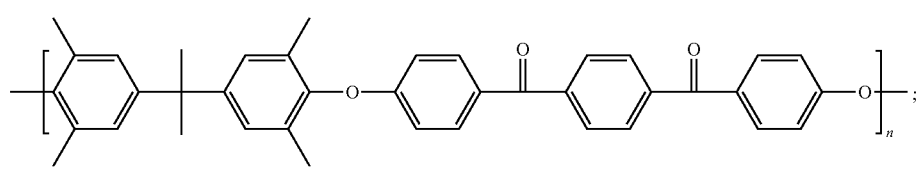

(V)

the structure of formula (VI):

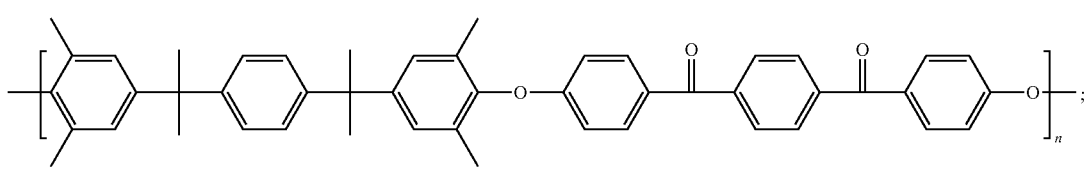

(VI)

and the structure of formula (VII):

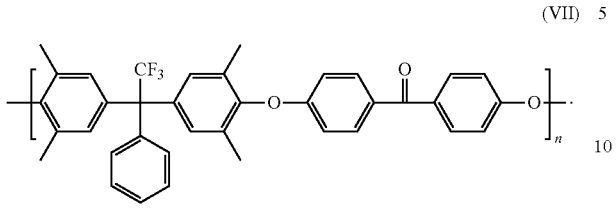

9. A composition for a gas separation membrane, wherein the composition comprises a crosslinked copolymer comprising structural units (A-O) and (B—O), wherein
A is selected from the group consisting of:
—$Ar_1$-Q-$Ar_2$—, —$Ar_1$—, and —$Ar_1$—$Ar_2$—;
B is selected from the group consisting of:
—$Ar_1'$-Q'-$Ar_2'$—, —$Ar_1'$—, and —$Ar_1'$—$Ar_2'$—;
$Ar_1$, $Ar_2$, $Ar_1'$, and $Ar_2'$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group
each occurrence of $R^1$ is independently selected from the group consisting of H, halo, —CN, —$SO_3H$ or a salt thereof, —$CO_2H$ or a salt thereof, —$C_1$-$C_{10}$ alkyl, —$C_1$-$C_{10}$ alkoxy, —$C_1$-$C_{10}$ haloalkyl, —$C_1$-$C_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;
Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)N$R^1$—;
Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C($R^1$)($R^1$)—, C(=O)NH—, —P(=O)$C_6H_5$—, —C(CH$_3$)(CF$_3$)—, —C(=O)$C_6H_4$C(=O)—, —C($R^1$)($R^1$)—$C_6H_4$—C($R^1$)($R^1$)—, -phenyl-($C_1$-$C_6$)alkyl, -phenyl-($C_1$-$C_6$)haloalkyl, phenyl, cycloalkyl, and heterocyclyl, wherein the phenyl, cycloalkyl, and heterocyclyl groups are optionally substituted; or the two $R^1$ groups in —C($R^1$)($R^1$) may be joined together to form a ring, wherein the ring is optionally substituted;
p is an integer from 1 to 10; and
q is an integer from 1 to 10
wherein at least one occurrence of $Ar_1$, $Ar_2$, $Ar_1'$, or $Ar_2'$ is substituted with an $R^1$ group comprising a benzylic hydrogen, and at least one occurrence of Q or Q' includes a activator, wherein the UV activator is a carbonyl group.

10. The composition of claim 9, further comprising the structural unit (D-O), wherein D is selected from the group consisting of:
—$Ar_1''$-Q''-$Ar_2''$—, —$Ar_1''$—, and —$Ar_1''$—$Ar_2''$—;
wherein $Ar_1''$ and $Ar_2''$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group;

Q'' is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C($R^1$)($R^1$)—, C(=O)NH—, —P(=O)$C_6H_5$—, —C(CH$_3$)(CF$_3$)—, —C(=O)$C_6H_4$C(=O)—, —C($R^1$)($R^1$)—$C_6H_4$—C($R^1$)($R^1$)—, -phenyl-($C_1$-$C_6$) alkyl, -phenyl-($C_1$-$C_6$)haloalkyl, phenyl, cycloalkyl, and heterocyclyl, wherein the phenyl, cycloalkyl, and heterocyclyl groups are optionally substituted; or the two $R^1$ groups in —C($R^1$)($R^1$) may be joined together to form a ring, wherein the ring is optionally substituted;
p is an integer from 1 to 10; and
q is an integer from 1 to 10.

11. The composition of claim 10, further comprising the structural unit (E-O), wherein E is selected from the group consisting of:
—$Ar_1'''$-Q'''-$Ar_2'''$—, —$Ar_1'''$—, and —$Ar_1'''$—$Ar_2'''$—;
wherein $Ar_1'''$ and $Ar_2'''$ are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group;
Q''' is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C($R^1$)($R^1$)—, C(=O)NH—, —P(=O)$C_6H_5$—, —C(CH$_3$)(CF$_3$)—, —C(=O)$C_6H_4$C(=O)—, —C($R^1$)($R^1$)—$C_6H_4$—C($R^1$)($R^1$)—, -phenyl-($C_1$-$C_6$)alkyl, -phenyl-($C_1$-$C_6$) haloalkyl, phenyl, cycloalkyl, and heterocyclyl, wherein the phenyl, cycloalkyl, and heterocyclyl groups are optionally substituted; or the two $R^1$ groups in —C($R^1$)($R^1$) may be joined together to form a ring, wherein the ring is optionally substituted;
p is an integer from 1 to 10; and
q is an integer from 1 to 10.

12. A composition for a gas separation membrane, wherein the composition comprises a crosslinked copolymer having the structure of formula (VIII):

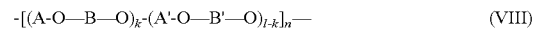

wherein in formula (VIII):
A is selected from the group consisting of:
—$Ar_1$-Q-$Ar_2$—, —$Ar_1$—, and —$Ar_1$—$Ar_2$—;
B is selected from the group consisting of:
—$Ar_1'$-Q'-$Ar_2'$—, —$Ar_1'$—, and —$Ar_1'$—$Ar_2'$—;
A is selected from the group consisting of:
—$Ar_1''$-Q''-$Ar_2''$—, —$Ar_1''$—, and —$Ar_1''$—$Ar_2''$—;
B' is selected from the group consisting of:
—$Ar_1'''$-Q'''-$Ar_2'''$—, —$Ar_1'''$—, and —$Ar_1'''$—$Ar_2'''$—;
$Ar_1$, $Ar_2$, $Ar_1'$, $Ar_2'$, $Ar_1''$, $Ar_2''$, $Ar_1'''$, and $Ar_2'''$, are each independently a bivalent $C_5$-$C_{24}$ arylene or a bivalent $C_5$-$C_{24}$ heterocyclic ring, and wherein the arylene or heterocyclic ring is independently optionally substituted with at least one $R^1$ group;
each occurrence of $R^1$ is independently selected from the group consisting of H, halo, —CN, —$SO_3H$ or a salt thereof, —$CO_2H$ or a salt thereof, —$C_1$-$C_{10}$ alkyl, —$C_1$-$C_{10}$ alkoxy, —$C_1$-$C_{10}$ haloalkyl, and —$C_1$-$C_{10}$ haloalkoxy; or two or more $R^1$ groups may be joined together to form a ring; or two $R^1$ groups may be covalently bonded to Y;
Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NH—;

Q, Q', Q", and Q''' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

p is an integer from 1 to 10; and q is an integer from 1 to 10, wherein k represents a number from 0.001 to 0.999, and wherein at least one occurrence of Ar$_1$, Ar$_2$, Ar$_1$', Ar$_2$', Ar$_1$", Ar$_2$", Ar$_1$''', or Ar$_2$''' is substituted with an R$^1$ group comprising a benzylic hydrogen, and at least one occurrence of Q, Q', Q", or Q''' includes a carbonyl group.

13. The composition of claim 1, wherein the polymer is blended with one or more additional polymers prior to crosslinking.

14. The composition of claim 13, wherein the one or more additional polymers comprises at least one of poly(2,6 dimethylphenylene oxide) (PPO) and polysulfone.

15. The composition of claim 1, wherein the polymer includes at least about 2 meq/g of benzylic methyl, methylene, or methine groups, and at least about 0.2 meq/g of a UV activator.

16. The composition of claim 1, wherein the composition has a gel fraction of at least 20%.

17. The composition of claim 1, wherein the polymer is crosslinked via ultraviolet radiation.

18. A membrane for the separation or purification of a gas mixture, comprising the composition of claim 1.

19. The membrane of claim 18, having a mixed gas selectivity selected from the group consisting of: an O$_2$/N$_2$ selectivity of at least about 6; a H$_2$/N$_2$ selectivity of at least about 85; a H$_2$/CH$_4$ selectivity of at least about 140; and combinations thereof.

20. The membrane of claim 18, wherein the membrane is a hollow fiber membrane.

21. A composition for a gas separation membrane, wherein the composition comprises a crosslinked polymer formed by exposing to energetic radiation at least one polymer having the structure of formula (I):

   (I)

wherein in formula (I):

A is selected from the group consisting of:
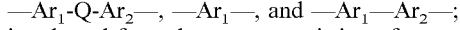

B is selected from the group consisting of:
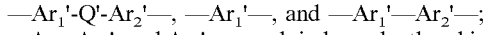

Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more R$^1$ groups may be joined together to form a ring; or two R$^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl-(C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;

p is an integer from 1 to 10; and q is an integer from 1 to 10;

wherein at least one occurrence of Ar$_1$, Ar$_2$, Ar$_1$', or Ar$_2$' is substituted with an R$^1$ group comprising a benzylic hydrogen, and at least one occurrence of Q or Q' includes a UV activator, wherein the UV activator is a carbonyl group.

22. The composition of claim 21, wherein the at least one occurrence of Ar$_1$, mAr$_2$, Ar$_1$', or Ar$_2$' substituted with an R$^1$ group comprising a benzylic hydrogen, and the at least one occurrence of Q or Q' including a UV activator are on the same polymer.

23. The composition of claim 21, wherein the at least one occurrence of Ar$_1$, Ar$_2$, Ar$_1$', or Ar$_2$' substituted with an R$^1$ group comprising a benzylic hydrogen, and the at least one occurrence of Q or Q' including a UV activator are on different polymers.

24. A method of gas separation, comprising: feeding a gas mixture to a gas separation module, wherein the gas separation module comprises at least one membrane as in claim 18.

25. The method of claim 24, wherein the gas mixture comprises two or more gases selected from the group consisting of H$_2$, He, O$_2$, N$_2$, CO, CO$_2$, water vapor, CH$_4$, saturated C$_2$-C$_4$ hydrocarbons, and unsaturated C$_2$-C$_4$ hydrocarbons.

26. A method for making a gas separation membrane, comprising the steps of:

a) forming a membrane from one or more polymers having the structure of formula (I):

   (I)

wherein in formula (I):

A is selected from the group consisting of:
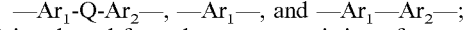

B is selected from the group consisting of:
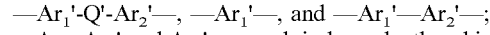

Ar$_1$, Ar$_2$, Ar$_1$' and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;

each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$) —, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl- (C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted;

p is an integer from 1 to 10; and q is an integer from 1 to 10;

wherein at least one occurrence of Ar$_1$, Ar$_2$, Ar$_1$', or Ar$_2$' is substituted with an $R^1$ group comprising a benzylic hydrogen, and at least one occurrence of Q or Q' includes a carbonyl group; and b) exposing at least a portion of said membrane to radiation so as to result in the formation of crosslinks.

27. A method for making a gas separation membrane, comprising the steps of:
a) forming a membrane from one or more polymers comprising structural units (A-O) and (B—O), wherein
A is selected from the group consisting of:
—Ar$_1$-Q-Ar$_2$—, —Ar$_1$—, and —Ar$_1$—Ar$_2$—;
B is selected from the group consisting of:
—Ar$_1$'-Q'-Ar$_2$'—, —Ar$_1$'—, and —Ar$_1$'—Ar$_2$'—;
Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one $R^1$ group each occurrence of $R^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y; Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$— and —C(=O)NR$^1$—;

Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl- (C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted;

p is an integer from 1 to 10; and q is an integer from 1 to 10;

wherein at least one occurrence of Ar$_1$, Ar$_2$, Ar$_1$', or Ar$_2$' is substituted with an $R^1$ group comprising a benzylic hydrogen, and at least one occurrence of Q or Q' includes a carbonyl group; and b) exposing at least a portion of said membrane to radiation so as to result in the formation of crosslinks.

28. The method of claim 26, wherein the radiation is ultraviolet radiation.

29. The method of claim 26, wherein the composition has a gel fraction of at least 20%.

30. A composition for a gas separation membrane, wherein the composition comprises at least one crosslinked polymer having the structure of formula (I):

-(A-O—B—O)$_n$— (I)

wherein in formula (I):
A is selected from the group consisting of:
—Ar$_1$-Q-Ar$_2$—, —Ar$_1$'—, and —Ar$_1$'—Ar$_2$'—;
B is selected from the group consisting of:
—Ar$_1$'-Q'-Ar$_2$'—, —Ar$_1$'—, and —Ar$_1$'—Ar$_2$'—;
Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one $R^1$ group;

each occurrence of $R^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more $R^1$ groups may be joined together to form a ring; or two $R^1$ groups may be covalently bonded to Y;

Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;

Q and Q' are each independently selected from the group consisting of —0—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl- (C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two $R^1$ groups in —C(R$^1$)(R$^1$) may be joined together to form a ring, wherein the ring is optionally substituted;

p is an integer from 1 to 10; and q is an integer from 1 to 10;

wherein at least one occurrence of Ar$_1$, Ar$_2$, Ar$_1$', or Ar$_2$' is substituted with an $R^1$ group comprising a benzylic hydrogen, and at least one occurrence of Q or Q' includes a carbonyl group; and wherein the at least one occurrence of Ar$_1$, Ar$_2$, Ar$_1$', or Ar$_2$' substituted with an $R^1$ group comprising a benzylic hydrogen cannot be on the same polymer as the at least one occurrence of Q or Q' including a carbonyl group.

31. A method for making a gas separation membrane, comprising the steps of:
a) forming a membrane from one or more polymers having the structure of formula (I):

-(A-O—B—O)$_n$— (I)

wherein in formula (I):
  A is selected from the group consisting of:
    —Ar$_1$-Q-Ar$_2$—, —Ar$_1$—, and —Ar—Ar$_2$—
  B is selected from the group consisting of:
    —Ar$_1$'-Q'-Ar$_2$'—, —Ar$_1$'—, and Ar$_2$'—;
  Ar$_1$, Ar$_2$, Ar$_1$', and Ar$_2$' are each independently a bivalent C$_5$-C$_{24}$ arylene or a bivalent C$_5$-C$_{24}$ heterocyclic ring, and wherein the arylene or heterocyclic ring is independently optionally substituted with at least one R$^1$ group;
  each occurrence of R$^1$ is independently selected from the group consisting of H, halo, —CN, —SO$_3$H or a salt thereof, —CO$_2$H or a salt thereof, —C$_1$-C$_{10}$ alkyl, —C$_1$-C$_{10}$ alkoxy, —C$_1$-C$_{10}$ haloalkyl, —C$_1$-C$_{10}$ haloalkoxy, phenyl, and cyclohexyl, wherein the alkyl, phenyl, and cyclohexyl groups are optionally substituted; or two or more R$^1$ groups may be joined together to form a ring; or two R$^1$ groups may be covalently bonded to Y;
  Y is selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, and —C(=O)NR$^1$—;
  Q and Q' are each independently selected from the group consisting of —O—, —S—, —C(=O), —CH(OH)—, —S(=O)$_2$—, —Si(CH$_3$)$_2$—, —(CH$_2$)$_p$—, —(CF$_2$)$_q$—, —C(CH$_3$)$_2$—, —C(CF$_3$)$_2$—, —C(R$^1$)(R$^1$)—, C(=O)NH—, —P(=O)C$_6$H$_5$—, —C(CH$_3$)(CF$_3$)—, —C(=O)C$_6$H$_4$C(=O)—, —C(R$^1$)(R$^1$)—C$_6$H$_4$—C(R$^1$)(R$^1$)—, -phenyl- (C$_1$-C$_6$)alkyl, -phenyl-(C$_1$-C$_6$)haloalkyl, phenyl, cycloalkyl, and heterocyclyl, wherein the phenyl, cycloalkyl, and heterocyclyl groups are optionally substituted; or the two R$^1$ groups in —C(R$^1$)(R$^1$) may be joined together to form a ring, wherein the ring is optionally substituted;
  p is an integer from 1 to 10; and
  q is an integer from 1 to 10;
  wherein at least one occurrence of Ar$_1$, Ar$_2$, Ar$_1$', or Ar$_2$' is substituted with an R$^1$ group comprising a benzylic hydrogen, and at least one occurrence of Q or Q' includes a carbonyl group; and
  wherein the at least one occurrence of Ar$_1$, Ar$_2$, Ar$_1$', or Ar$_2$' substituted with an R$^1$ group comprising a benzylic hydrogen cannot be on the same polymer as the at least one occurrence of Q or Q' including a carbonyl group; and
b) exposing at least a portion of said membrane to radiation so as to result in the formation of crosslinks.

* * * * *

UNITED STATES PATENT AND TRADEMARK OFFICE
CERTIFICATE OF CORRECTION

PATENT NO. : 9,533,254 B2
APPLICATION NO. : 14/530108
DATED : January 3, 2017
INVENTOR(S) : James McGrath et al.

Page 1 of 1

It is certified that error appears in the above-identified patent and that said Letters Patent is hereby corrected as shown below:

On the Title Page

On Column 1, in the "Inventors" section, please correct the given or first name of inventor Guo to read "Ruilan".

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*